(12) United States Patent
Hayakawa et al.

(10) Patent No.: US 7,694,582 B2
(45) Date of Patent: *Apr. 13, 2010

(54) DEFORMATION SENSOR

(75) Inventors: Tomonori Hayakawa, Komaki (JP); Yuuki Saitou, Komaki (JP); Kazunobu Hashimoto, Nagoya (JP); Rentaro Kato, Kasugai (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/907,602

(22) Filed: Oct. 15, 2007

(65) Prior Publication Data
US 2008/0100046 A1 May 1, 2008

(30) Foreign Application Priority Data

Oct. 25, 2006 (JP) ............................. 2006-290100
Oct. 25, 2006 (JP) ............................. 2006-290146

(51) Int. Cl.
*G01N 3/20* (2006.01)
(52) U.S. Cl. ......................................... 73/849; 73/777
(58) Field of Classification Search .................. 73/849, 73/760, 777
See application file for complete search history.

(56) References Cited

U.S. PATENT DOCUMENTS

| 3,806,471 | A | | 4/1974 | Mitchell | |
|---|---|---|---|---|---|
| 4,777,351 | A | * | 10/1988 | Batliwalla et al. | ........... 219/528 |
| 5,571,973 | A | * | 11/1996 | Taylot | ................... 73/862.046 |
| 6,276,214 | B1 | * | 8/2001 | Kimura et al. | ................. 73/795 |
| 6,561,301 | B1 | | 5/2003 | Hattori et al. | |
| 6,790,526 | B2 | * | 9/2004 | Vargo et al. | ................. 428/343 |
| 7,342,190 | B2 | * | 3/2008 | Burgess et al. | ........... 200/61.43 |
| 2002/0075232 | A1 | * | 6/2002 | Daum et al. | ................. 345/158 |
| 2004/0049363 | A1 | * | 3/2004 | Shimizu et al. | ............. 702/139 |
| 2004/0064230 | A1 | | 4/2004 | Takafuji et al. | |
| 2005/0021192 | A1 | | 1/2005 | Takafuji et al. | |
| 2005/0092061 | A1 | | 5/2005 | Takafuji et al. | |
| 2005/0096816 | A1 | | 5/2005 | Takafuji et al. | |
| 2006/0137462 | A1 | * | 6/2006 | Divigalpitiya et al. | ........ 73/760 |

FOREIGN PATENT DOCUMENTS

| JP | A-06-056000 | 3/1994 |
|---|---|---|
| JP | A-2006-142876 | 6/2006 |
| JP | A-2006-142953 | 6/2006 |
| JP | A-2006-142954 | 6/2006 |
| JP | A-2006-168606 | 6/2006 |
| JP | A-2006-194669 | 7/2006 |

* cited by examiner

*Primary Examiner*—Max Noori
(74) *Attorney, Agent, or Firm*—Oliff & Berridge, PLC

(57) ABSTRACT

A first deformation sensor is arranged in a shock transmission member which is built in a vehicle and which constitutes a transmission path of a shock applied from the outside. A second deformation sensor is arranged in an exterior member which is exposed to the outside of a vehicle. Each of the first and second deformation sensors comprises a main body of sensor which has an elastomer and spherical conductive fillers blended in the elastomer in an approximately single particle state and with a high filling rate, and in which an electric resistance increases as an elastic deformation increases, and an electrode which is connected with the main body of sensor and is able to output the electric resistance.

22 Claims, 35 Drawing Sheets

(a)

(b)

(a)

(b)

DEFORMATION SENSOR

INCORPORATION BY REFERENCE

This application is based on and claims priority under 35 U.S.C. 119 with respect to Japanese Patent Application Nos. 2006-290100 and 2006-290146, both of which were filed on Oct. 25, 2006, and the entire content of which is incorporated herein by reference.

BACKGROUND OF THE INVENTION

1. Field of the Invention

The present invention relates to a deformation sensor which is mounted on a vehicle and which can detect a collision and so on of a vehicle.

2. Description of the Related Art

An occupant protection system for protecting an occupant at the time of collision is equipped with automobiles. The occupant protection system comprises a sensor for detecting a shock, an occupant protection ECU (an electronic control unit) for judging whether or not a collision occurs based on a signal from the sensor and an occupant protection device such as an air bag and so on. Here, the sensor for detecting the shock includes, for example, an acceleration sensor for detecting an acceleration at the time of collision (appropriately, including a deceleration, the same applies to the following) (see Japanese Unexamined Patent Publication (KO-KAI) No. 6-56000). Furthermore, a load sensor for detecting a load at the time of collision by using an optical fiber is included (see Japanese Unexamined Patent Publication (KO-KAI) No. 2006-142876).

For example, when a vehicle collides with other vehicles and so on at the front, an acceleration occurs in a forward direction (a traveling direction) of the vehicle. Furthermore, when other vehicles collide with the vehicle from the side thereof, an acceleration occurs in a horizontal direction of the vehicle. The acceleration sensor detects an acceleration which is occurred, and the occupant protection ECU judges whether or not a collision occurs based on the value of the acceleration. Namely, according to the acceleration sensor, whether or not a collision occurs is judged from an acceleration indirectly. However, other than a shock, by a running condition such as, for example, running on a curb stone, running on a bad road and so on, an acceleration occurs. On this account, even when a collision doesn't occur, the acceleration sensor judges that a collision occurs by an acceleration which is occurred, and there is a fear that the occupant protection device malfunctions.

Furthermore, the acceleration sensor is normally disposed in a vehicle body with a dotted condition. Moreover, the acceleration sensor cannot detect an acceleration unless the acceleration sensor itself receives an acceleration. On this account, when a portion apart from the disposed position is partly came into collision and so on, an acceleration is hardly detected, and a collision cannot be recognized correctly.

On the other hand, in an optical fiber sensor, when an optical fiber is deformed by a collision, a loss of light which is transmitted from one end to the other end of the optical fiber increases. The occupant protection ECU judges whether or not a collision occurs based on the value of the loss of light. However, it is difficult to arrange optical fiber sensors in a wide range, and a wiring route becomes complicated. Especially, when the disposed place is a curved surface, an arrangement is difficult. Furthermore, as above described, the optical fiber sensor determines whether or not a collision occurs by using the deformation of the optical fiber. Here, a deformation amount of the optical fiber is relatively small. On this account, a detection range of the optical fiber sensor is relatively narrow. Moreover, when someone tries to detect a collision position by using the optical fiber sensor, a light-emitting source and a light-receiving source, both of which are independent respectively, are required depending on the detecting position. Consequently, the occupant protection system becomes expensive.

SUMMARY OF THE INVENTION

The present invention has been developed in view of such circumstances, and it is an object of the present invention to provide a sensor which can detect a collision and so on of a vehicle correctly.

(1) A first deformation sensor of the present invention is characterized in that it comprises an elastically deformable main body of sensor which has an elastomer and spherical conductive fillers blended in the elastomer in an approximately single particle state and with a high filling rate, and in which an electric resistance increases as an elastic deformation increases, and an electrode which is connected with the main body of sensor and is able to output the electric resistance; and that the first deformation sensor is arranged in a shock transmission member which is built in a vehicle and which constitutes a transmission path of a shock applied from the outside.

The first deformation sensor of the present invention is arranged in a shock transmission member which is built in a vehicle. The shock transmission member includes a reinforced member which suppresses a deformation of an object to be reinforced, and a shock absorption member which absorbs a shock by being deformed in itself. The shock transmission member is not exposed to the outside of a vehicle. On this account, for example, the shock transmission member is not deformed merely by a slight shock by which an exterior member that is exposed to the outside of a vehicle is bent. In other words, when the transmission member is deformed, it is conceivable that a big shock which requires an operation of the occupant protection device is applied. The first deformation sensor of the present invention detects a deformation of the shock transmission member. On this account, it is possible to detect a shock correctly.

The main body of sensor in the first deformation sensor of the present invention (hereinafter, referred to as "the main body of sensor of the present invention" appropriately) is elastically deformable, and it has an elastomer and spherical conductive fillers. In the present specification, the "elastomer" includes rubber and a thermoplastic elastomer. Furthermore, the conductive fillers are blended in the elastomer in an approximately single particle state and with a high filling rate. Here, the "approximately single particle state" means that 50% by weight or more of the conductive fillers exist in a single primary particle state, not an agglomerated secondary particle state when a total weight of the conductive fillers are 100% by weight. Furthermore, the "high filling rate" means that the conductive fillers are blended in the state which is proximate to a closest packing. In the present specification, the definition of terms which is appropriately described is in common with the first deformation sensor and the after-mentioned second deformation sensor of the present invention.

Thus, when the conductive fillers are blended in the approximately single particle state and with the high filling rate, a three-dimensionally conductive path is formed by a contact between the conductive fillers through the elastomer. Therefore, the main body of sensor of the present invention has high conductivity in the state that a load is not applied (hereinafter, referred to as "no load state" appropriately), namely, in a state of nature without deformation. In addition, the "elastic deformation" in the present specification includes all deformation such as a compression, an extension, a bending and so on.

For example, a pressure-sensitive conductive resin which has been conventionally used shows large electric resistance in a no compression state, and the electric resistance decreases when the pressure-sensitive conductive resin is deformed by compression. This can be explained by a construction of the pressure-sensitive conductive resin as follows. Namely, the pressure-sensitive conductive resin comprises a resin and conductive fillers which are blended in the resin. Here, the filling rate of the conductive fillers is low. On this account, the conductive fillers are kept away from each other in no load state. In other words, an electric resistance of the pressure-sensitive conductive resin is large in no load state. Furthermore, when the pressure-sensitive conductive resin is deformed by applying a load, the conductive fillers come in contact with each other, and a one-dimensional conductive path is formed. Due to this, an electric resistance decreases.

On the contrary, in the main body of sensor of the present invention, an electric resistance increases in accordance with an increase of an elastic deformation. It is considered that the reason of this is as follows. FIGS. 1 and 2 show the change of a conductive path before and after applying a load in the main body of sensor of the present invention as a model. However, FIGS. 1 and 2 merely show an example of a main body of sensor, so this is not intended to limit a shape, a material and so on of the conductive fillers and the main body of sensor of the present invention.

As shown in FIG. 1, in a main body of sensor 100, conductive fillers 102 mostly exist in an elastomer 101 in a single primary particle state. The filling rate of the conductive fillers 102 is high, and they are blended in the state which is proximate to a closest packing. Due to this, in no load state, a three-dimensionally conductive path P is formed by the conductive fillers 102 in the main body of sensor 100. Consequently, an electric resistance of the main body of sensor 100 is small in no load state. On the other hand, as shown in FIG. 2, when a load is applied to the main body of sensor 100, the main body of sensor 100 is elastically deformed (a dotted line frame in FIG. 2 shows no load state in FIG. 1). Here, the conductive fillers 102 are blended in the state which is proximate to a closest packing, so there is hardly any space in which the conductive fillers 102 can move. Consequently, when the main body of sensor 100 is elastically deformed, the conductive fillers 102 are rebounded against each other, and a contact state between the conductive fillers 102 changes. As a result, the three-dimensionally conductive path P collapses, and an electric resistance increases.

The first deformation sensor of the present invention having such a main body of sensor can directly detect a various kinds of deformation such as a compression, an extension, a bending and so on which is generated in the shock transmission member of a vehicle, based on an increase of an electric resistance of the main body of sensor which is outputted from an electrode. Besides, the first deformation sensor can detect a load and so on which causes the deformation. Here, "to be able to output an electric resistance" means that it is possible to output an electric resistance directly or indirectly. Namely, this includes not only the case in which an electric resistance is directly outputted from the electrode, but also the case in which other electric amount such as a voltage, a current and so on that is related to an electric resistance is outputted.

In the main body of sensor of the present invention, an elastomer is a base material. Due to this, the first deformation sensor of the present invention has excellent workability and high degree of freedom in a shape design. Therefore, even if the shape of the shock transmission member is complicated, and even when the shock transmission member extends to a wide range, an arrangement is easy. For example, when the first deformation sensor of the present invention is arranged over the whole periphery of a vehicle, a collision and so on from the front, the rear and the side can be detected in full. Moreover, by adjusting a number and an arrangement of the electrode which is connected with the main body of sensor, it is possible to carry out more detailed sensing, and to specify a collision position.

In the first deformation sensor of the present invention, by adjusting a kind of the elastomer and the conductive fillers, a filling rate of the conductive fillers and so on, it is possible to set an electric resistance value in no load state to be the predetermined range. Due to this, it is possible to make a range of a detectable load and a detectable elastic deformation, namely, a detection range larger. In addition, it is possible to adjust an increase behavior of an electric resistance with respect to an elastic deformation, so the desired response sensitivity can be realized.

Moreover, the first deformation sensor of the present invention has high conductivity in no load state. Namely, the first deformation sensor of the present invention is in a conductive state in no load state. Due to this, as compared with a sensor having low conductivity in no load state (for example, a sensor using a conventional pressure-sensitive conductive resin), an operation diagnosis is easy. Namely, in case of the sensor having low conductivity in no load state is used, it is difficult to judge whether it is normal or abnormal (for example, whether breaking of wire and so on occurs in a circuit) when the low conductive sensor is maintained to be in no load state. So, it is necessary that a relatively high voltage is daringly applied to the low conductive sensor to turn on electricity. Or, it is necessary that the low conductive sensor is operated on trial and a current-carrying condition is checked. Therefore, an operation diagnosis is complicated. On the contrary, the first deformation sensor of the present invention has high conductivity in no load state. On this account, it is easy to judge whether it is normal or abnormal when the first deformation sensor is maintained to be in no load state. Therefore, an operation diagnosis is easy. For example, when an engine operates, in conjunction with turning on an ignition switch of a vehicle, by flowing a current in a circuit in which the first deformation sensor of the present invention is incorporated, an operation diagnosis can be easily carried out.

(2) Preferably, in the construction of the above (1), it is constructed that the above-mentioned shock transmission member is one member selected from the group consisting of a bumper reinforcement, a crash box, a side member and a side impact protection beam. In case of a collision from the front and the rear, a collision energy is absorbed while being spreaded in a shock transmission path from a bumper cover to a body of a vehicle. In the shock transmission path, the bumper reinforcement, the crash box and the side member are arranged. On this account, the bumper reinforcement, the crash box and the side member are a member to which a shock energy is easily inputted (namely, which is easily deformed) at the time of a collision from the front and the rear. Therefore, when the first deformation sensor of the present invention is arranged in the bumper reinforcement, the crash box and the side member, a collision from the front and the rear of a vehicle can be detected surely.

Furthermore, in case of a collision from the side of a vehicle, a collision energy is absorbed while being spreaded in a shock transmission path from a door outer panel to a body of a vehicle. In the shock transmission path, the side impact protection beam is arranged. On this account, the side impact protection beam is a member to which a shock energy is easily inputted (namely, which is easily deformed) at the time of a collision from the side. Therefore, when the first deformation sensor of the present invention is arranged in the side impact protection beam, a collision from the side of a vehicle can be detected surely.

Thus, according to the present construction, the first deformation sensor of the present invention is arranged in at least one of the bumper reinforcement, the crash box, the side member and the side impact protection beam which is a shock transmission member that is easily deformed at the time of collision, and that is hardly deformed other than the time of collision. On this account, a collision can be detected surely. Furthermore, it is possible to suppress a malfunction of the occupant protection device at the time of no collision.

(3) Preferably, in the construction of the above (1), it is constructed that the above-mentioned main body of sensor is elastically bending deformable. According to the present construction, the change of an electric resistance when the shock transmission member is bent and deformed can be detected. Furthermore, as compared with a mere compression deformation and a mere extension deformation, a bending deformation can easily obtain large elastic deformation. On this account, according to the present construction, it is possible to detect a load which acts on the shock transmission member and a bending deformation of the shock transmission member with high accuracy.

(4) Preferably, in the construction of the above (3), it is constructed that the above-mentioned main body of sensor comprises a fixed surface which is fixed to the above-mentioned shock transmission member and a back surface which is in back of the fixed surface, and a restriction member which restricts an elastic deformation of the back surface is arranged in the back surface. Here, "is fixed to the shock transmission member" includes a mode in which the main body of sensor is directly fixed to the shock transmission member, and a mode in which the main body of sensor is indirectly fixed to the shock transmission member by way of some fixed member (hereinafter, the same applies to the construction of (5)). According to the present construction, the elastic deformation of the back surface of the main body of sensor is controlled by the restriction member. Due to this, the difference between the elastic deformation of the fixed surface and the elastic deformation of the back surface becomes large. As a result, the elastic deformation of the entire main body of sensor becomes large, and an increasing amount of the electric resistance becomes large. Namely, it is possible to detect a load which acts on the shock transmission member and the deformation caused by the load easily.

(5) Preferably, in the construction of the above (3), it is constructed that the above-mentioned main body of sensor comprises a fixed surface which is fixed to the above-mentioned shock transmission member and a back surface which is in back of the fixed surface, and the back surface is exposed. According to the present construction, the main body of sensor is fixed to the shock transmission member by the fixed surface surely. Therefore, it is possible to detect a bending deformation of the shock transmission member correctly. Furthermore, the restriction member as in the construction of the above (4) is not arranged, so the construction becomes simple, and the production cost can be reduced.

(6) Preferably, in the construction of the above (1), it is constructed that the above-mentioned main body of sensor is formed of a long sheet, and a number of the above-mentioned electrodes are arranged along with a longitudinal direction of the main body of sensor. According to the present construction, for example, by arranging the electrodes along with a longitudinal direction of the main body of sensor with the predetermined distance, it is possible to carry out more detailed sensing. Furthermore, it is possible to specify the load applied position and the deformed position.

(7) Preferably, in the construction of the above (1), it is constructed that the above-mentioned main body of sensor is composed of an elastomer composition in which the above-mentioned elastomer and the above-mentioned conductive fillers are essential components, and a blended amount of said conductive fillers at a second polarity change point at which an electric resistance change is saturated (saturated volume fraction: $\phi s$) is 35 vol % or more in a percolation curve which shows a relationship between the blended amount of said conductive fillers and the electric resistance of said elastomer composition.

Generally, when conductive fillers are mixed with an insulative elastomer to form an elastomer composition, an electric resistance of the elastomer composition changes depending on a blended amount of the conductive fillers. FIG. 3 typically shows a relationship between the blended amount of the conductive fillers and the electric resistance in the elastomer composition.

As shown in FIG. 3, when the conductive fillers 102 are mixed with the elastomer 101, the electric resistance of the elastomer composition is almost the same as the electric resistance of the elastomer 101 at first. However, when the blended amount of the conductive fillers 102 reaches to some volume fraction, the electric resistance rapidly lowers, and an insulator to a conductor transition occurs (first polarity change point). The blended amount of the conductive fillers 102 at the first polarity change point is referred to as a critical volume fraction ($\phi c$). Moreover, when the conductive fillers 102 are further mixed, the change of the electric resistance decreases from some volume fraction, and the electric resistance change is saturated (second polarity change point). The blended amount of the conductive fillers 102 at the second polarity change point is referred to as a saturated volume fraction ($\phi s$). Such change of the electric resistance is referred to as a percolation curve. It is conceivable that such change occurs because a conductive path P1 due to the conductive fillers 102 is formed in the elastomer 101.

For example, when an agglomerate is formed by agglomerating the conductive fillers because of the reasons that a particle diameter of the conductive fillers is small, that the compatibility between the conductive fillers and the elastomer is poor and so on, a one-dimensionally conductive path is easy to be formed. In this case, the critical volume fraction ($\phi c$) of the elastomer composition is relatively small, namely, approximately 20 vol %. Similarly, the saturated volume fraction ($\phi s$) is relatively small. In other words, when the critical volume fraction ($\phi c$) and the saturated volume fraction ($\phi s$) are small, the conductive fillers hardly exist as a primary particle, and is easy to form a secondary particle (agglomerated body). Therefore, in this case, it is difficult that a large amount of conductive fillers are blended in the elastomer. Namely, it is difficult that the conductive fillers are blended in the state which is proximate to a closest packing. Furthermore, when the conductive fillers whose particle diameter are small are blended in a large amount, an agglomerated structure grows three-dimensionally, so the change of the conductivity according to deformations becomes poor.

According to the present construction, the main body of sensor comprises an elastomer composition in which the saturated volume fraction ($\phi s$) is 35 vol % or more. Since the saturated volume fraction ($\phi s$) is large such as 35 vol % or more, the conductive fillers exist stably in the elastomer in an approximately single particle state. Therefore, it is possible that the conductive fillers are blended in the state which is proximate to a closest packing.

(8) Preferably, in the construction of the above (1), it is constructed that a filling rate of the above-mentioned conductive fillers are 30 vol % or more and 65 vol % or less when a total volume of the above-mentioned main body of sensor is 100 vol %.

According to the present construction, the conductive fillers are blended in the elastomer in the state which is proximate to a closest packing. Therefore, a three-dimensionally conductive path due to the conductive fillers is easy to be formed.

(9) Preferably, in the construction of the above (1), it is constructed that the above-mentioned conductive fillers are carbon beads. The carbon beads have excellent conductivity, and it is relatively inexpensive. Furthermore, the carbon beads have an approximately spherical form, so it can be blended in a high filling rate.

(10) Preferably, in the construction of the above (1), it is constructed that an average particle diameter of the above-mentioned conductive fillers is 0.05 μm or more and 100 μm or less. According to the present construction, the conductive fillers are hardly agglomerated, and it is easy to exist in a primary particle state. In addition, the average particle diameter means an average particle diameter of the conductive fillers which exist in a primary particle state.

(11) Preferably, in the construction of the above (1), it is constructed that the above-mentioned elastomer includes one rubber selected from the group consisting of silicone rubber, ethylene-propylene copolymer rubber, natural rubber, styrene-butadiene copolymer rubber, acrylonitrile-butadiene copolymer rubber and acrylic rubber. According to the present construction, the compatibility between the conductive fillers and the elastomer is excellent. On this account, the conductive fillers are easy to exist in a primary particle state.

(12) A second deformation sensor of the present invention is characterized in that it comprises an elastically deformable main body of sensor which has an elastomer and spherical conductive fillers blended in the elastomer in an approximately single particle state and with a high filling rate, and in which an electric resistance increases as an elastic deformation increases, and an electrode which is connected with the main body of sensor and is able to output the electric resistance; and that the second deformation sensor is arranged in an exterior member that is exposed to the outside of a vehicle, and can detect a collision of the exterior member.

The second deformation sensor of the present invention is arranged in an exterior member of a vehicle. The exterior member is exposed to the outside of the vehicle, and constitutes an outer shell of a vehicle body. On this account, when the vehicle collides with an object to be collided such as a person or an object and so on, the exterior member is initially deformed. Therefore, according to the second deformation sensor of the present invention, it is possible to detect a collision and so on early.

The main body of sensor in the second deformation sensor of the present invention (the same as the above, referred to as "the main body of sensor of the present invention" appropriately) is elastically deformable, and it has an elastomer and spherical conductive fillers. The main body of sensor of the second deformation sensor is the same as that in the first deformation sensor of the present invention, so an explanation thereof will be omitted. The second deformation sensor of the present invention having such a main body of sensor can directly detect a various kinds of deformation such as a compression, an extension, a bending and so on which is generated in the exterior member of a vehicle, based on an increase of an electric resistance of the main body of sensor which is outputted from an electrode. Besides, the second deformation sensor can detect a load and so on which causes the deformation.

In the main body of sensor of the present invention, an elastomer is a base material. Due to this, the second deformation sensor of the present invention has excellent workability and high degree of freedom in a shape design. Therefore, an arrangement in an exterior member whose shape is complicated is easy, and it is possible to detect a load and a deformation in a wide range of the exterior member. For example, when the second deformation sensor of the present invention is arranged over the whole periphery of a vehicle, a collision and so on from the front, the rear and the side can be detected in full. Moreover, by adjusting a number and an arrangement of the electrode which is connected with the main body of sensor, it is possible to carry out more detailed sensing, and to specify the load applied position and the deformed position.

In the second deformation sensor of the present invention, by adjusting a kind of the elastomer and the conductive fillers, a filling rate of the conductive fillers and so on, it is possible to set an electric resistance value in no load state to be the predetermined range. Due to this, it is possible to make a range of a detectable load and a detectable elastic deformation, namely, a detection range larger. In addition, it is possible to adjust an increase behavior of an electric resistance with respect to an elastic deformation, so the desired response sensitivity can be realized.

Moreover, the second deformation sensor of the present invention has high conductivity in no load state. Namely, the second deformation sensor of the present invention is in a conductive state in no load state. Due to this, in the same as the above-mentioned main body of sensor of the present invention, an operation diagnosis can be easily carried out.

(13) Preferably, in the construction of the above (12), it is constructed that the above-mentioned exterior member is at least one of a bumper cover and a door panel. For example, when the second deformation sensor of the present invention is arranged in a bumper cover, a collision from the front and the rear of a vehicle can be detected immediately. Furthermore, when the second deformation sensor of the present invention is arranged in a door panel, a collision from the side of a vehicle can be detected immediately. According to the present construction, a collision can be detected sooner, so it is possible to drive an occupant protection device immediately.

(14) Preferably, in the construction of the above (12), it is constructed that the above-mentioned main body of sensor is elastically bending deformable. According to the present construction, the change of an electric resistance when the exterior member is bent and deformed can be detected. Furthermore, as compared with a mere compression deformation and a mere extension deformation, a bending deformation can easily obtain large elastic deformation. On this account, according to the present construction, it is possible to detect a load which acts on the exterior member and a bending deformation of the exterior member with high accuracy.

(15) Preferably, in the construction of the above (14), it is constructed that the above-mentioned main body of sensor comprises a fixed surface which is fixed to the above-mentioned exterior member and a back surface which is in back of the fixed surface, and a restriction member which restricts an elastic deformation of the back surface is arranged in the back surface. Here, "is fixed to the exterior member" includes a mode in which the main body of sensor is directly fixed to the exterior member, and a mode in which the main body of sensor is indirectly fixed to the exterior member by way of some fixed member. According to the present construction, the elastic deformation of the back surface of the main body of sensor is controlled by the restriction member. Due to this, the difference between the elastic deformation of the fixed surface and the elastic deformation of the back surface becomes large. As a result, the elastic deformation of the entire main body of sensor becomes large, and an increasing amount of the electric resistance becomes large. Namely, it is possible to detect a load which acts on the exterior member and the deformation caused by the load easily.

(16) Preferably, in the construction of the above (14), it is constructed that the above-mentioned main body of sensor comprises a fixed surface which is fixed to the above-mentioned exterior member and a back surface which is in back of the fixed surface, and the back surface is exposed. According to the present construction, the main body of sensor is fixed to the exterior member by the fixed surface surely. Therefore, it is possible to detect a bending deformation of the exterior member correctly. Furthermore, the restriction member as in the construction of the above (15) is not arranged, so the construction becomes simple, and the production cost can be reduced.

(17) Preferably, in the construction of the above (12), it is constructed that the above-mentioned main body of sensor is formed of a long sheet, and a number of the above-mentioned electrodes are arranged along with a longitudinal direction of the main body of sensor. According to the present construction, for example, by arranging the electrodes along with a longitudinal direction of the main body of sensor with the predetermined distance, it is possible to carry out more detailed sensing. Furthermore, it is possible to specify the load applied position and the deformed position.

(18) Preferably, in the construction of the above (12), it is constructed that the above-mentioned main body of sensor is composed of an elastomer composition in which the above-mentioned elastomer and the above-mentioned conductive fillers are essential components, and a blended amount of said conductive fillers at a second polarity change point at which an electric resistance change is saturated (saturated volume fraction: $\phi s$) is 35 vol % or more in a percolation curve which shows a relationship between the blended amount of said conductive fillers and the electric resistance of said elastomer composition.

As explained in the above (7), an electric resistance of the elastomer composition changes depending on a blended amount of the conductive fillers (see the above-mentioned FIG. 3). According to the present construction, the main body of sensor comprises an elastomer composition in which the saturated volume fraction ($\phi s$) is 35 vol % or more. Since the saturated volume fraction ($\phi s$) is large such as 35 vol % or more, the conductive fillers exist stably in the elastomer in an approximately single particle state. Therefore, it is possible that the conductive fillers are blended in the state which is proximate to a closest packing.

(19) Preferably, in the construction of the above (12), it is constructed that a filling rate of the above-mentioned conductive fillers is 30 vol % or more and 65 vol % or less when a total volume of the above-mentioned main body of sensor is 100 vol %.

According to the present construction, the conductive fillers are blended in the elastomer in the state which is proximate to a closest packing. Therefore, a three-dimensionally conductive path due to the conductive fillers is easy to be formed.

(20) Preferably, in the construction of the above (12), it is constructed that the above-mentioned conductive fillers are carbon beads. The carbon beads have excellent conductivity, and it is relatively inexpensive. Furthermore, the carbon beads have an approximately spherical form, so it can be blended in a high filling rate.

(21) Preferably, in the construction of the above (12), it is constructed that an average particle diameter of the above-mentioned conductive fillers is 0.05 μm or more and 100 μm or less. According to the present construction, the conductive fillers are hardly agglomerated, and it is easy to exist in a primary particle state. In addition, the average particle diameter means an average particle diameter of the conductive fillers which exists in a primary particle state.

(22) Preferably, in the construction of the above (12), it is constructed that the above-mentioned elastomer includes one rubber selected from the group consisting of silicone rubber, ethylene-propylene copolymer rubber, natural rubber, styrene-butadiene copolymer rubber, acrylonitrile-butadiene copolymer rubber and acrylic rubber. According to the present construction, the compatibility between the conductive fillers and the elastomer is excellent. On this account, the conductive fillers are easy to exist in a primary particle state.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 4(*b*) is a transmitted lateral view of the vehicle.

FIG. 17(*b*) is a transmitted lateral view of the vehicle.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The preferred embodiments of the first and second deformation sensors of the present invention will be explained as follows. First, the preferred embodiments of the first deformation sensor of the present invention will be explained in detail, and then, the preferred embodiments of the second deformation sensor of the present invention will be explained in detail, and finally, the main body of sensor which constitutes the both deformation sensors of the present invention will be explained in detail.

(First Deformation Sensor)

In the following embodiments, the first deformation sensor of the present invention is incorporated in an occupant protection system of automobiles.

First Preferred Embodiment

Figure 4:
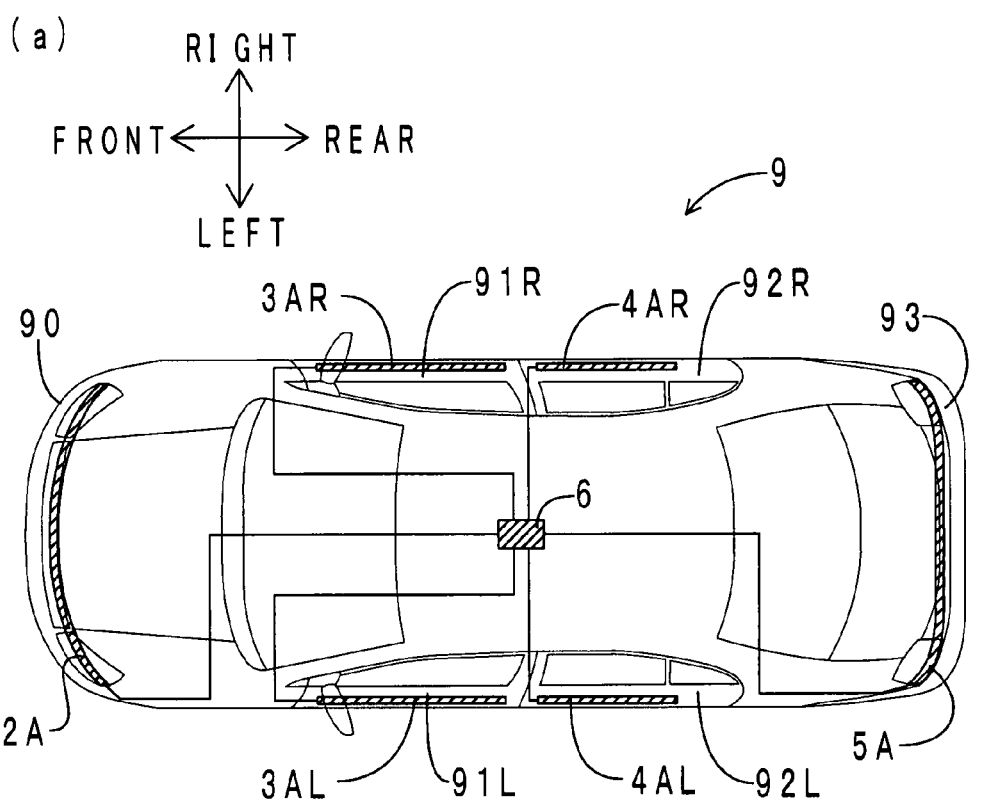
FIG. 4(*a*) is a transmitted upper surface view of a vehicle in which a deformation sensor of the first preferred embodiment is arranged.
Figure 4:
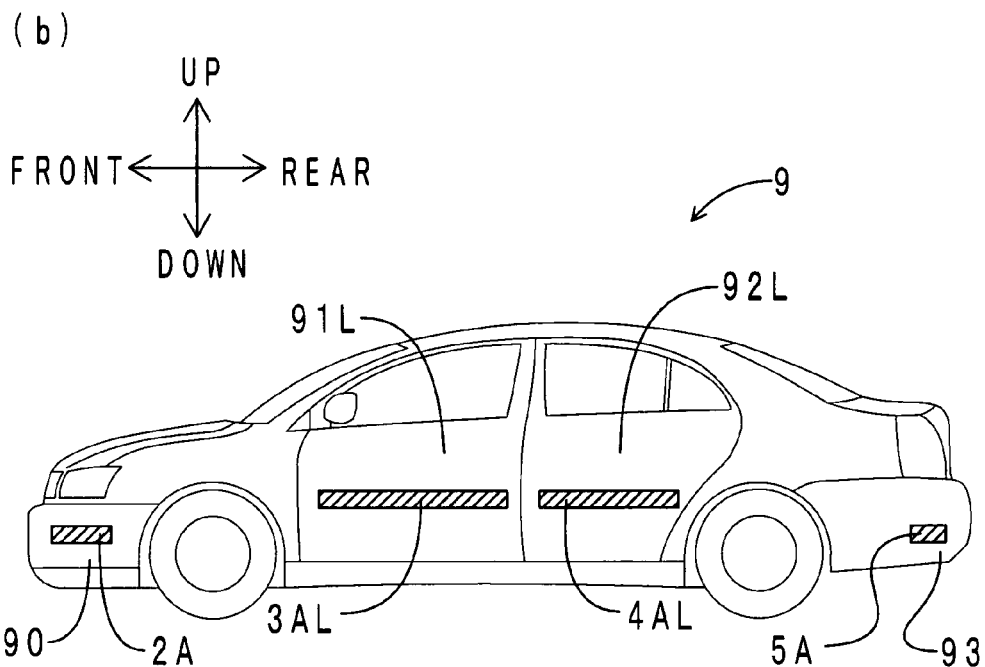

First, an arrangement of the deformation sensor in this preferred embodiment will be explained. FIG. 4(*a*) is a transmitted upper surface view of a vehicle in which the deformation sensor is arranged. FIG. 4(*b*) is a transmitted lateral view of the vehicle. By the way, in Figures following to FIG. 4, an orientation is defined on the basis of a forward direction of a vehicle 9.

As shown in FIG. 4, as for the vehicle 9, a front bumper sensor unit 2A is built in a front bumper 90, a left front door sensor unit 3AL is built in a left front door 91L, a left rear door sensor unit 4AL is built in a left rear door 92L, a right front door sensor unit 3AR is built in a right front door 91R, a right rear door sensor unit 4AR is built in a right rear door 92R, and a rear bumper sensor unit 5A is built in a rear bumper 93, respectively (in FIG. 4, as a matter of convenience for explanation, these sensor units are shown as hatching). Furthermore, under an approximately central floor of the vehicle 9, an occupant protection ECU (in FIG. 4, as a matter of convenience for explanation, the occupant protection system is shown as hatching) 6 is buried.

The front bumper sensor unit 2A, the left front door sensor unit 3AL, the left rear door sensor unit 4AL, the right front door sensor unit 3AR, the right rear door sensor unit 4AR, the rear bumper sensor unit 5A and the occupant protection ECU 6 are connected with each other by a harness, respectively.

The front bumper sensor unit 2A and the rear bumper sensor unit 5A are installed along with a left-right direction (vehicle-width direction) of the vehicle respectively. The left front door sensor unit 3AL, the left rear door sensor unit 4AL, the right front door sensor unit 3AR and the right rear door sensor unit 4AR are installed along with a front-rear direction of the vehicle respectively.

Next, an arrangement of the front bumper sensor unit 2A which is built in the front bumper 90 will be explained. By the way, an arrangement, a constitution, a movement, an action and an effect of the rear bumper sensor unit 5A which is built in the rear bumper 93 are the same as those of the front bumper sensor unit 2A. Therefore, only the front bumper sensor unit 2A will be explained as follows, and this explanation doubles as an explanation about the rear bumper sensor unit 5A.

Figure 5:
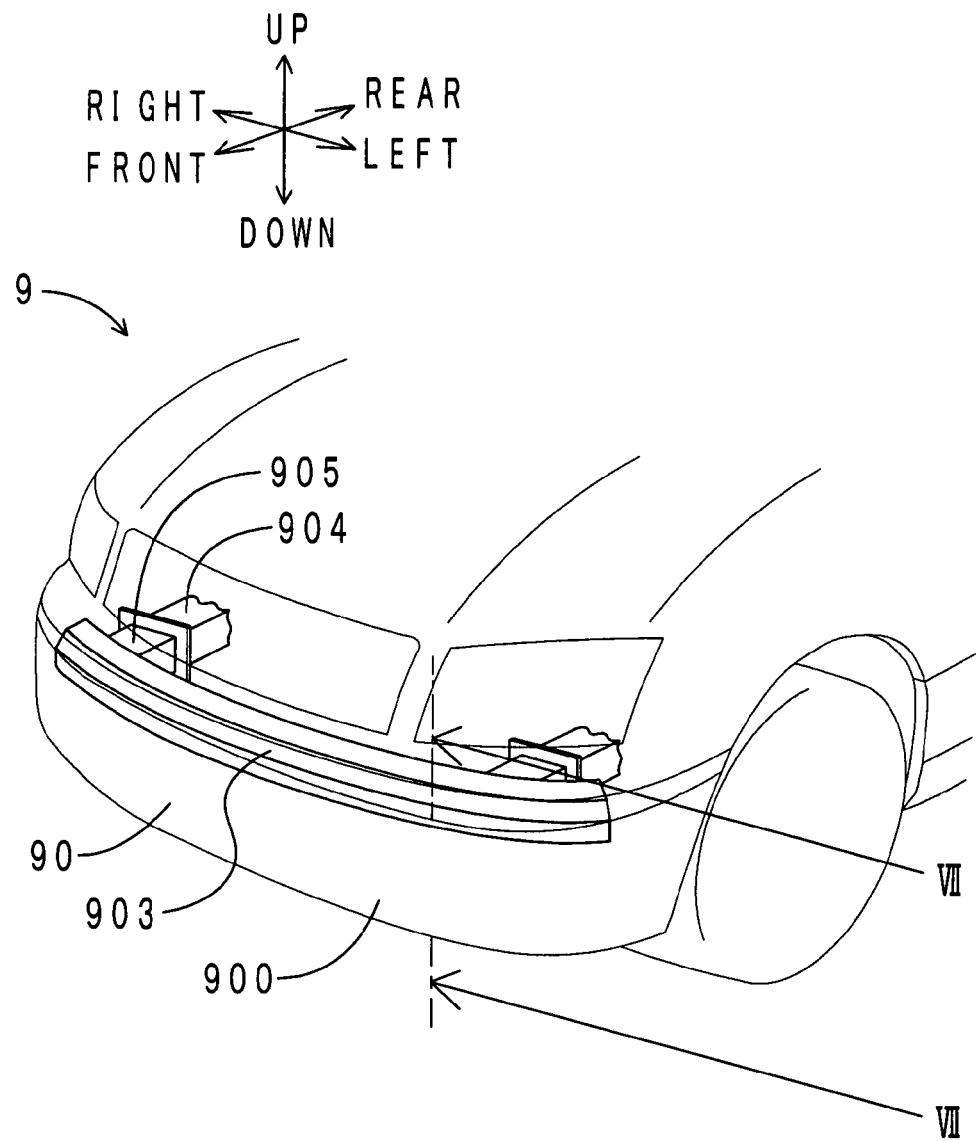
FIG. 5 is a transmitted perspective view near a front bumper of the vehicle.

FIG. 5 is a transmitted perspective view near the front bumper 90 of the vehicle 9. By the way, as a matter of convenience for explanation, a bumper reinforcement 903, a front side member 904 and a crash box 905 are shown as a heavy line. The front bumper sensor unit 2A is built in the bumper reinforcement 903.

Figure 6:
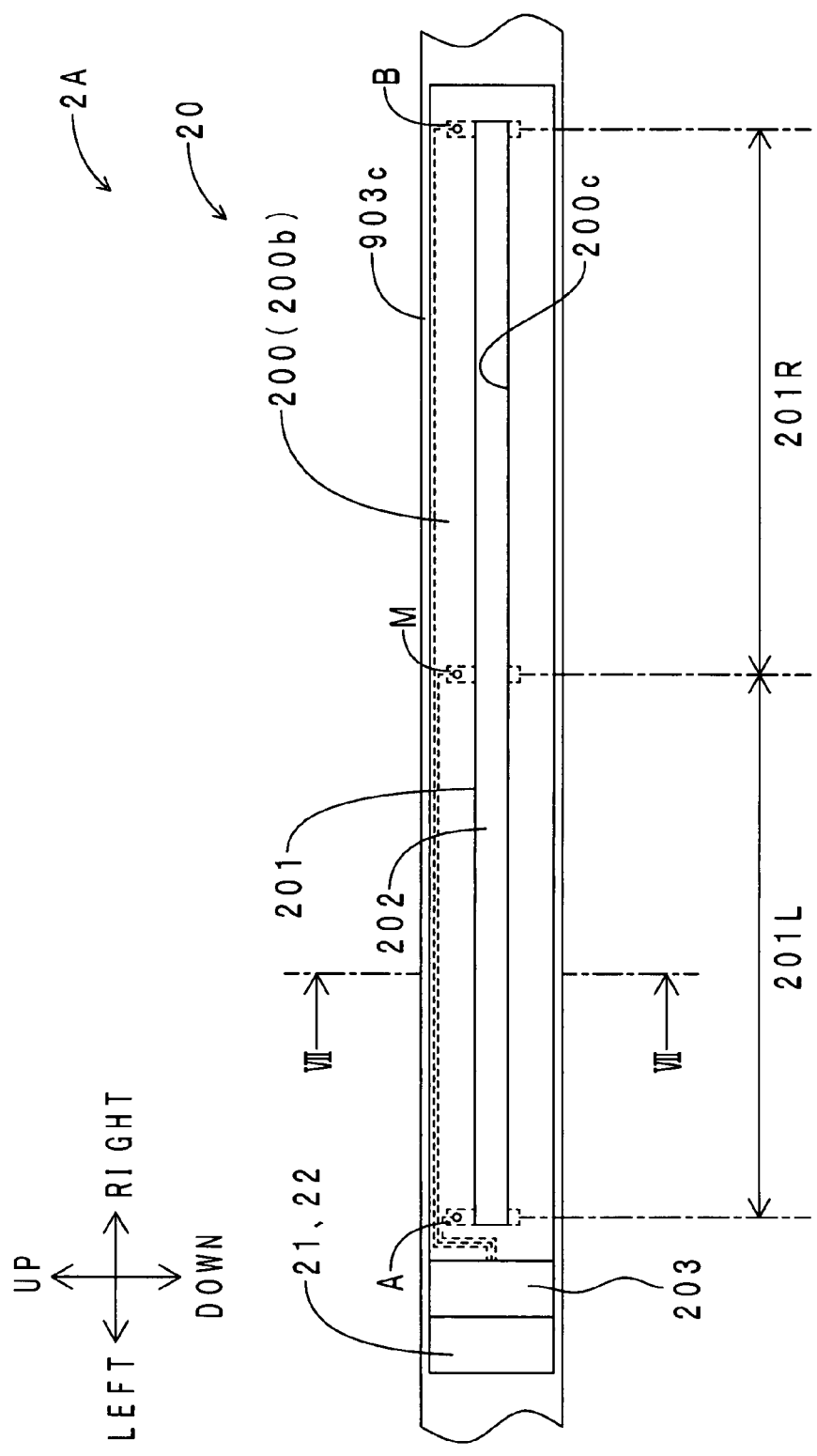
FIG. 6 is a back side back view of a bumper cover of the front bumper of the vehicle.
Figure 7:
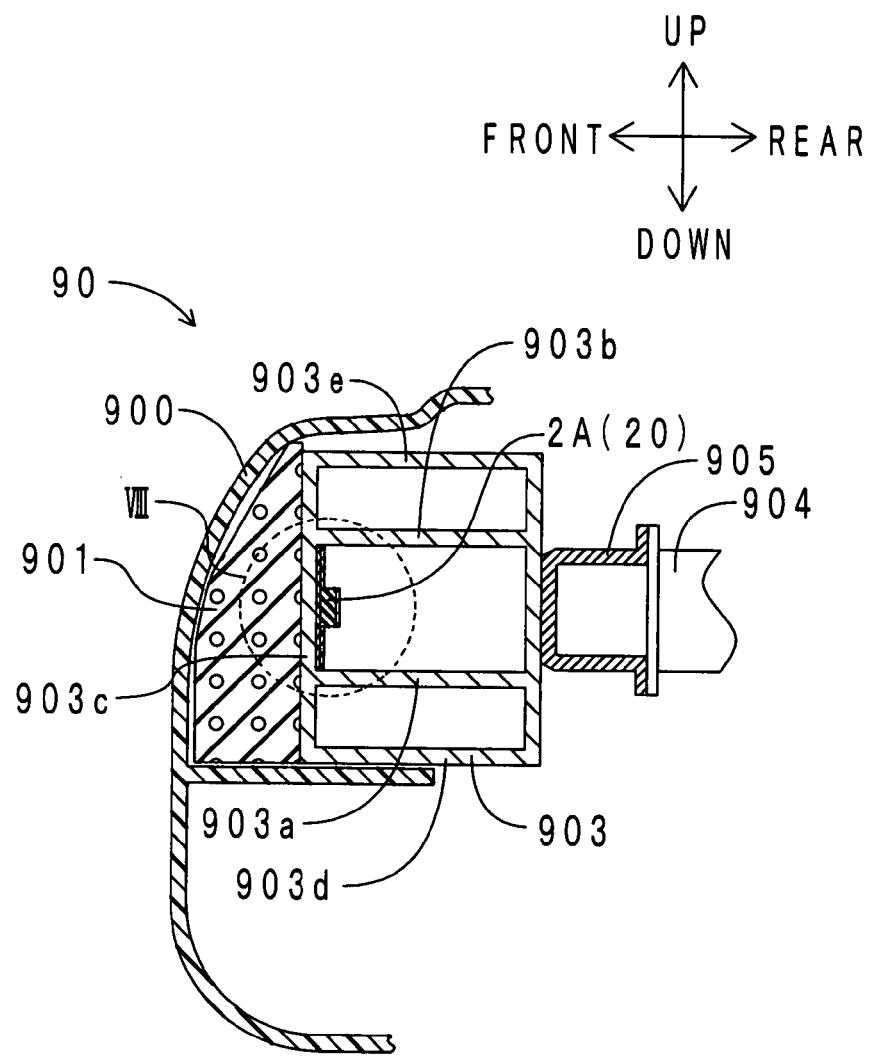
FIG. 7 is a VII-VII cross sectional view of FIGS. 5 and 6.

FIG. 6 is a back side back view (rear view) of a front wall 903*c* of the bumper reinforcement 903. In addition, FIG. 6 shows a section which is surrounded by partition plates 903*a* and 903*b* in the back side of the front wall 903*c*. FIG. 7 is a VII-VII cross sectional view of FIGS. 5 and 6. As shown in FIGS. 6 and 7, the front bumper 90 has a bumper cover 900, an energy absorber 901, a bumper reinforcement 903 and a crash box 905.

The bumper reinforcement 903 is made of aluminum alloy, and is formed of a long-sheet square tube. The bumper reinforcement 903 is installed along with a vehicle-width direction. An internal space of the bumper reinforcement 903 is partitioned by the partition plates 903*a* and 903*b*.

The crash box 905 is made of aluminum alloy, and is formed of a box which opens toward the rear. In total, two crash boxes 905 are separately arranged in a vehicle-width direction. At a front wall of a pair of crash boxes 905, both of left and right ends of the bumper reinforcement 903 are fixed. A pair of crash boxes 905 are respectively fixed to a front end of the front side member 904 in such a state that an opening is turned down.

The energy absorber 901 is made of foamed PP (polypropylene), and is formed of a long sheet. The energy absorber 901 is extended in a vehicle-width direction. The energy absorber 901 is fixed to a surface (front surface) of the front wall 903c of the bumper reinforcement 903.

The bumper cover 900 is made of an olefin resin, and is formed of a long sheet. The bumper cover 900 is extended in a vehicle-width direction. The bumper cover 900 covers the energy absorber 901.

The front bumper sensor unit 2A is fixed to the section which is surrounded by the partition plates 903a and 903b in the back side of the front wall 903c of the bumper reinforcement 903. Namely, the front bumper sensor unit 2A is accommodated in the inside of the bumper reinforcement 903.

Figure 8:
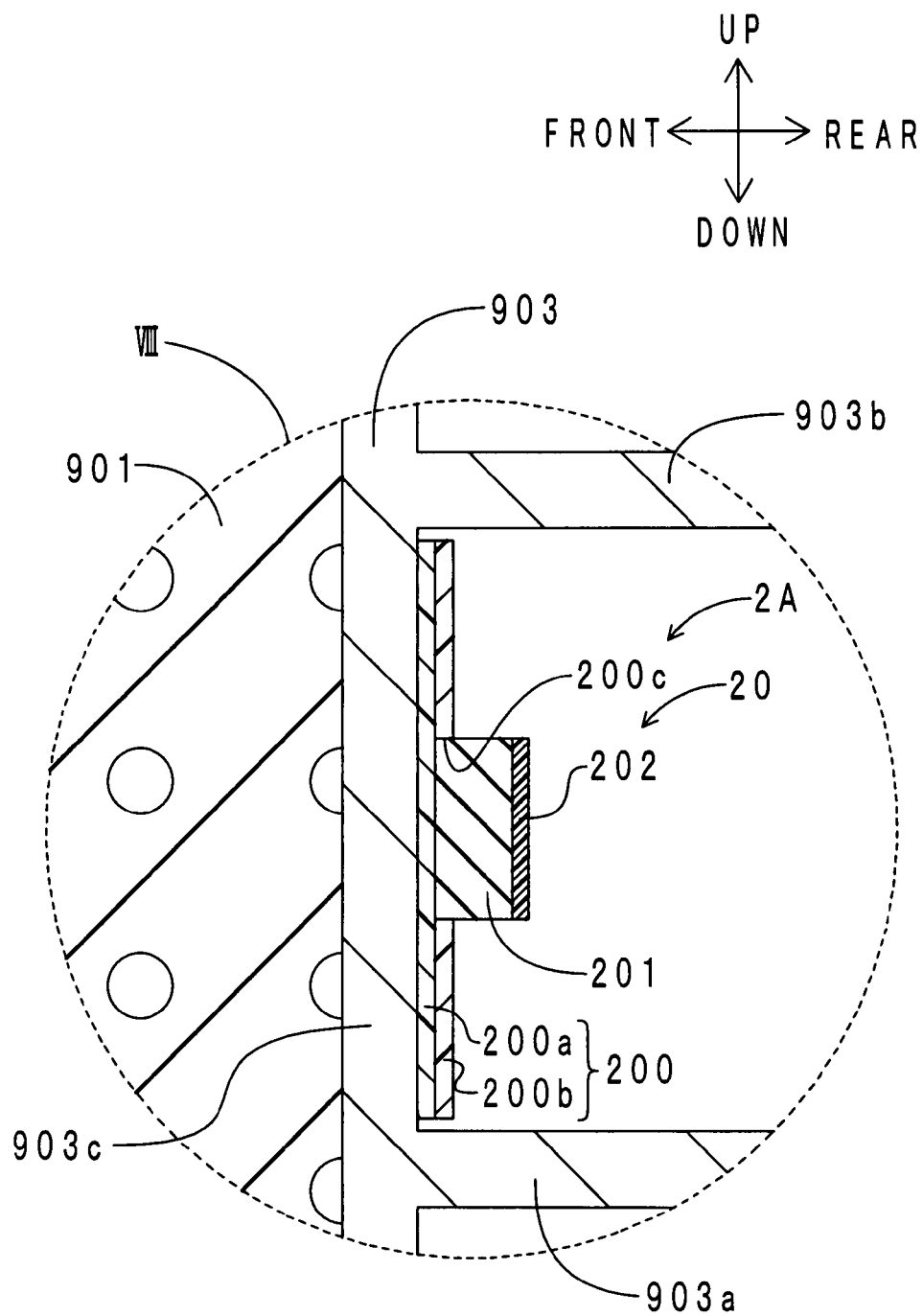
FIG. 8 is an enlarged view in a circle VIII of FIG. 7.

Next, a constitution of the front bumper sensor unit 2A will be explained. FIG. 8 is an enlarged view in a circle VIII of FIG. 7. As shown in FIGS. 6 to 8, the front bumper sensor unit 2A has a front bumper sensor 20, a bridge circuit 21 and an amplifier 22. Among them, the front bumper sensor 20 is included in the first deformation sensor of the present invention.

The front bumper sensor 20 has an electrode film portion 200, a main body of sensor 201, a restriction film portion 202 and a connector 203. The electrode film portion 200 has a base material film 200a and a cover film 200b. The base material film 200a is made of polyimide, and is formed of a band which is extended in a left-right direction. The base material film 200a is fixed to the back side (rear surface) of the front wall 903c of the bumper reinforcement 903.

The cover film 200b is made of polyimide, and is formed of a band which is extended in a left-right direction. The cover film 200b covers a surface (rear surface) of the base material film 200a. At the center of the cover film 200b in a width direction (up-down direction), a rectangular long hole 200c which is extended in a left-right direction is opened.

The main body of sensor 201 is formed of a long-sheet plate which is extended in a left-right direction. The main body of sensor 201 is fixed to the surface of the base material film 200a in such a state that the main body of sensor 201 is accommodated in the long hole 200c of the cover film 200b. A contact surface of the main body of sensor 201 with the base material film 200a corresponds to a fixed surface of the present invention.

The main body of sensor 201 comprises an elastomer composite material in which carbon beads ("NICABEADS ICB0520" manufactured by Nippon Carbon Co., Ltd.; an average particle diameter is approximately 5 μm) are blended in EPDM (ethylene-propylene-diene ternary copolymer). A filling rate of the carbon beads is 48 vol % when a total volume of the main body of sensor 201 is 100 vol %. Furthermore, in a percolation curve of the elastomer composition in which carbon beads are blended with EPDM, the critical volume fraction ($\phi c$) is 43 vol % and the saturated volume fraction ($\phi s$) is 48 vol %.

An electrode A is installed to a left end of the main body of sensor 201, an electrode B is installed to a right end thereof, and an electrode M is installed between the electrode A and the electrode B, respectively. As explained in detail, the electrodes A, B and M are made of metal respectively, and they are formed of a strip which is extended up and down. The electrodes A, B and M are disposed between the main body of sensor 201 and the base material film 200a, and between the cover film 200b and the base material film 200a. The electrodes A, B and M are connected with the connector 203 respectively by a wire. Each wire is disposed between the cover film 200b and the base material film 200a, respectively. By means of the electrodes A, B and M, the main body of sensor 201 is divided into a left side section 201L and a right side section 201R. The left side section 201L is arranged between the electrode A and the electrode M. The right side section 201R is arranged between the electrode M and the electrode B.

The restriction film portion 202 is made of polyimide, and is formed of a band which is extended in a left-right direction. The restriction film portion 202 is fixed to a surface which is opposite to the side of the base material film 200a (namely, rear surface) in the main body of sensor 201. A contact surface of the main body of sensor 201 with the restriction film portion 202 corresponds to a back surface of the present invention. The restriction film portion 202 is included in the restriction member of the present invention.

The connector 203 is connected with a left hand of the electrode film portion 200. As mentioned before, the connector 203 is connected with the electrodes A, M and B by the wire. The bridge circuit 21 and the amplifier 22 are formed as a single component constitutionally. The bridge circuit 21 and the amplifier 22 are connected with a left hand of the connector 203.

Next, an arrangement of the left front door sensor unit 3AL which is built in the left front door 91L will be explained in detail. By the way, an arrangement, a constitution, a movement, an action and an effect of the left rear door sensor unit 4AL which is built in the left rear door 92L, the right front door sensor unit 3AR which is built in the right front door 91R and the right rear door sensor unit 4AR which is built in the right rear door 92R are the same as those of the left front door sensor unit 3AL. Therefore, only the left front door sensor unit 3AL will be explained as follows, and this explanation doubles as an explanation about the left rear door sensor unit 4AL, the right front door sensor unit 3AR and the right rear door sensor unit 4AR.

Figure 9:
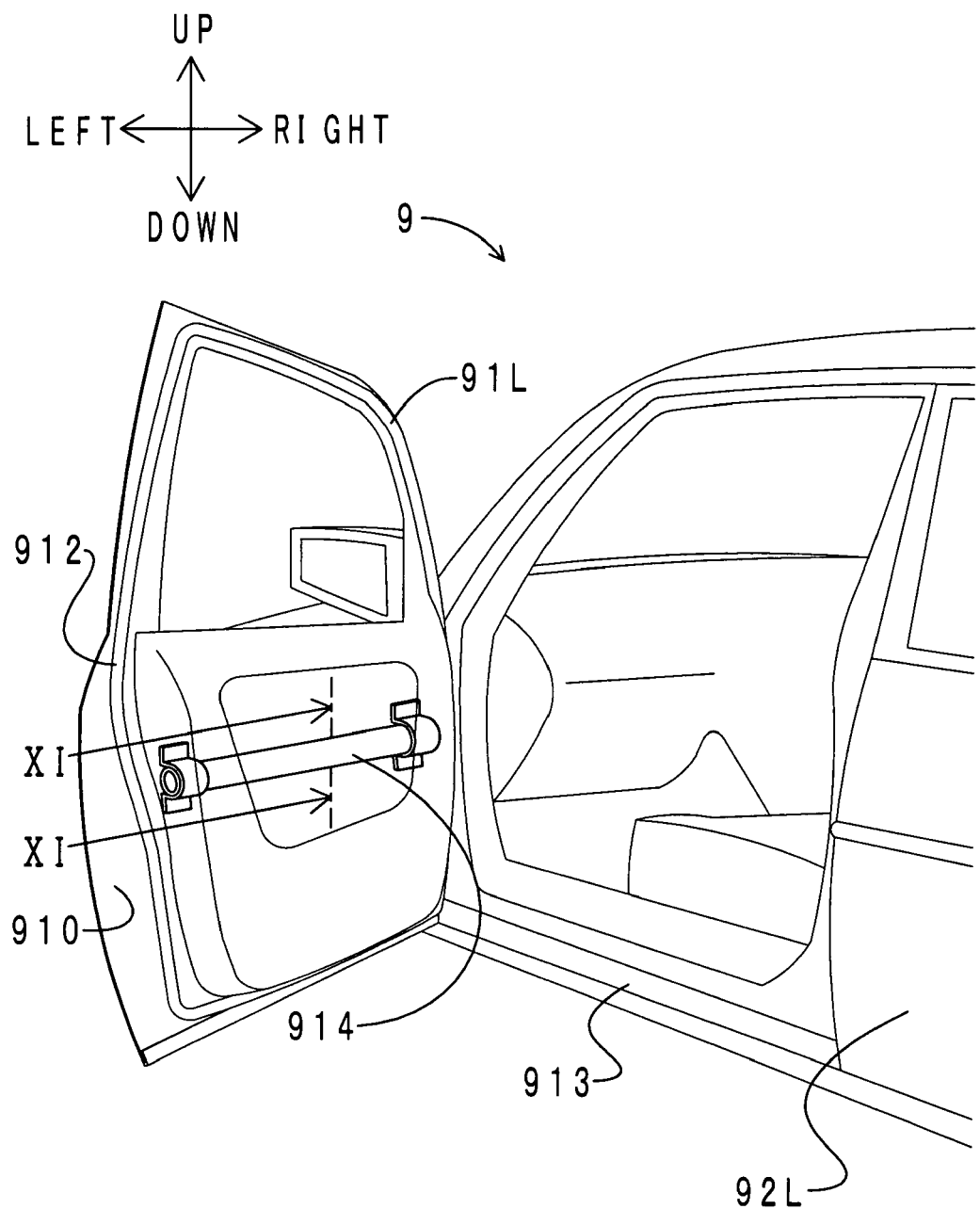
FIG. 9 is a transmitted perspective view near a left front door of the vehicle at the time of opening the door.

FIG. 9 is a transmitted perspective view near the left front door 91L of the vehicle 9 at the time of opening the door. By the way, as a matter of convenience for explanation, a side impact protection beam 914 is shown as a heavy line. As shown in FIG. 9, the side impact protection beam 914 is extended in a front-rear direction in an internal space of the left front door 91L. The left front door sensor unit 3AL is arranged on an outer peripheral surface of the side impact protection beam 914.

Figure 10:
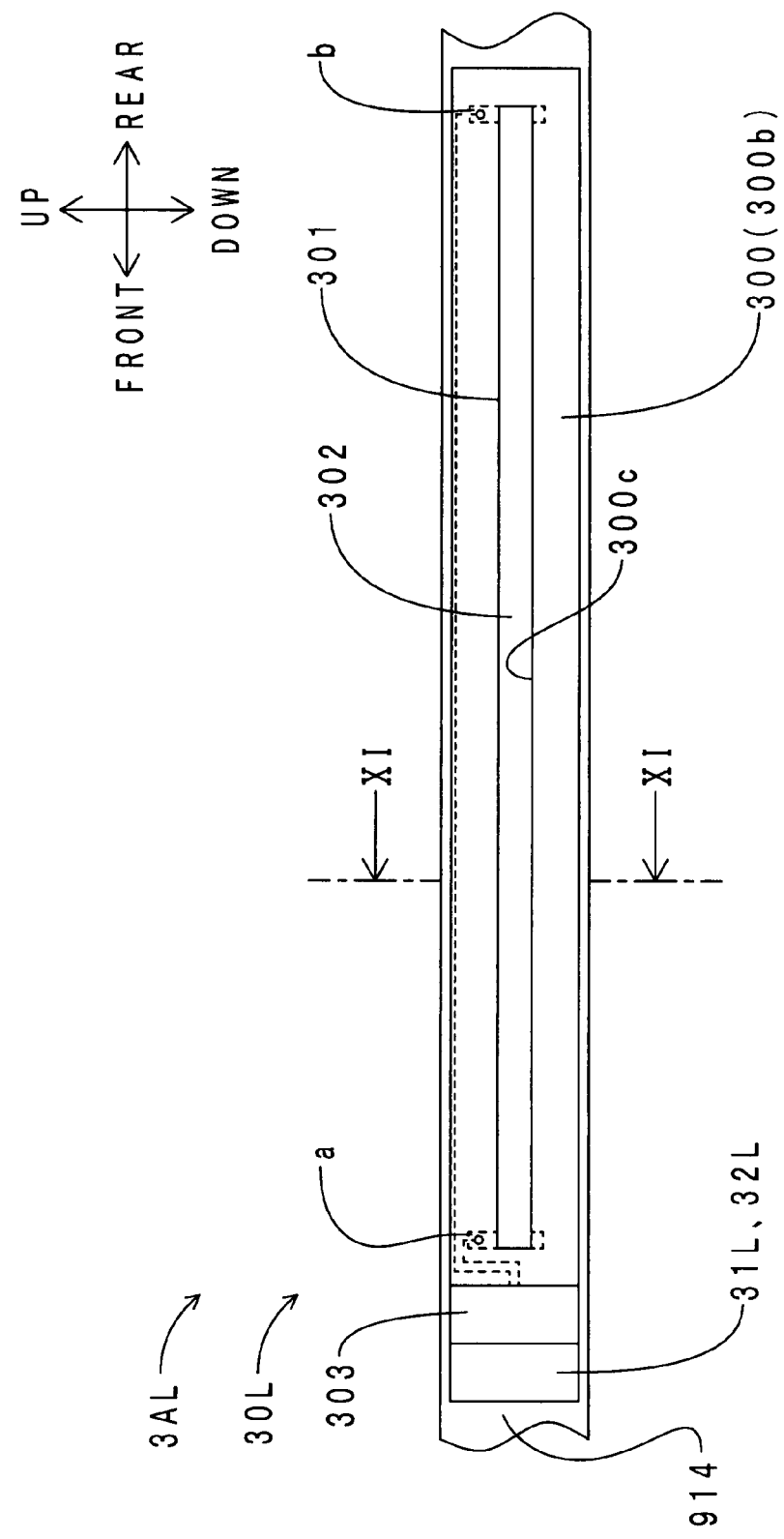
FIG. 10 is a back side back view of a front door outer panel of the left front door of the vehicle.
Figure 11:
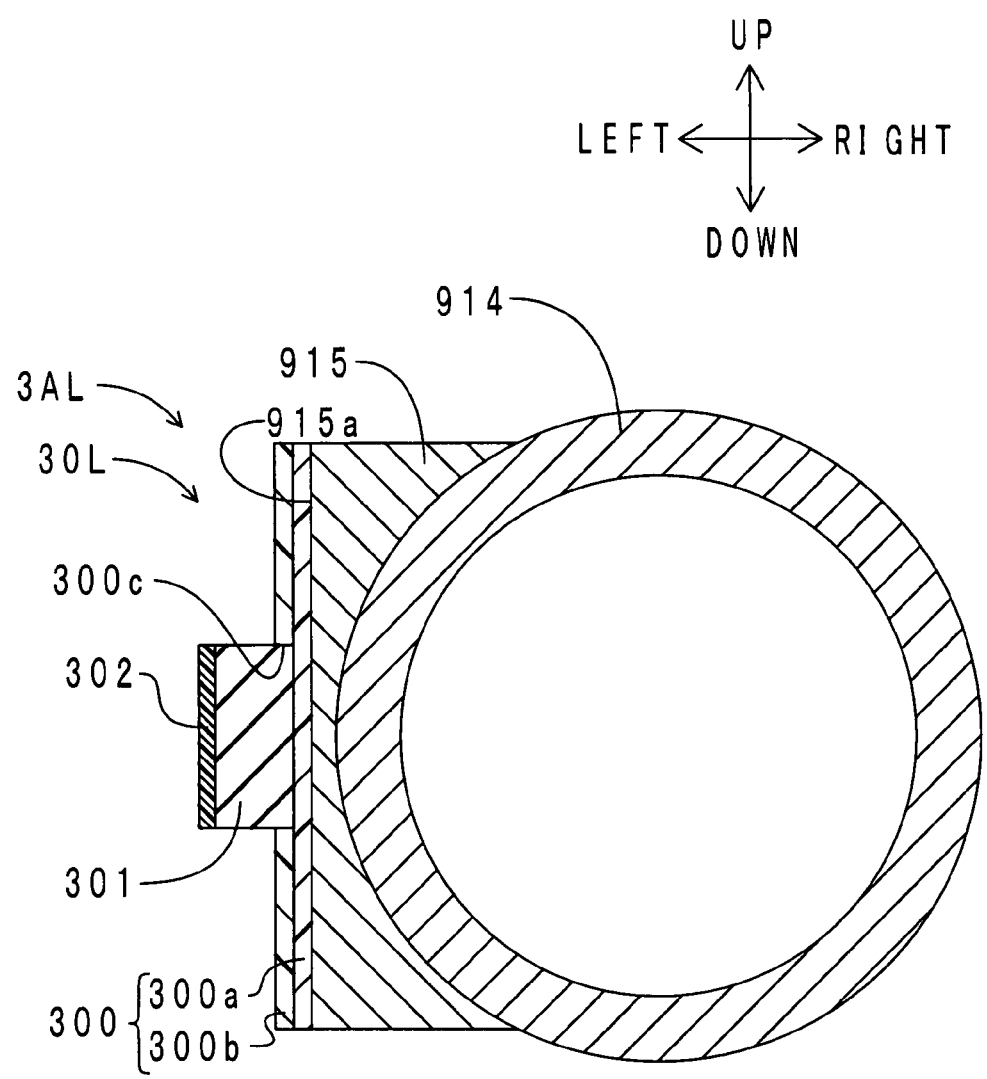
FIG. 11 is a XI-XI cross sectional view of FIGS. 9 and 10.

FIG. 10 is a front view of the side impact protection beam 914 (view in which the vehicle 9 is seen from a left side). FIG. 11 is a XI-XI cross sectional view of FIGS. 9 and 10. As shown in FIGS. 10 and 11, the side impact protection beam 914 is made of high-strength steel, and is formed of a cylinder. At the left side of the outer peripheral surface of the side impact protection beam 914, a sensor seat 915 is fixed. The sensor seat 915 is made of aluminum alloy, and is formed of a long-sheet block which is extended in a front-rear direction. A top surface (left surface) 915a of the sensor seat 915 is formed of a plane surface. The left front door sensor unit 3AL is fixed to the top surface 915a of the sensor seat 915.

Next, a constitution of the left front door sensor unit 3AL will be explained. The difference between the construction of the left front door sensor unit 3AL and the construction of the front bumper sensor unit 2A is that two electrodes instead of three electrodes are arranged.

Namely, the left front door sensor unit 3AL has a left front door sensor 30L, a bridge circuit 31L and an amplifier 32L. Among them, the left front door sensor 30L is included in the first deformation sensor of the present invention.

The left front door sensor 30L has an electrode film portion 300, a main body of sensor 301, a restriction film portion 302 and a connector 303. The electrode film portion 300 has a base material film 300a and a cover film 300b. The base material film 300a is made of polyimide, and is formed of a band which is extended in a front-rear direction. The base material film 300a is fixed to the top surface 915a of the sensor seat 915. The cover film 300b is made of polyimide, and is formed of a band which is extended in a front-rear direction. The cover film 300b covers a surface (left surface) of the base material film 300a. At the center of the cover film 300b in a width direction (up-down direction), a rectangular long hole 300c which is extended in a front-rear direction is opened.

The main body of sensor 301 is formed of a long-sheet plate which is extended in a front-rear direction. The main body of sensor 301 is fixed to the surface of the base material film 300a in such a state that the main body of sensor 301 is accommodated in the long hole 300c of the cover film 300b. A contact surface of the main body of sensor 301 with the base material film 300a corresponds to a fixed surface of the present invention. The material of the main body of sensor 301 is same as the material of the main body of sensor 201.

An electrode a is installed to a front end of the main body of sensor 301, and an electrode b is installed to a rear end thereof, respectively. As explained in detail, the electrodes a and b are made of metal respectively, and they are formed of a strip which is extended up and down. The electrodes a and b are disposed between the main body of sensor 301 and the base material film 300a, and between the cover film 300b and the base material film 300a. The electrodes a and b are connected with the connector 303 respectively by a wire. Each wire is disposed between the cover film 300b and the base material film 300a, respectively.

The restriction film portion 302 is made of polyimide, and is formed of a band which is extended in a left-right direction. The restriction film portion 302 is fixed to a surface which is opposite to the side of the base material film 300a (namely, left surface) in the main body of sensor 301. A contact surface of the main body of sensor 301 with the restriction film portion 302 corresponds to a back surface of the present invention. The restriction film portion 302 is included in the restriction member of the present invention.

The connector 303 is connected with the front of the electrode film portion 300. As mentioned before, the connector 303 is connected with the electrodes a and b by the wire. The bridge circuit 31L and the amplifier 32L are formed as a single component constitutionally. The bridge circuit 31L and the amplifier 32L are connected with the front of the connector 303.

Figure 12:
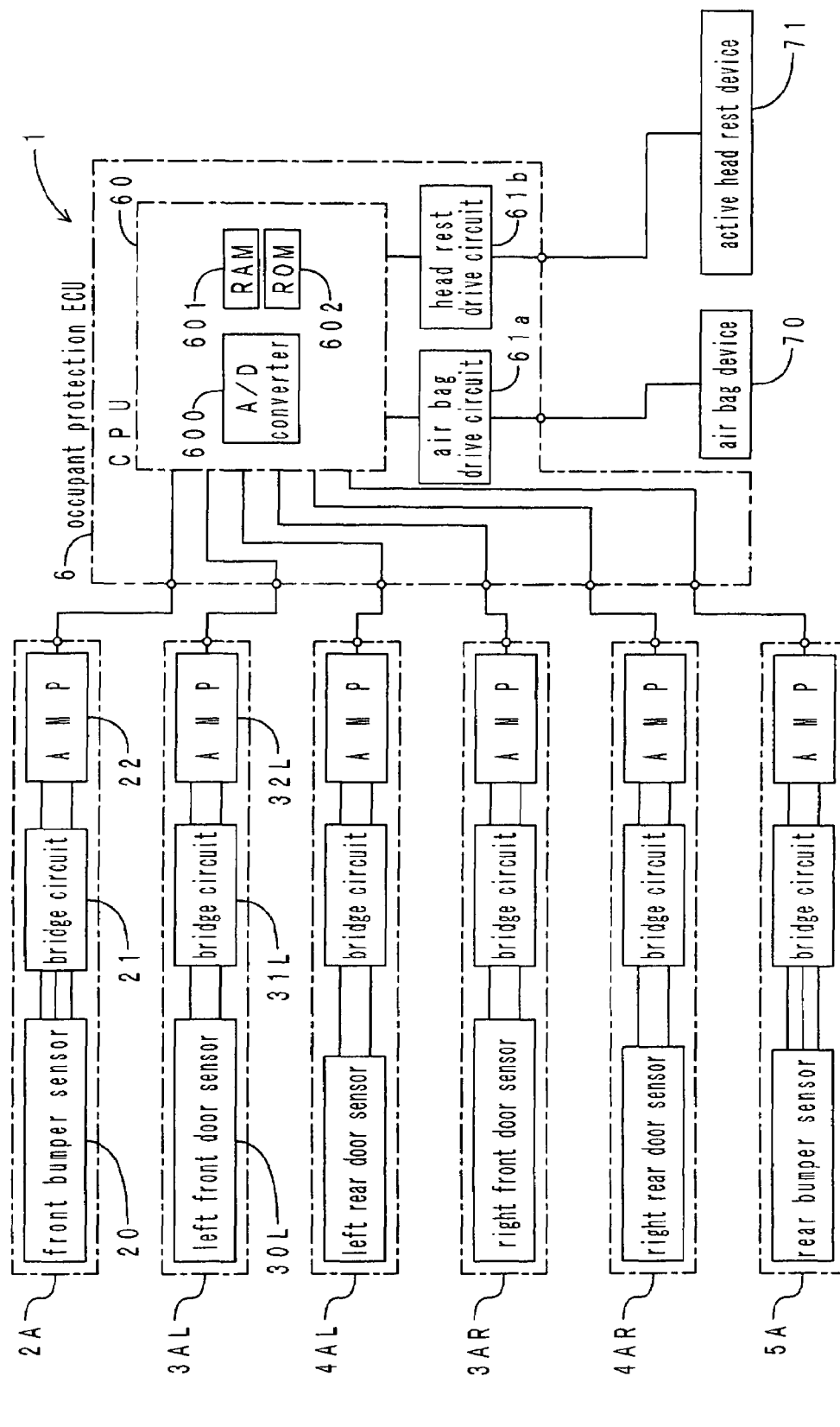
FIG. 12 is a block diagram of an occupant protection system of the first preferred embodiment.

Next, an electric constitution of the occupant protection system of this preferred embodiment will be explained in detail. FIG. 12 is a block diagram of the occupant protection system of this preferred embodiment. As shown in FIG. 12, an occupant protection system 1 of this preferred embodiment has the front bumper sensor unit 2A, the left front door sensor unit 3AL, the left rear door sensor unit 4AL, the right front door sensor unit 3AR, the right rear door sensor unit 4AR, the rear bumper sensor unit 5A, the occupant protection ECU 6, an air bag device 70 an and an active head rest device 71.

Figure 13:
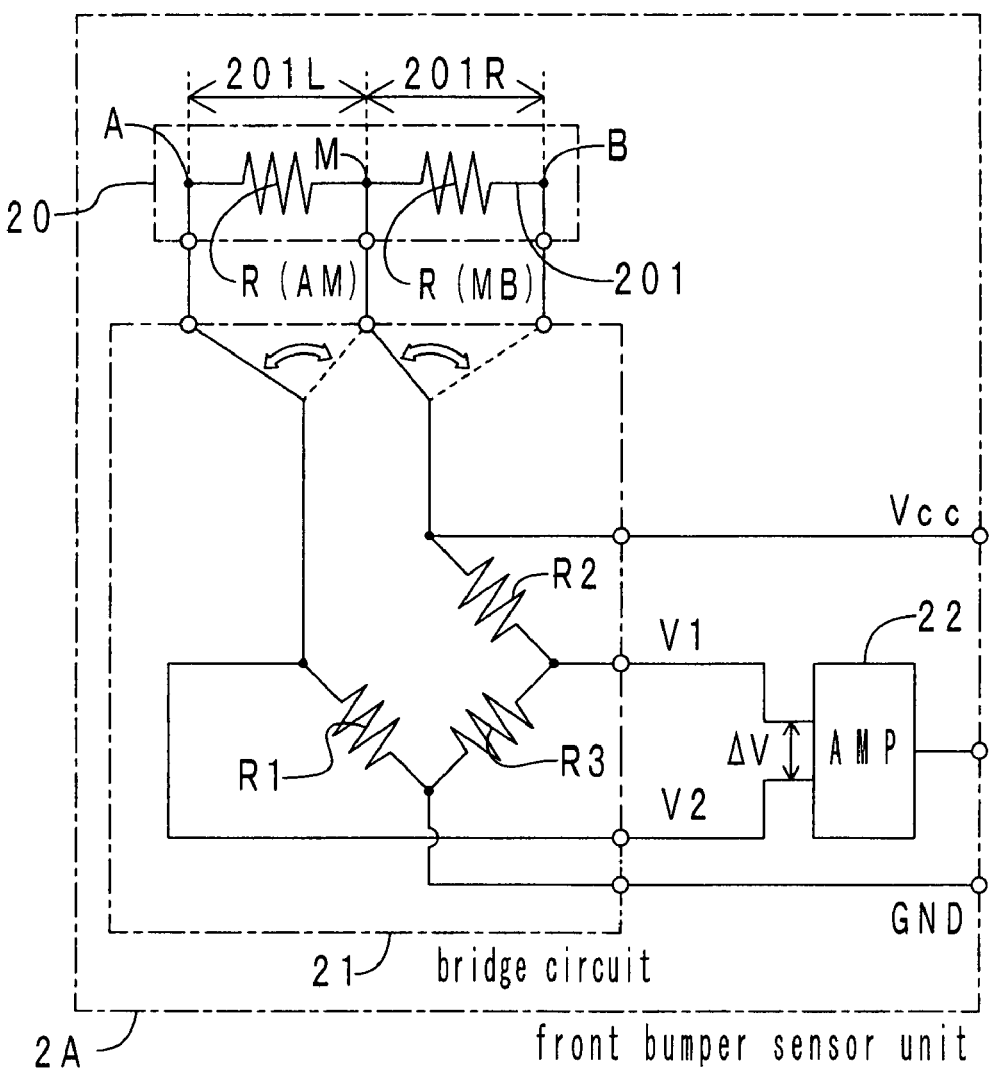
FIG. 13 is a circuit diagram of a front bumper sensor unit.

As mentioned before, the front bumper sensor unit 2A has the front bumper sensor 20, the bridge circuit 21 and the amplifier 22. FIG. 13 is a circuit diagram of the front bumper sensor unit 2A. As shown in FIG. 13, the main body of sensor 201 of the front bumper sensor 20 is divided into the left side section 201L and the right side section 201R. The left side section 201L is arranged between the electrode A and the electrode M. The right side section 201R is arranged between the electrode M and the electrode B. The left side section 201L is equivalent to a resistance R (AM), and the right side section 201R is equivalent to a resistance R (MB).

In the bridge circuit 21, resistances R1 to R3 are arranged. A Wheatstone bridge circuit is constituted by the resistances R1 to R3 and the resistance R (AM) or the resistance R (MB). Namely, the resistance R (AM) and the resistance R (MB) are alternately connected with a high potential side of the resistance R1 switchably. At one end of the Wheatstone bridge circuit, a power supply voltage Vcc is supplied. The power supply voltage Vcc is supplied from a 5V power source (not shown in the figure) of the occupant protection ECU 6. Furthermore, the other end of the Wheatstone bridge circuit is grounded (GND).

The power supply voltage Vcc and the resistances R1 to R3 are well-known respectively. On this account, by measuring a potential difference between an intermediate potential V1 which is generated between the resistance R2 and the resistance R3, and an intermediate potential V2 which is generated between the resistance R1 and the resistance R (AM) or the resistance R (MB), the resistance R (AM) of the left side section 201L or the resistance R (MB) of the right side section 201R can be measured substantially.

The intermediate potentials V1 and V2 are inputted into the amplifier 22. The potential difference ΔV between the intermediate potentials V1 and V2 is amplified by the amplifier 22, and it is, inputted as an analogue voltage data into an A/D (analogue/digital) converter 600 of the occupant protection ECU 6.

Figure 14:
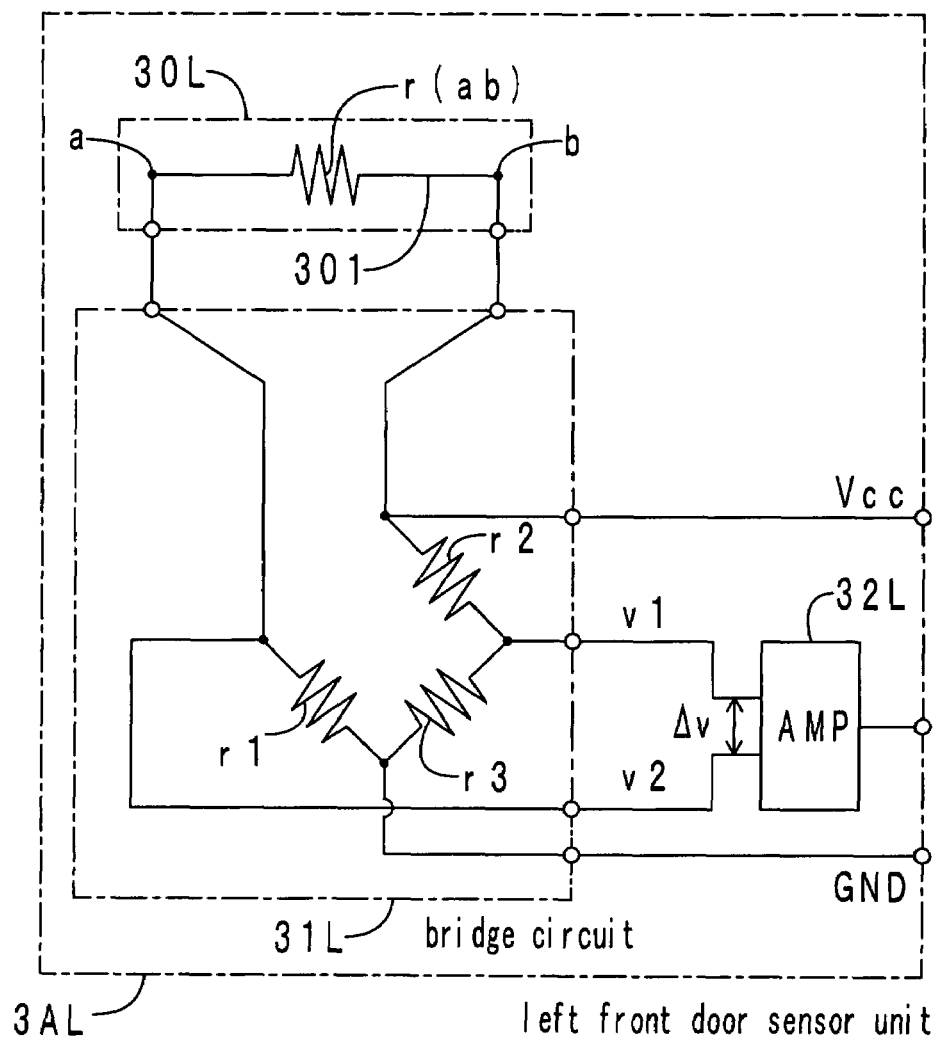
FIG. 14 is a circuit diagram of a left front door sensor unit.

As mentioned before, the left front door sensor unit 3AL has the left front door sensor 30L, the bridge circuit 31L and the amplifier 32L. FIG. 14 is a circuit diagram of the left front door sensor unit 3AL. As shown in FIG. 14, a section ranging from the electrode a to the electrode b of the main body of sensor 301 of the left front door sensor 30L is equivalent to a resistance r (ab).

In the bridge circuit 31L, resistances r1 to r3 are arranged. A Wheatstone bridge circuit is constituted by the resistances r1 to r3 and the resistance r (ab). At one end of the Wheatstone bridge circuit, a power supply voltage Vcc is supplied. The power supply voltage Vcc is supplied from a 5V power source (not shown in the figure) of the occupant protection ECU 6. Furthermore, the other end of the Wheatstone bridge circuit is grounded (GND).

The power supply voltage Vcc and the resistances r1 to r3 are well-known respectively. On this account, by measuring a potential difference between an intermediate potential v1 which is generated between the resistance r2 and the resistance r3, and an intermediate potential v2 which is generated between the resistance r1 and the resistance r (ab), the resistance r (ab) of the main body of sensor 3 can be measured substantially.

The intermediate potentials v1 and v2 are inputted into the amplifier 32L. The potential difference Δv between the intermediate potentials v1 and v2 is amplified by the amplifier 32L, and it is inputted as an analogue voltage data into the A/D converter 600 of the occupant protection ECU 6.

Returning to FIG. 12, the occupant protection ECU 6 has a CPU (central processing unit) 60, an air bag drive circuit 61a and a head rest drive circuit 61b. In the CPU 60, the A/D converter 600, a RAM (random access memory) 601 and a ROM (read only memory) 602 are arranged.

By the A/D converter 600, an analogue voltage data which is inputted from each of the front bumper sensor unit 2A, the left front door sensor unit 3AL, the left rear door sensor unit 4AL, the right front door sensor unit 3AR, the right rear door sensor unit 4AR and the rear bumper sensor unit 5A is converted into a digital data.

The RAM 601 stores the converted digital data temporarily. On the other hand, in the ROM 602, occupant protection programs (an air bag expansion program and a head rest drive program) are previously contained. Concurrently, occupant protection thresholds (an air bag expansion voltage threshold th1, an air bag expansion voltage change rate threshold th2, a head rest drive voltage threshold th3 and a head rest drive voltage change rate threshold th4) are contained. As the air bag expansion voltage threshold th1 and the air bag expansion voltage change rate threshold th2, two kinds of values are contained depending on the kind of collision (a front collision, a side collision) respectively.

The air bag drive circuit 61a is connected with the air bag device 70. By the way, in the vehicle 9, a total of 10 air bag devices such as a left front seat front air bag device, a left front seat side air bag device, a left front seat curtain air bag device, a left rear seat side air bag device, a left rear seat curtain air bag device, a right front seat front air bag device, a right front seat side air bag device, a right front seat curtain air bag device, a right rear seat side air bag device and a right rear seat curtain air bag device are arranged actually. With respect to each of these air bag devices, an air bag drive circuit is arranged individually. Here, as a matter of convenience for explanation, only an optional air bag drive circuit 61a and an optional air bag device 70 are shown.

The air bag drive circuit 61a has a switching element (not shown in the figure). By the air bag drive circuit 61a, a squib (not shown in the figure) of the air bag device 70 generates heat. The heat-generating squib ignites an inflator (not shown in the figure). By an expanded pressure of the ignited inflator, a bag body of the air bag device 70 is swelled in the inside of a vehicle room.

The head rest drive circuit 61b is connected with the active head rest device 71. By the way, in the vehicle 9, a total of 4 active head rest devices such as a left front seat active head rest device, a left rear seat active heat rest device, a right front seat active head rest device and a right rear seat active head rest device are arranged actually. With respect to each of these active head rest devices, a head rest drive circuit is arranged individually. Here, as a matter of convenience for explanation, only an optional head rest drive circuit 61b and an optional active head rest device 71 are shown. The head rest drive circuit 61b is connected with the active head rest device 71.

The head rest drive circuit 61b has a switching element (not shown in the figure). The head rest drive circuit 61b pushes a head rest forward with respect to a seat back by means of a cable which is inserted into a pillar of the head rest (not shown in the figure).

Next, a movement of the occupant protection system 1 of this preferred embodiment will be explained in detail. Firstly, a movement at the time of normal running of the vehicle 9 will be explained. The 5V power source of the occupant protection ECU 6 is connected with each of the front bumper sensor unit 2A, the left front door sensor unit 3AL, the left rear door sensor unit 4AL, the right front door sensor unit 3AR, the right rear door sensor unit 4AR and the rear bumper sensor unit 5A. On this account, as shown in the above-mentioned FIGS. 13 and 14, the power supply voltage Vcc is supplied to the main body of sensor of each sensor unit (for example, 201, 301). At the time of normal running, each main body of sensor is in no load state and a natural length state.

Figure 1:
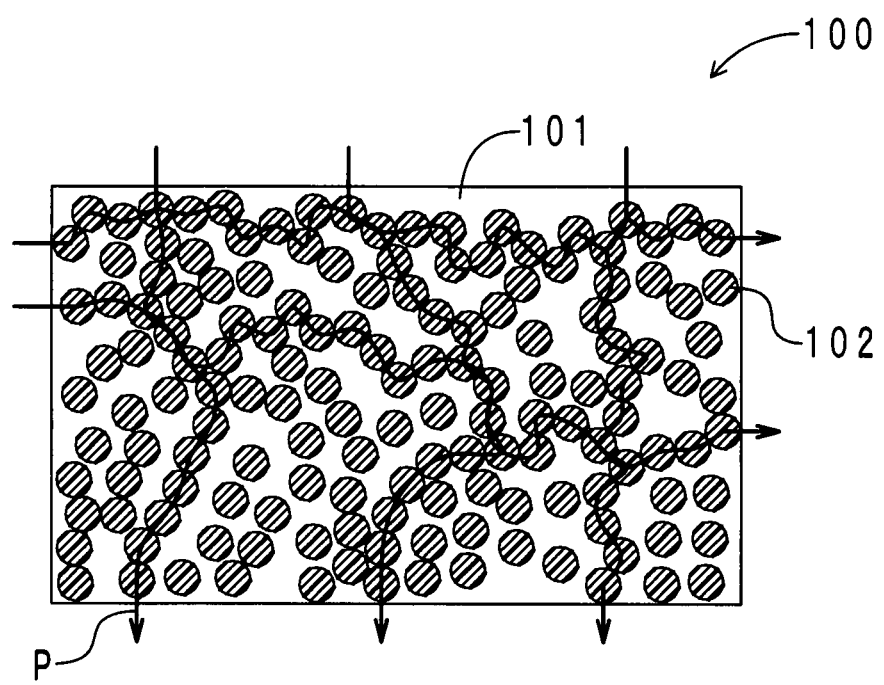
FIG. 1 is a pattern diagram for showing a conductive path of a main body of sensor before applying a load in the present invention.

Here, at the time of normal running, as shown in the above-mentioned FIG. 1, the conductive fillers 102 are blended in the state which is proximate to a closest packing. On this account, a number of conductive paths P are formed. Therefore, the electric resistance of each main body of sensor shows a minimum value.

The potential difference $\Delta V$ between the intermediate potentials V1 and V2 is amplified by the amplifier 22, and the potential difference $\Delta v$ between the intermediate potentials v1 and v2 is amplified by the amplifier 32L, respectively. As shown in the above-mentioned FIG. 12, the respective potential differences are always transmitted to the CPU 60 of the occupant protection ECU 6. Then, they are digitally converted by the A/D converter 600, and stored in the RAM 601 temporarily. On the other hand, as mentioned before, the air bag expansion voltage threshold th1, the air bag expansion voltage change rate threshold th2, the head rest drive voltage threshold th3 and the head rest drive voltage change rate threshold th4 are contained in the ROM 602.

The CPU 60 compares the potential differences (in detail, a potential difference after being amplified and digitally converted, the same applies to the following in this preferred embodiment) $\Delta V$ and $\Delta v$ with the air bag expansion voltage threshold th1, respectively. At the time of normal running, the potential difference $\Delta V$ of the front bumper sensor unit 2A and the air bag expansion voltage threshold th1 (for a front collision) are set to be $\Delta V < th1$. Furthermore, the potential difference $\Delta v$ of each door sensor unit and the air bag expansion voltage threshold th1 (for a side collision) are set to be $\Delta v < th1$. Concurrently, the CPU 60 compares the potential difference $\Delta V$ with the head rest drive voltage threshold th3. At the time of normal running, the potential difference $\Delta V$ of the rear bumper sensor unit 5A and the head rest drive voltage threshold th3 are set to be $\Delta V < th3$.

Furthermore, the CPU 60 calculates change rates (=potential difference change differential value (V/ms)) $\Delta V'$ and $\Delta v'$ of potential differences $\Delta V$ and $\Delta v$. Then, it compares change rates $\Delta V'$ and $\Delta v'$ with the air bag expansion voltage change rate threshold th2, respectively. At the time of normal running, the change rate $\Delta V'$ of the front bumper sensor unit 2A and the air bag expansion voltage change rate threshold th2 (for a front collision) are set to be $\Delta V' < th2$. Furthermore, the change rate $\Delta v'$ of each door sensor unit and the air bag expansion voltage change rate threshold th2 (for a side collision) are set to be $\Delta v' < th2$. Concurrently, the CPU 60 compares the change rate $\Delta V'$ with the head rest drive voltage change rate threshold th4. At the time of normal running, the change rate $\Delta V'$ of the rear bumper sensor unit 5A and the head rest drive voltage change rate threshold th4 are set to be $\Delta V' < th4$.

Next, a movement at the time of front collision will be explained. For example, when an object to be collided (not shown in the figure) collides with a left side of the front bumper 90 of the vehicle 9, a shock of the collision is transmitted to the bumper reinforcement 903 by way of the bumper cover 900 and the energy gear absorber 901. On this account, the front wall 903c of the bumper reinforcement 903 is bended and deformed in such a manner that it is dented toward the rear. Therefore, as shown in the above-mentioned FIG. 6, the left side section 201L of the main body of sensor 201 of the front bumper sensor unit 2A is bended and deformed in such a manner that it is dented toward the rear. As shown in the above-mentioned FIG. 13, when the left side section 201L is bended and deformed, an electric resistance value of the resistance R (AM) increases.

Figure 2:
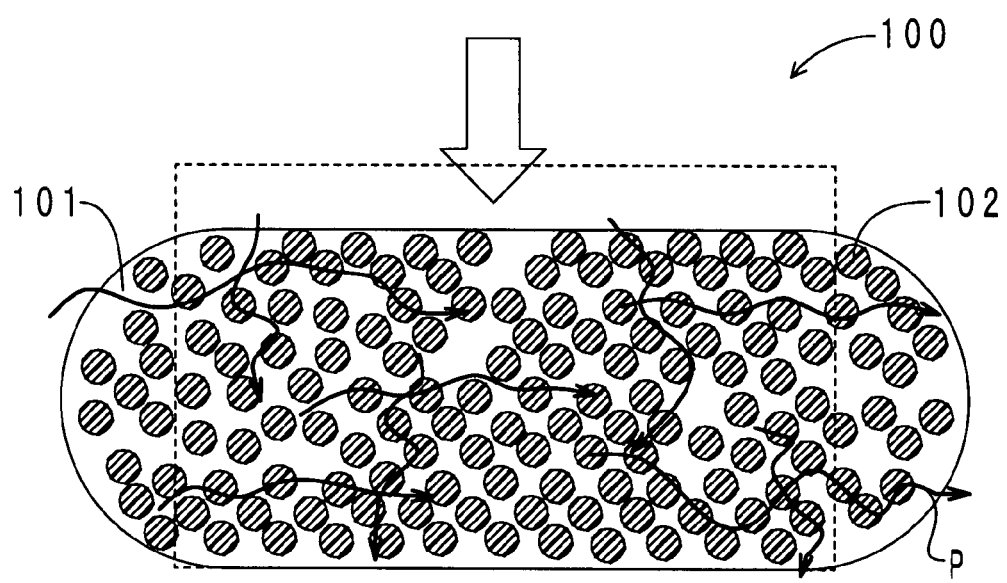
FIG. 2 is a pattern diagram for showing the conductive path of the main body of sensor after applying the load.
Figure 3:
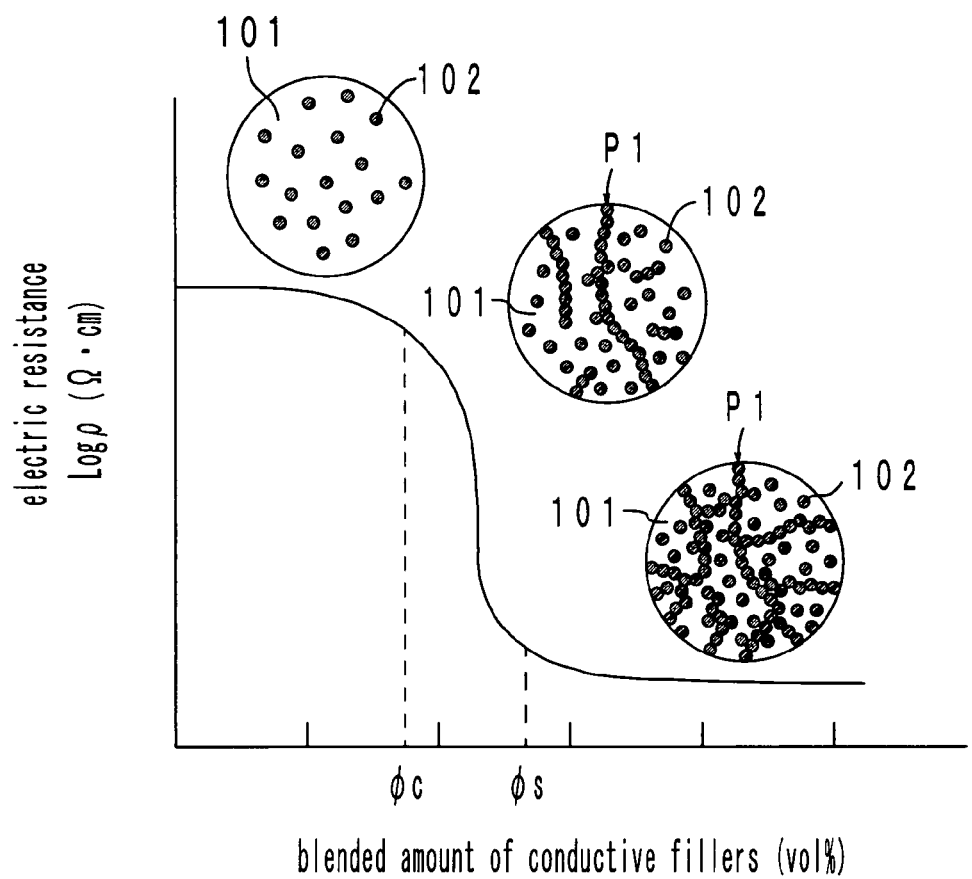
FIG. 3 is a pattern diagram of a percolation curve in an elastomer composition.

As explained in detail, at the time of front collision, as shown in the above-mentioned FIG. 2, the conductive fillers 102 are rebounded against each other. On this account, the conductive path P collapses. Therefore, the electric resistance value of the resistance R (AM) increases with respect to the time of normal running.

In addition, as shown in the above-mentioned FIGS. 6 and 8, the restriction film portion 202 is fixed to the surface of the main body of sensor 201. On this account, an extension deformation near the surface (rear surface) of the main body of sensor 201 due to collision is restricted by the restriction film portion 202. Concretely, the extension deformation near the surface of the main body of sensor 201 is controlled by the restriction film portion 202, and the main body of sensor 201 is subjected to a shear deformation. Therefore, a deformation amount of the left side section 201L further increases with respect to the time of normal running. Thus, since both surfaces of the main body of sensor 201 are restricted, large distortion concentration is induced, and the electric resistance value of the resistance R (AM) further increases.

When the electric resistance value of the resistance R (AM) increases, a voltage dropping amount of the power supply voltage Vcc at the time of passing through the resistance R (AM) increases. Therefore, as compared with the time of normal running, the intermediate potential V2 decreases.

When the intermediate potential V2 decreases, and the potential difference $\Delta V$ and the air bag expansion voltage threshold th1 are set to be $\Delta V \geq th1$, and also the change rate $\Delta V'$ and the air bag expansion voltage change rate threshold th2 are set to be $\Delta V' \leq -th2$, the switching element of the air bag drive circuit 61a is turned on. On this account, a bag body of the air bag device 70 is swelled in the inside of a vehicle room. Concretely, when an occupant is seated only on a right front seat (a driving seat), a bag body of the right front seat front air bag device is swelled in the inside of the vehicle room. Furthermore, when occupants are seated on the right front seat and a left front seat (a passenger seat), each bag body of the right front seat front air bag device and the left front seat front air bag device is swelled in the inside of the vehicle room. By the way, each movement of the occupant protection system 1 at the time of front collision (right side), leftward collision and rightward collision is the same as the above-mentioned movement at the time of front collision (left side). Therefore, here, an explanation thereof will be omitted.

Next, a movement at the time of rear collision will be explained. For example, when an object to be collided (not shown in the figure) collides with a left side of the rear bumper 93 of the vehicle 9, a left side section of a main body of sensor of a rear bumper sensor (not shown in the figure) is bended and deformed in such a manner that it is dented toward the front, which is the same as that at the time of the above-mentioned front collision. Therefore, the electric resistance value of the left side section increases. As shown in the above-mentioned FIG. 13, when the electric resistance value of the left side section increases, the intermediate potential V2 decreases, as compared with the time of normal running.

When the intermediate potential V2 decreases, and the potential difference $\Delta V$ and the head rest drive voltage threshold th3 are set to be $\Delta V \geq th3$, and also the change rate $\Delta V'$ and the head rest drive voltage change rate threshold th4 are set to be $\Delta V' \geq th4$, the active head rest device 71 is driven by the head rest drive circuit 61b. Namely, the head rest drive circuit 61b pushes a head rest forward with respect to a seat back by means of a cable which is inserted into a pillar of the head rest (not shown in the figure). Concretely, when an occupant is seated only on the right front seat, the right front seat active head rest device is driven. Furthermore, when occupants are seated on the right front seat and the left front seat, the right front seat active head rest device and the left front seat active head rest device are driven.

Next, an action and an effect of the deformation sensor of this preferred embodiment will be explained. As shown in the above-mentioned FIG. 4, each sensor unit is arranged in the shock transmission member which is built in the vehicle 9 and to which a shock at the time of collision is transmitted. On this account, it is possible to detect the collision quickly and accurately. Furthermore, each sensor unit is arranged in more inside than an exterior member of the vehicle, so it is hardly damaged. In addition, each sensor is arranged over an approximately whole periphery of the vehicle 9. Therefore, a collision from the front, the rear and the side can be detected in full.

Moreover, as shown in the above-mentioned FIG. 6, the main body of sensor 201 of the front bumper sensor 20 is divided into the left side section 201L and the right side section 201R by means of the electrodes A, B and M. On this account, the position where a shock is applied is specified, and it is possible to judge a collision per each section independently.

Besides, when an ignition switch of the vehicle 9 is turned on to actuate an engine, a current is flowed into each sensor unit to be a current-carrying condition constantly. Due to this, an operation diagnosis can be easily carried out.

Additionally, in this preferred embodiment, by inputting the potential difference itself into the occupant protection ECU 6, the collision judge is carried out. On this account, as compared with the case in which a potential difference is once converted into an electric resistance, and then, a collision judge is carried out, it can be shorten the time from a collision to the driving of the air bag device 70 and the active head rest device 71.

Furthermore, as compared with the case in which a collision judge is carried out by using an acceleration sensor, misjudging decreases. Namely, in case of an acceleration, it is considered that a rapid change generates, not by a collision, for example, when a vehicle climbs over a step and so on. On the contrary, the deformation sensor of this preferred embodiment can surely detect a deformation of the vehicle 9 which is generated inevitably as it were, with respect to a phenomenon such as a collision. On this account, as compared with the case in which the collision judge is carried out by using the acceleration sensor, misjudging decreases. In addition, since misjudging decreases, it is possible to suppress that a circuit constitution is complicated.

In addition, the active head rest device 71 is driven by the rear bumper sensor unit 5A. Due to this, as compared with the system in which an occupant is compressed to a seat back at the time of rear collision, and then, by this as a trigger, the head rest is automatically pushed out, the active head rest device 71 is surely driven without being affected by a posture of the occupant at the seat.

Second Preferred Embodiment

The difference between the first preferred embodiment and this preferred embodiment is that a bridge circuit and an amplifier are shared with respect to all deformation sensors. Therefore, here, only the difference will be explained.

Figure 15:
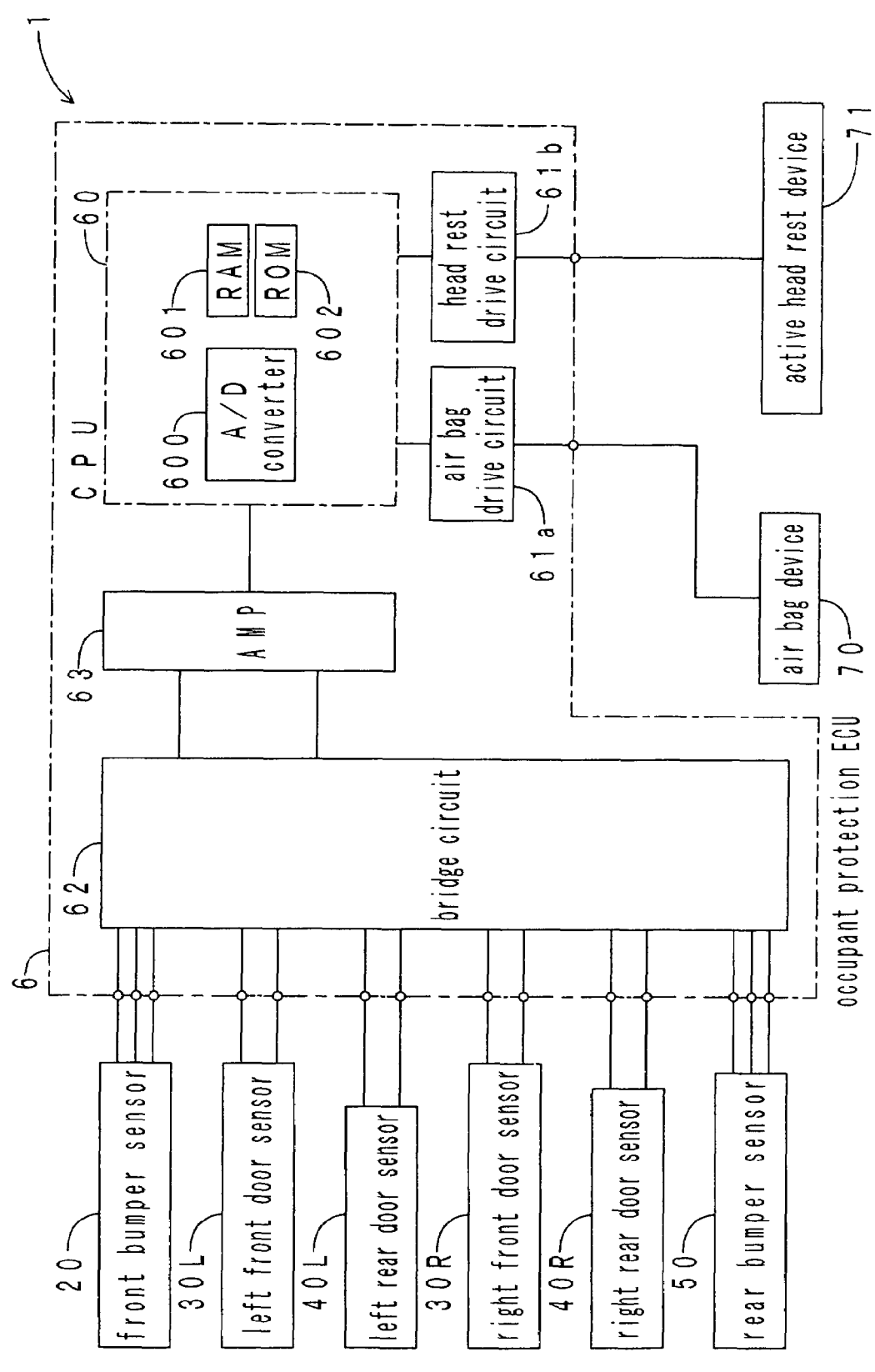
FIG. 15 is a block diagram of an occupant protection system of the second preferred embodiment.

FIG. 15 is a block diagram of an occupant protection system of this preferred embodiment. By the way, portions corresponding to FIG. 12 are indicated as the same symbols. As shown in FIG. 15, a bridge circuit 62 and an amplifier 63 are arranged in an occupant protection ECU 6.

Figure 16:
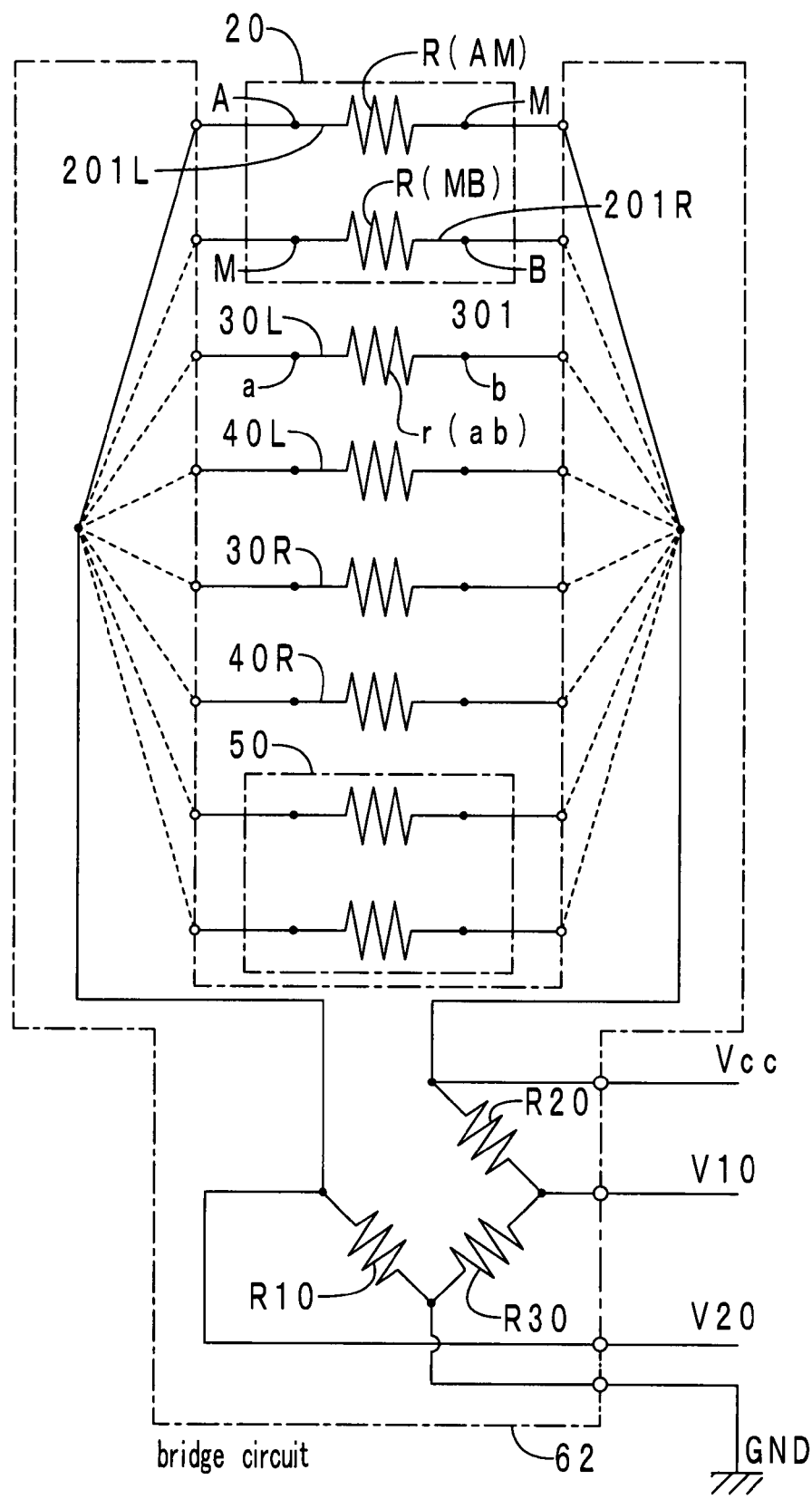
FIG. 16 is a circuit diagram of a bridge circuit of the occupant protection system.

FIG. 16 is a circuit diagram of the bridge circuit 62. As shown in FIG. 16, the bridge circuit 62 is connected with each of a front bumper sensor 20, a left front door sensor 30L, a left rear door sensor 40L, a right front door sensor 30R, a right rear door sensor 40R and a rear bumper sensor 50. These sensors are all included in the first deformation sensor of the present invention. Each sensor constitutes a Wheatstone bridge circuit together with resistances R10 to R30. Each sensor is repeatedly incorporated into the Wheatstone bridge circuit by turns.

In addition, in the front bumper sensor 20, three electrodes A, B and M are arranged (see the above-mentioned FIG. 6). On this account, when the front bumper sensor 20 is incorporated into the Wheatstone bridge circuit, a left side section 201L between electrodes A and M (resistance R (AM)) is connected first, and then, a right side section 201R between electrodes M and B (resistance R (MB)) is connected by turns. Such connection manner is the same as the case of the rear bumper sensor 50. Intermediate potentials V10 and V20 of each sensor are transmitted from the bridge circuit 62 to the amplifier 63. The difference between the intermediate potentials V10 and V20 which is amplified by the amplifier 63 is transmitted to a CPU 60.

The deformation sensor of this preferred embodiment has the same action and effect as those of the deformation sensor of the first preferred embodiment. Furthermore, according to an occupant protection system 1 of this preferred embodiment, the bridge circuit 62 and the amplifier 63 are shared with respect to all deformation sensors. Due to this, the number of components can be decreased. In addition, since a bridge circuit and an amplifier need not to be arranged in a bumper or a door, the space and the weight of the deformation sensor can be reduced. Therefore, the deformation sensor is easily built in a shock transmission member.

Other Preferred Embodiments

As above-described, the preferred embodiments of the first deformation sensor of the present invention are explained. However, the preferred embodiments are not specifically limited to the above two preferred embodiments. It is possible to carry out various kinds of modified embodiments and improved embodiments which can be done by one of skilled in the art.

For example, an arrangement manner of the deformation sensor is not limited to the above preferred embodiments. The deformation sensor can be arranged, for example, in the inside of the crash box 905, in the inside of the front side member 904 and in the inside of the energy absorber 901, as shown in the above-mentioned FIG. 7. Furthermore, the deformation sensor can be arranged in partition plates 903a and 903b, an upper wall 903e and a lower wall 903d of the bumper reinforcement 903. Moreover, the deformation sensor can be arranged not only in the inside of the bumper reinforcement 903 but also in the outside thereof. Thus, when the deformation sensor is built in the shock transmission member, the deformation sensor is more hardly damaged. In addition, in the above preferred embodiments, as shown in the above-mentioned FIG. 11, the left front door sensor unit 3AL is fixed to the side impact protection beam 914 by means of the sensor seat 915. However, the left front door sensor unit 3AL can be directly fixed to an outer peripheral surface or an inner peripheral surface of the side impact protection beam 914 without using the sensor seat 915.

As the shock transmission member, other than the above preferred embodiments, for example, a front torque box, a front floor reinforcement, a roof panel reinforcement, a front body pillar upper outer reinforcement, a front body pillar lower outer reinforcement, a front floor cross member, a locker panel reinforcement, a front floor cross side member, a center body pillar outer reinforcement, a center pillar upper outer reinforcement and so on are used. However, the shock transmission member is not limited to these members only if it is possible to constitute a shock transmission path.

Furthermore, in the above preferred embodiments, a single deformation sensor is arranged in each of a front bumper, a left front door, a left rear door, a right front door, a right rear door and a rear bumper. However, a collision detection in an identical section can be carried out by a number of deformation sensors. Moreover, the number of electrodes which are arranged in the deformation sensor is not limited. According to the deformation sensor of this preferred embodiment, it is possible to detect a deformation per each distance of a pair of electrodes. So, by increasing the number of electrodes, it is possible to improve an accuracy which specifies a collision position. Additionally, when the electrode is fixed to the main body of sensor, it can be fixed by a vulcanized bonding. By doing this, the electrode can be arranged simultaneously with a vulcanized forming of the main body of sensor.

Moreover, a constitution of the main body of sensor is not limited to the above preferred embodiments. This will be explained later. In addition, in the above preferred embodiments, the electrode film portion and the restriction film portion (restriction member) are made of high insulative polyimide (PI). However, such materials are not especially limited. For example, as the restriction member, a resin film such as polyethylene (PE), polyethylene terephthalate (PET) and so on, and a metal plate such as a damping steel sheet and so on, are used. Furthermore, an embodiment in which a restriction member is not arranged can be carried out. Additionally, a base material film to which the main body of sensor is fixed can be a single layer as mentioned in the above preferred embodiment, and also, it can be a complex layer in which a number of films are laminated. Besides, the main body of sensor is directly fixed to the shock transmission member without arranging the fixed member such as a base material film and so on.

Additionally, in the above preferred embodiments, the collision judge is carried out only by the deformation sensor, but it can be carried out by the deformation sensor together with an acceleration sensor. Furthermore, the collision judge can be carried out by inputting an engine rotational number, a vehicle speed and so on. Namely, the deformation sensor of this preferred embodiment can be used by adding-on an existing occupant protection system.

Furthermore, in the above preferred embodiments, the collision judge is carried out based on the value of the potential differences $\Delta V$ and $\Delta v$, and the change rates $\Delta V'$ and $\Delta v'$. However, the collision judge can be carried out by either one of the potential differences and the change rates. Moreover, in the above preferred embodiments, the voltage data is outputted from the deformation sensor, but the electric resistance data can be outputted. In addition, at the time of outputting the data, temperature compensating can be done approximately.

Besides, as the occupant protection device, other than the air bag device, the active head rest device and so on, a seat belt tensioner device and soon can be used. Additionally, the first deformation sensor of the present invention can be used for not only the occupant protection system, but also other systems such as a foot passenger protection system and so on.

(Second Deformation Sensor)

In the following embodiments, the second deformation sensor of the present invention is incorporated in an occupant protection system of automobiles.

Third Preferred Embodiment

Figure 17:
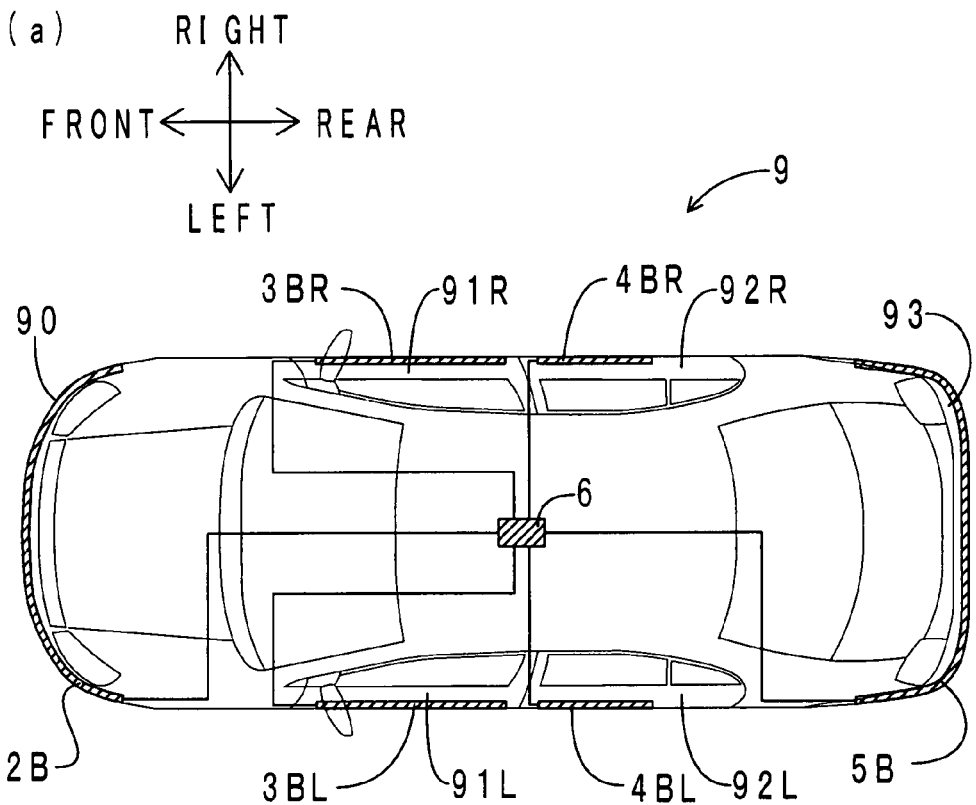
FIG. 17(*a*) is a transmitted upper surface view of a vehicle in which a deformation sensor of the third preferred embodiment is arranged.
Figure 17:
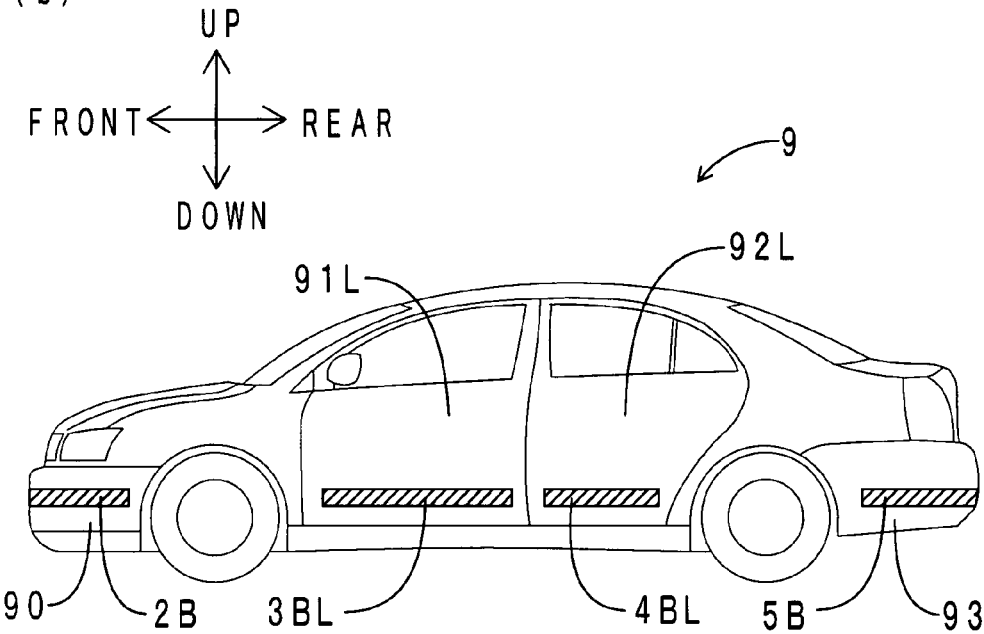

First, an arrangement of the deformation sensor in this preferred embodiment will be explained. FIG. 17 (a) is a transmitted upper surface view of a vehicle in which the deformation sensor is arranged. FIG. 17 (b) is a transmitted lateral view of the vehicle. By the way, portions corresponding to FIG. 4 are indicated as the same symbols.

As shown in FIG. 17, as for the vehicle 9, a front bumper sensor unit 2B is built in a front bumper 90, a left front door sensor unit 3BL is built in a left front door 91L, a left rear door sensor unit 4BL is built in a left rear door 92L, a right front door sensor unit 3BR is built in a right front door 91R, a right rear door sensor unit 4BR is built in a right rear door 92R, and a rear bumper sensor unit 5B is built in a rear bumper 93, respectively (in FIG. 17, as a matter of convenience for explanation, these sensor units are shown as hatching). Furthermore, under an approximately central floor of the vehicle 9, an occupant protection ECU (in FIG. 17, as a matter of convenience for explanation, the occupant protection system is shown as hatching) 6 is buried.

The front bumper sensor unit 2B, the left front door sensor unit 3BL, the left rear door sensor unit 4BL, the right front door sensor unit 3BR, the right rear door sensor unit 4BR, the rear bumper sensor unit 5B and the occupant protection ECU 6 are connected with each other by a harness, respectively.

The front bumper sensor unit 2B and the rear bumper sensor unit 5B are installed along with a left-right direction (vehicle-width direction) of the vehicle respectively. Both of left and right end portions of the front bumper sensor unit 2B and the rear bumper sensor unit 5B are arranged in such a manner that they wraparound the side of the vehicle 9 respectively. The left front door sensor unit 3BL, the left rear door sensor unit 4BL, the right front door sensor unit 3BR and the right rear door sensor unit 4BR are installed along with a front-rear direction of the vehicle respectively.

Next, an arrangement of the front bumper sensor unit 2B which is built in the front bumper 90 will be explained. By the way, an arrangement, a constitution, a movement, an action and an effect of the rear bumper sensor unit 5B which is built in the rear bumper 93 are the same as those of the front bumper sensor unit 2B. Therefore, only the front bumper sensor unit 2B will be explained as follows, and this explanation doubles as an explanation about the rear bumper sensor unit 5B.

Figure 18:
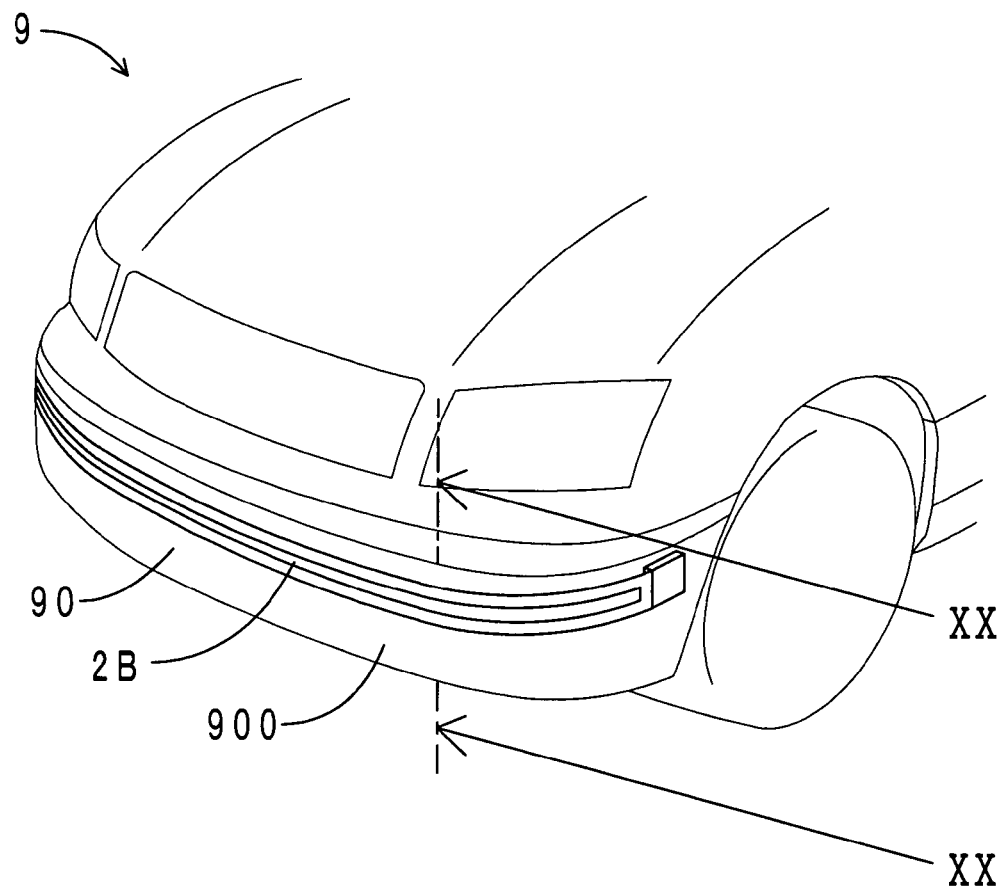
FIG. 18 is a transmitted perspective view near a front bumper of the vehicle.

FIG. 18 is a transmitted perspective view near the front bumper 90 of the vehicle 9. By the way, as a matter of convenience for explanation, the front bumper sensor unit 2B is shown as a heavy line. As shown in FIG. 18, the front bumper sensor unit 2B is arranged along with the back side (rear surface) of a bumper cover 900 of the front bumper 90.

Figure 19:
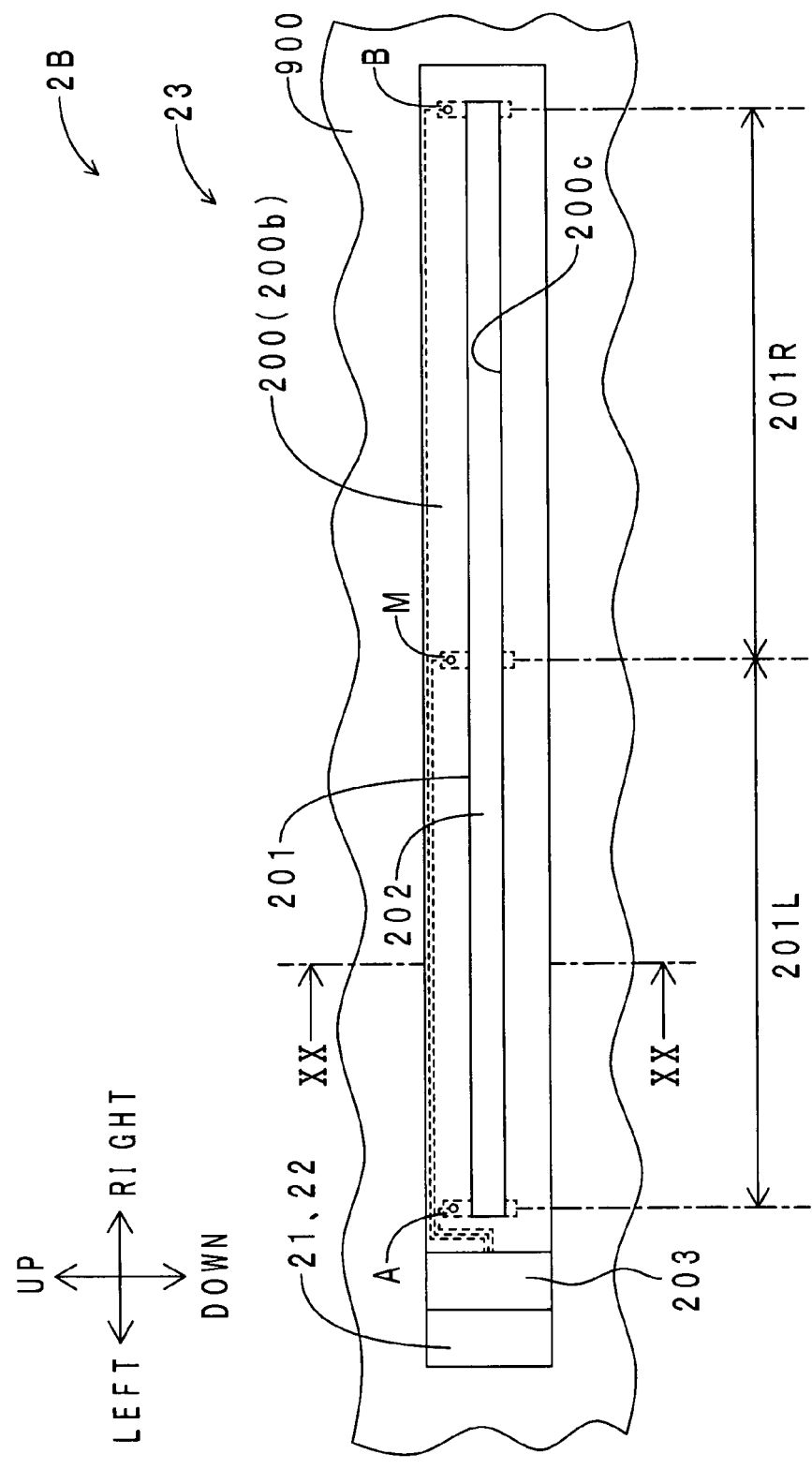
FIG. 19 is a back side back view of a bumper cover of the front bumper of the vehicle.
Figure 20:
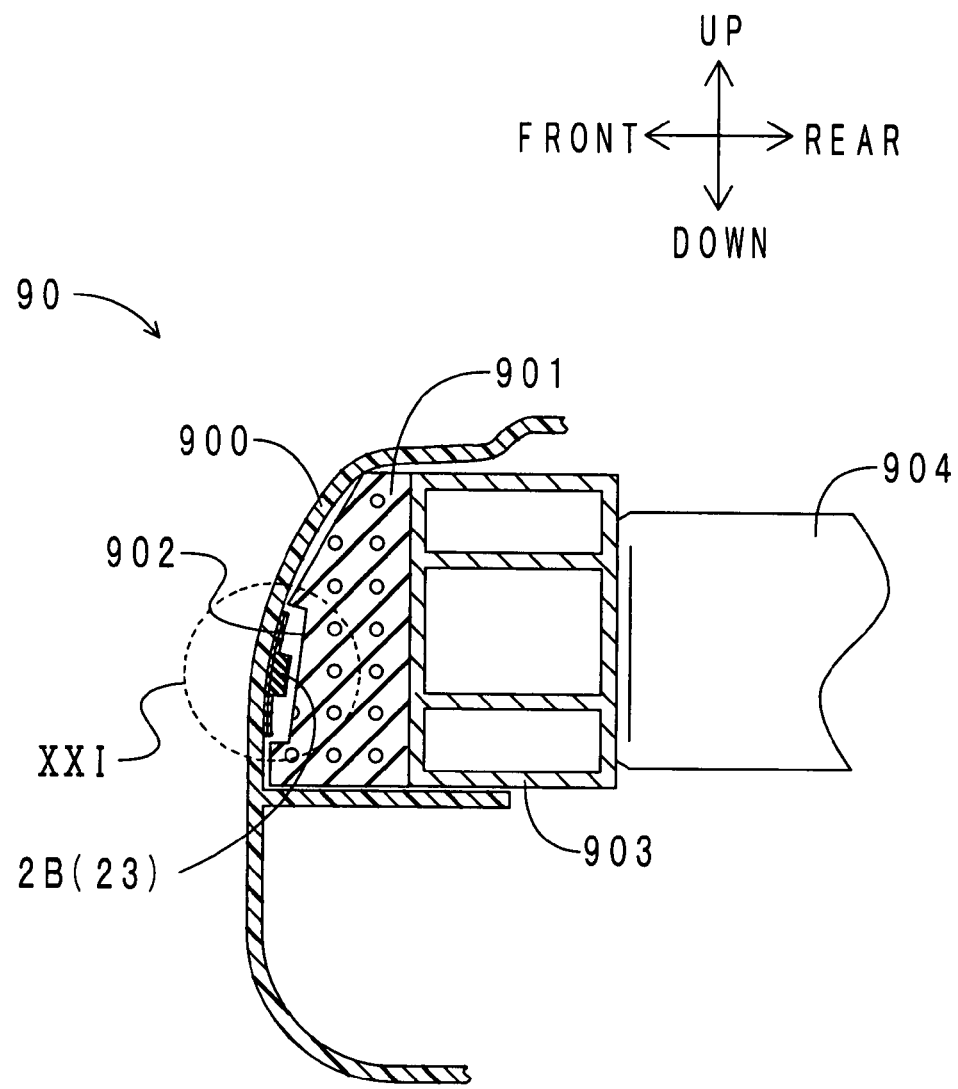
FIG. 20 is a XX-XX cross sectional view of FIGS. 18 and 19.

FIG. 19 is a back side back view of the bumper cover 900. FIG. 20 is a XX-XX cross sectional view of FIGS. 18 and 19. By the way, portions corresponding to FIGS. 6 and 7 are indicated as the same symbols. As shown in FIGS. 19 and 20, the front bumper 90 has the bumper cover 900, an energy absorber 901 and a bumper reinforcement 903.

The bumper reinforcement 903 is made of aluminum alloy, and is formed of a long-sheet square tube. The bumper reinforcement 903 is installed along with a vehicle-width direction. Both of left and right ends of the bumper reinforcement 903 are fixed to a frond end of a front side member 904 made of steel.

The energy absorber 901 is made of foamed PP (polypropylene), and is formed of a long sheet. The energy absorber 901 is extended in a vehicle-width direction. The energy absorber 901 is fixed to a front surface of the bumper reinforcement 903. On the front surface of the energy absorber 901, a groove portion 902 which is extended in a vehicle-width direction is disposed concavely.

The bumper cover 900 is made of an olefin resin, and is formed of a long sheet. The bumper cover 900 is extended in a vehicle-width direction. The bumper cover 900 covers the energy absorber 901.

The front bumper sensor unit 2B is fixed to the potion which is opposite to the groove portion 902 of the energy absorber 901 in the back side of the bumper cover 900. In other words, the front bumper sensor unit 2B is accommodated in the groove portion 902.

Figure 21:
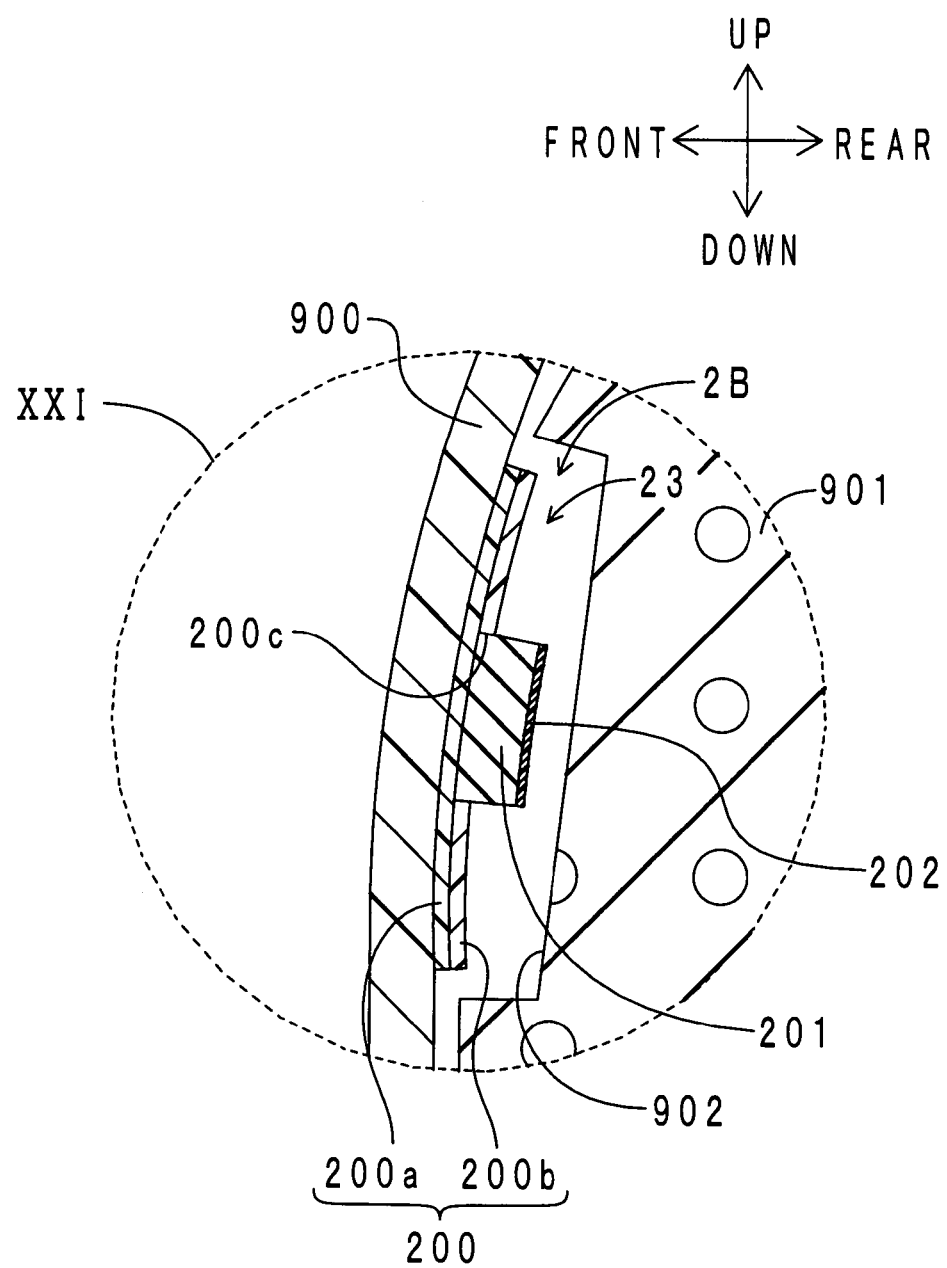
FIG. 21 is an enlarged view in a circle XXI of FIG. 20.

Next, a constitution of the front bumper sensor unit 2B will be explained. FIG. 21 is an enlarged view in a circle XXI of FIG. 20. As shown in FIGS. 19 to 21, the front bumper sensor unit 2B has a front bumper sensor 23, a bridge circuit 21 and an amplifier 22. Among them, the front bumper sensor 23 is included in the second deformation sensor of the present invention.

The front bumper sensor 23 has the same constitution as that of the deformation sensor in the above-mentioned first preferred embodiment, and has an electrode film portion 200, a main body of sensor 201, a restriction film portion 202 and a connector 203. The electrode film portion 200 has a base material film 200a and a cover film 200b. The base material film 200a is made of polyimide, and is formed of a band which is extended in a left-right direction. The base material film 200a is fixed to the back side (rear surface) of the bumper cover 90.

The cover film 200b is made of polyimide, and is formed of a band which is extended in a left-right direction. The cover film 200b covers a surface (rear surface) of the base material film 200a. At the center of the cover film 200b in a width direction (up-down direction), a rectangular long hole 200c which is extended in a left-right direction is opened.

The main body of sensor 201 is formed of a long-sheet plate which is extended in a left-right direction. The main body of sensor 201 is fixed to the surface of the base material film 200a in such a state that the main body of sensor 201 is accommodated in the long hole 200c of the cover film 200b. A contact surface of the main body of sensor 201 with the base material film 200a corresponds to a fixed surface of the present invention.

The main body of sensor 201 comprises an elastomer composite material which is the same as that of the main body of sensor in the above-mentioned first preferred embodiment. An electrode A is installed to a left end of the main body of sensor 201, an electrode B is installed to a right end thereof, and an electrode M is installed between the electrode A and the electrode B, respectively. The electrodes A, B and M are connected with the connector 203 respectively by a wire. By means of the electrodes A, B and M, the main body of sensor 201 is divided into a left side section 201L and a right side section 201R.

The restriction film portion 202 is made of polyimide, and is formed of a band which is extended in a left-right direction. The restriction film portion 202 is fixed to a surface which is opposite to the side of the base material film 200a (namely, rear surface) in the main body of sensor 201. A contact surface of the main body of sensor 201 with the restriction film portion 202 corresponds to a back surface of the present invention. The restriction film portion 202 is included in the restriction member of the present invention.

The connector 203 is connected with a left hand of the electrode film portion 200. As mentioned before, the connector 203 is connected with the electrodes A, M and B by the wire. The bridge circuit 21 and the amplifier 22 are formed as a single component constitutionally. The bridge circuit 21 and the amplifier 22 are connected with a left hand of the connector 203.

Next, an arrangement of the left front door sensor unit 3BL which is built in the left front door 91L will be explained in detail. By the way, an arrangement, a constitution, a movement, an action and an effect of the left rear door sensor unit 4BL which is built in the left rear door 92L, the right front door sensor unit 3BR which is built in the right front door 91R and the right rear door sensor unit 4BR which is built in the right rear door 92R are the same as those of the left front door sensor unit 3BL. Therefore, only the left front door sensor unit 3BL will be explained as follows, and this explanation doubles as an explanation about the left rear door sensor unit 4BL, the right front door sensor unit 3BR and the right rear door sensor unit 4BR.

Figure 22:
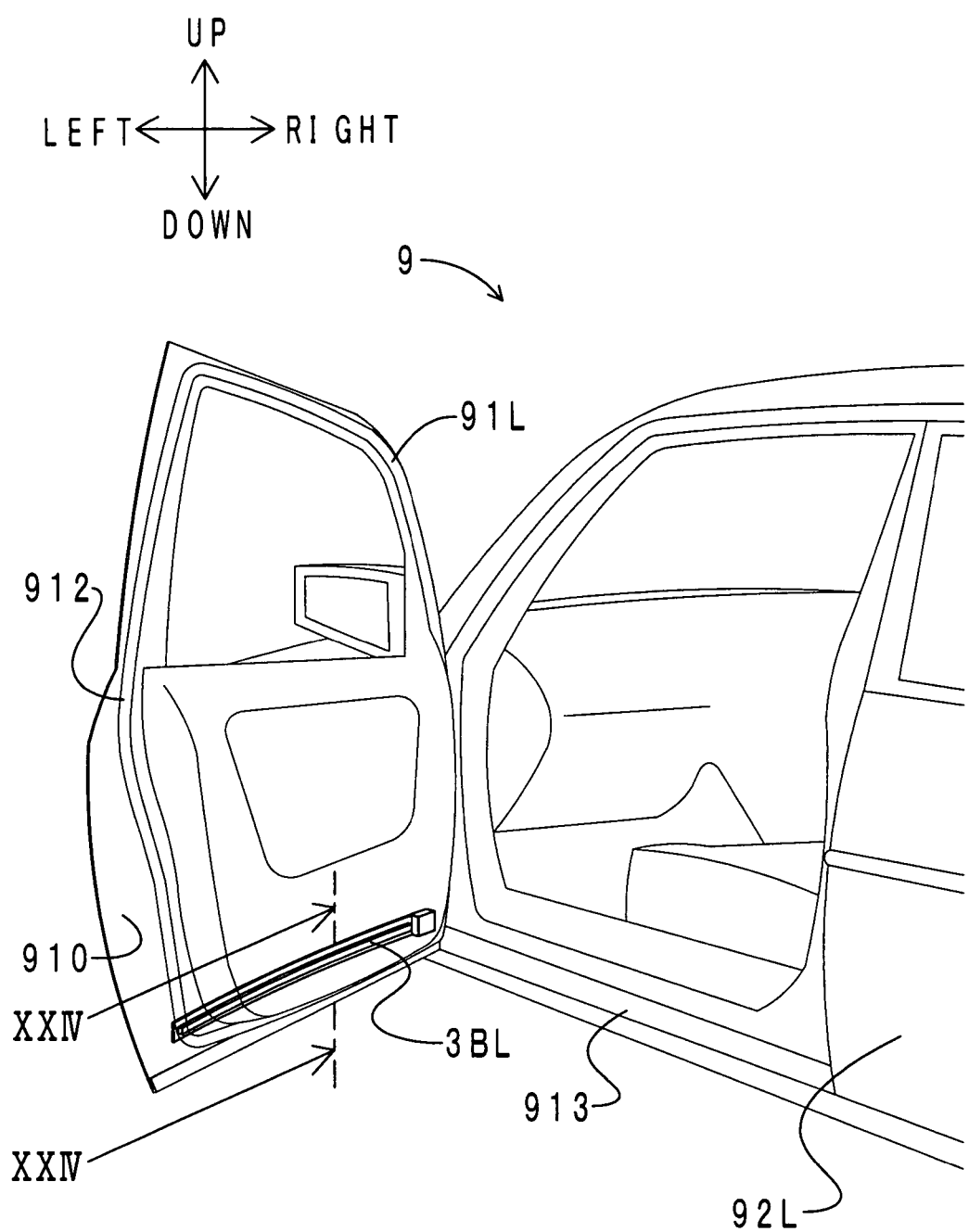
FIG. 22 is a transmitted perspective view near a left front door of the vehicle at the time of opening the door.

FIG. 22 is a transmitted perspective view near the left front door 91L of the vehicle 9 at the time of opening the door. By the way, portions corresponding to FIG. 9 are indicated as the same symbols. Furthermore, as a matter of convenience for explanation, the left front door sensor unit 3BL is shown as a heavy line. As shown in FIG. 22, the left front door sensor unit 3BL is arranged along with the back side (right surface) of a front door outer panel 910 of the left front door 91L.

Figure 23:
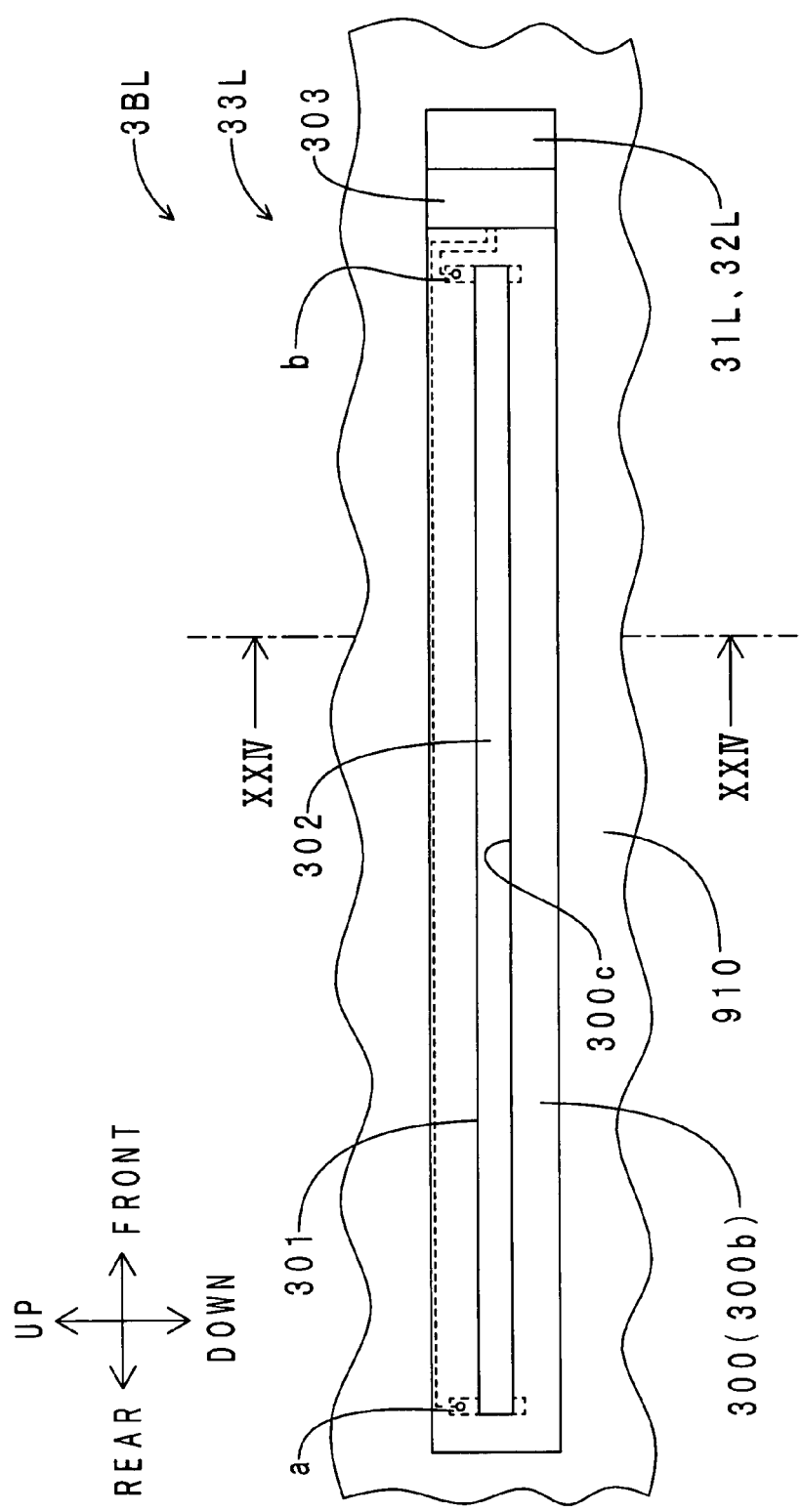
FIG. 23 is a back side back view of a front door outer panel of the left front door of the vehicle.
Figure 24:
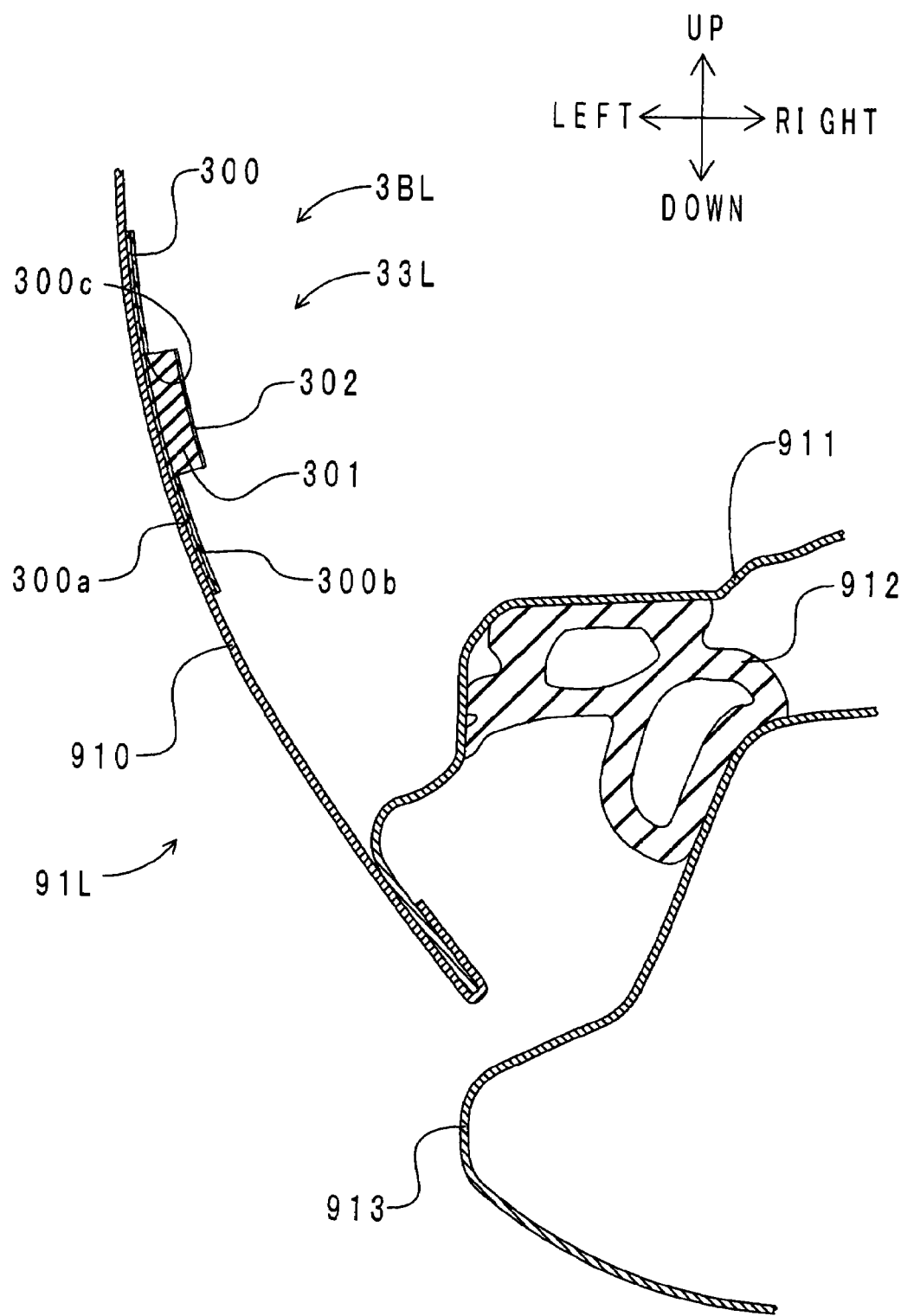
FIG. 24 is a XXIV-XXIV cross sectional view of FIGS. 22 and 23.

FIG. 23 is a back side back view of the front door outer panel 910. By the way, portions corresponding to FIG. 10 are indicated as the same symbols. FIG. 24 is a XXIV-XXIV cross sectional view of FIGS. 22 and 23. As shown in FIGS. 23 and 24, the left front door 91L has the front door outer panel 910, a front door inner panel 911 and an opening weather strip outer 912.

The front door outer panel 910 and the front door inner panel 911 are made of steel plate. A rim of the front door outer panel 910 is connected with a rim of the front door inner panel 911. The opening weather strip outer 912 is made of rubber, and is formed circularly. The opening weather strip outer 912 is fixed along with the rim of the front door inner panel 911. At the time of closing a door, the opening weather strip outer 912 is elastically connected with a side outer panel 913.

The left front door sensor unit 3BL is fixed to the back side of the front door outer panel 910. Namely, the left front door sensor unit 3BL is accommodated in a pouched space which is secured between the front door outer panel 910 and the front door inner panel 911.

Next, a constitution of the left front door sensor unit 3BL will be explained. The difference between the construction of the left front door sensor unit 3BL and the construction of the front bumper sensor unit 2B is that two electrodes instead of three electrodes are arranged.

Namely, the left front door sensor unit 3BL has a left front door sensor 33L, a bridge circuit 31L and an amplifier 32L. Among them, the left front door sensor 33L is included in the second deformation sensor of the present invention.

The left front door sensor 33L has an electrode film portion 300, a main body of sensor 301, a restriction film portion 302 and a connector 303. The electrode film portion 300 has a base material film 300a and a cover film 300b. The base material film 300a is made of polyimide, and is formed of a band which is extended in a front-rear direction. The base material film 300a is fixed to the back side (right surface) of the front door outer panel 910. The cover film 300b is made of polyimide, and is formed of a band which is extended in a front-rear direction. The cover film 300b covers a surface (right surface) of the base material film 300a. At the center of the cover film 300b in a width direction (up-down direction), a rectangular long hole 300c which is extended in a front-rear direction is opened.

The main body of sensor 301 is formed of a long-sheet plate which is extended in a front-rear direction. The main body of sensor 301 is fixed to the surface of the base material film 300a in such a state that the main body of sensor 301 is accommodated in the long hole 300c of the cover film 300b. A contact surface of the main body of sensor 301 with the base material film 300a corresponds to a fixed surface of the present invention. The material of the main body of sensor 301 is same as the material of the main body of sensor 201.

An electrode a is installed to a rear end of the main body of sensor 301, and an electrode b is installed to a front end thereof, respectively. As explained in detail, the electrodes a and b are made of metal respectively, and they are formed of a strip which is extended up and down. The electrodes a and b are disposed between the main body of sensor 301 and the base material film 300a, and between the cover film 300b and the base material film 300a. The electrodes a and b are connected with the connector 303 respectively by a wire. Each wire is disposed between the cover film 300b and the base material film 300a, respectively.

The restriction film portion 302 is made of polyimide, and is formed of a band which is extended in a left-right direction. The restriction film portion 302 is fixed to a surface which is opposite to the side of the base material film 300a (namely, right surface) in the main body of sensor 301. A contact surface of the main body of sensor 301 with the restriction film portion 302 corresponds to a back surface of the present invention. The restriction film portion 302 is included in the restriction member of the present invention.

The connector 303 is connected with the front of the electrode film portion 300. As mentioned before, the connector 303 is connected with the electrodes a and b by the wire. The bridge circuit 31L and the amplifier 32L are formed as a single component constitutionally. The bridge circuit 31L and the amplifier 32L are connected with the front of the connector 303.

Figure 25:
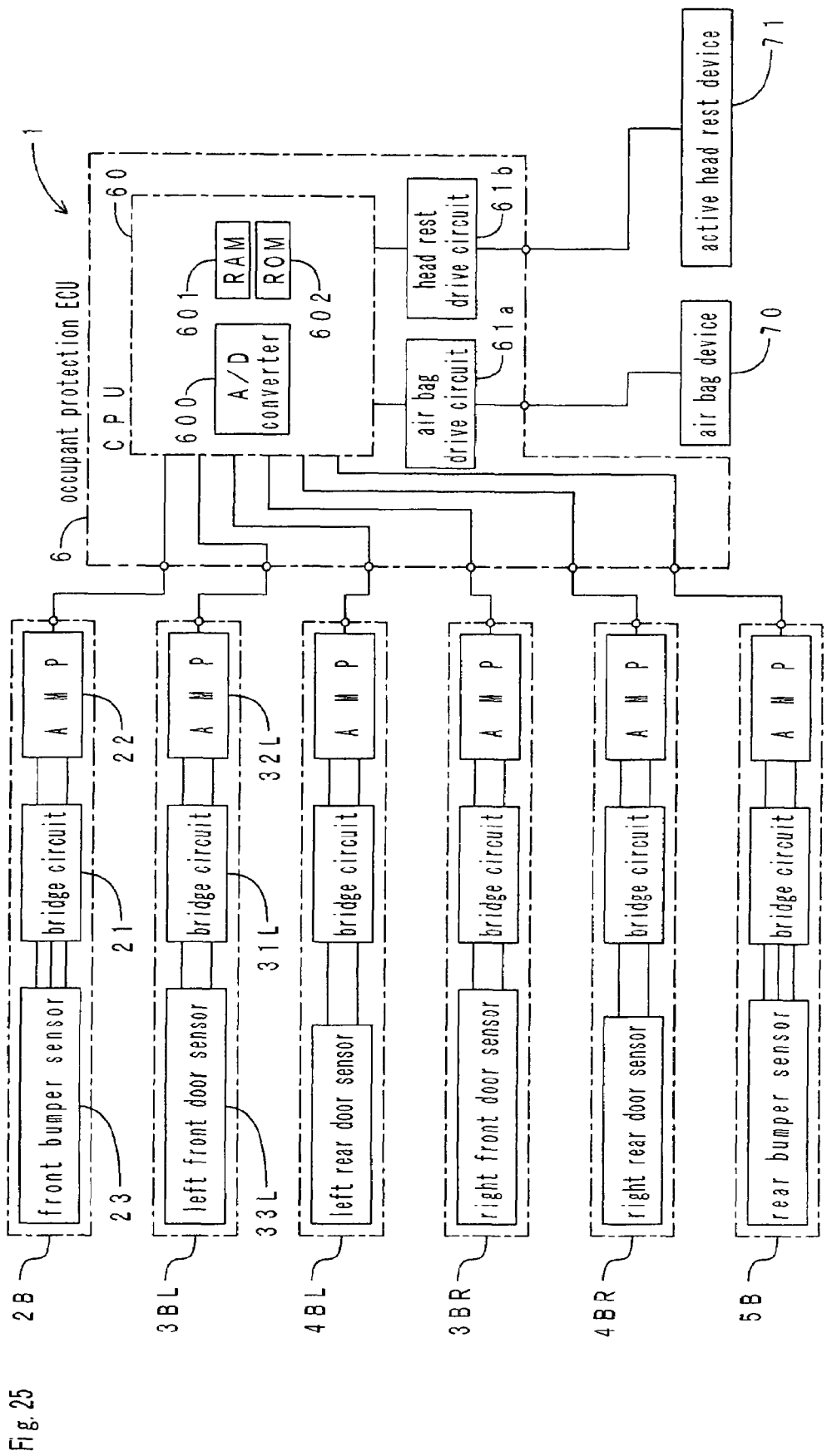
FIG. 25 is a block diagram of an occupant protection system of the third preferred embodiment.

Next, an electric constitution of the occupant protection system of this preferred embodiment will be explained in detail. FIG. 25 is a block diagram of the occupant protection system of this preferred embodiment. By the way, portions corresponding to FIG. 12 are indicated as the same symbols. As shown in FIG. 25, an occupant protection system 1 of this preferred embodiment has the front bumper sensor unit 2B, the left front door sensor unit 3BL, the left rear door sensor unit 4BL, the right front door sensor unit 3BR, the right rear door sensor unit 4BR, the rear bumper sensor unit 5B, the occupant protection ECU 6, an air bag device 70 an and an active head rest device 71.

As mentioned before, the front bumper sensor unit 2B has the front bumper sensor 23, the bridge circuit 21 and the amplifier 22. A circuit diagram of the front bumper sensor unit 2B is the same as the circuit diagram of the front bumper sensor unit 2A which is shown in the above-mentioned FIG. 13. Therefore, an explanation thereof will be omitted. The intermediate potentials V1 and V2 in the above-mentioned FIG. 13 are inputted into the amplifier 22. The potential difference ΔV between the intermediate potentials V1 and V2 is amplified by the amplifier 22, and it is inputted as an analogue voltage data into an A/D converter 600 of the occupant protection ECU 6.

As mentioned before, the left front door sensor unit 3BL has the left front door sensor 33L, the bridge circuit 31L and the amplifier 32L. A circuit diagram of the left front door sensor unit 3BL is the same as the circuit diagram of the left front door sensor unit 3AL which is shown in the above-mentioned FIG. 14. Therefore, an explanation thereof will be omitted. The intermediate potentials v1 and v2 in the above-mentioned FIG. 14 are inputted into the amplifier 32L. The potential difference Δv between the intermediate potentials v1 and v2 is amplified by the amplifier 32L, and it is inputted as an analogue voltage data into the A/D converter 600 of the occupant protection ECU 6.

Returning to FIG. 25, the occupant protection ECU 6 has a CPU (central processing unit) 60, an air bag drive circuit 61a and a head rest drive circuit 61b. In the CPU 60, the A/D converter 600, a RAM (random access memory) 601 and a ROM (read only memory) 602 are arranged. A constitution and a function of the occupant protection ECU6 are the same as those of the above-mentioned first preferred embodiment. Therefore, an explanation thereof will be omitted. Here, the air bag drive circuit 61a is connected with the air bag device 70. Furthermore, the head rest drive circuit 61b is connected with the active head rest device 71. A constitution and a function thereof are the same as those of the above-mentioned first preferred embodiment. Therefore, an explanation thereof will be omitted.

Next, a movement of the occupant protection system 1 of this preferred embodiment will be explained in detail. Firstly, a movement at the time of normal running of the vehicle 9 will be explained. The 5V power source of the occupant protection ECU 6 is connected with each of the front bumper sensor unit 2B, the left front door sensor unit 3BL, the left rear door sensor unit 4BL, the right front door sensor unit 3BR, the right rear door sensor unit 4BR and the rear bumper sensor unit 5B. On this account, the power supply voltage Vcc is supplied to the main body of sensor of each sensor unit (for example, 201, 301) (see the above-mentioned FIGS. 13 and 14). At the time of normal running, each main body of sensor is in no load state and a natural length state.

Here, at the time of normal running, as shown in the above-mentioned FIG. 1, the conductive fillers 102 are blended in the state which is proximate to a closest packing. On this account, a number of conductive paths P are formed. Therefore, the electric resistance of each main body of sensor shows a minimum value.

The potential difference ΔV between the intermediate potentials V1 and V2 is amplified by the amplifier 22, and the potential difference Δv between the intermediate potentials v1 and v2 is amplified by the amplifier 32L, respectively. As shown in the above-mentioned FIG. 25, the respective potential differences are always transmitted to the CPU 60 of the occupant protection ECU 6. Then, they are digitally converted by the A/D converter 600, and stored in the RAM 601 temporarily. On the other hand, in the same as that of the first preferred embodiment, the air bag expansion voltage threshold th1, the air bag expansion voltage change rate threshold th2, the head rest drive voltage threshold th3 and the head rest drive voltage change rate threshold th4 are contained in the ROM 602.

The CPU 60 compares the potential differences ΔV and Δv with the air bag expansion voltage threshold th1, respectively. At the time of normal running, the potential difference ΔV of the front bumper sensor unit 2B and the air bag expansion voltage threshold th1 (for a front collision) are set to be ΔV<th1. Furthermore, the potential difference Δv of each door sensor unit and the air bag expansion voltage threshold th1 (for a side collision) are set to be Δv<th1. Concurrently, the CPU 60 compares the potential difference ΔV with the head rest drive voltage threshold th3. At the time of normal running, the potential difference ΔV of the rear bumper sensor unit 5B and the head rest drive voltage threshold th3 are set to be ΔV<th3.

Furthermore, the CPU 60 calculates change rates (=potential difference change differential value (V/ms)) ΔV' and Δv' of potential differences ΔV and Δv. Then, it compares change rates ΔV' and Δv' with the air bag expansion voltage change rate threshold th2, respectively. At the time of normal running, the change rate ΔV' of the front bumper sensor unit 2B and the air bag expansion voltage change rate threshold th2 (for a front collision) are set to be ΔV'<th2. Furthermore, the change rate Δv' of each door sensor unit and the air bag expansion voltage change rate threshold th2 (for a side collision) are set to be Δv'<th2. Concurrently, the CPU 60 compares the change rate ΔV' with the head rest drive voltage change rate threshold th4. At the time of normal running, the change rate ΔV' of the rear bumper sensor unit 5B and the head rest drive voltage change rate threshold th4 are set to be ΔV'<th4.

Next, a movement at the time of front collision will be explained. For example, when an object to be collided (not shown in the figure) collides with a left side of the front bumper 90 of the vehicle 9, a left side of the bumper cover 900 is bended and deformed in such a manner that it is dented toward the rear. Therefore, as shown in the above-mentioned FIG. 19, the left side section 201L of the main body of sensor 201 of the front bumper sensor unit 2B is bended and deformed in such a manner that it is dented toward the rear. When the left side section 201L is bended and deformed, an electric resistance value of the resistance R (AM) increases (see the above-mentioned FIG. 13).

As explained in detail, at the time of front collision, as shown in the above-mentioned FIG. 2, the conductive fillers 102 are rebounded against each other. On this account, the conductive path P collapses. Therefore, the electric resistance value of the resistance R (AM) increases with respect to the time of normal running.

In addition, as shown in the above-mentioned FIGS. 19 and 21, the restriction film portion 202 is fixed to the surface of the main body of sensor 201. On this account, an extension deformation near the surface (rear surface) of the main body of sensor 201 due to collision is restricted by the restriction film portion 202. Concretely, the extension deformation near the surface of the main body of sensor 201 is controlled by the restriction film portion 202, and the main body of sensor 201 is subjected to a shear deformation. Therefore, a deformation amount of the left side section 201L further increases with respect to the time of normal running. Thus, since both surfaces of the main body of sensor 201 are restricted, large distortion concentration is induced, and the electric resistance value of the resistance R (AM) further increases.

When the electric resistance value of the resistance R (AM) increases, a voltage dropping amount of the power supply voltage Vcc at the time of passing through the resistance R (AM) increases. Therefore, as compared with the time of normal running, the intermediate potential V2 decreases.

When the intermediate potential V2 decreases, and the potential difference ΔV and the air bag expansion voltage threshold th1 are set to be ΔV≧th1, and also the change rate ΔV' and the air bag expansion voltage change rate threshold th2 are set to be ΔV'≧th2, the switching element of the air bag drive circuit 61a is turned on. On this account, a bag body of the air bag device 70 is swelled in the inside of a vehicle room. Concretely, when an occupant is seated only on a right front seat (a driving seat), a bag body of the right front seat front air bag device is swelled in the inside of the vehicle room. Furthermore, when occupants are seated on the right front seat and a left front seat (a passenger seat), each bag body of the right front seat front air bag device and the left front seat front air bag device is swelled in the inside of the vehicle room. By the way, each movement of the occupant protection system 1 at the time of front collision (right side), leftward collision and rightward collision is the same as the above-mentioned movement at the time of front collision (left side). Therefore, here, an explanation thereof will be omitted.

Next, a movement at the time of rear collision will be explained. For example, when an object to be collided (not shown in the figure) collides with a left side of the rear bumper 93 of the vehicle 9, a left side section of a main body of sensor of a rear bumper sensor (not shown in the figure) is bended and deformed in such a manner that it is dented toward the front, which is the same as that at the time of the above-mentioned front collision. Therefore, the electric resistance value of the left side section increases. When the electric resistance value of the left side section increases, the intermediate potential V2 decreases, as compared with the time of normal running (see the above-mentioned FIG. 13).

When the intermediate potential V2 decreases, and the potential difference ΔV and the head rest drive voltage threshold th3 are set to be ΔV≧th3, and also the change rate ΔV' and the head rest drive voltage change rate threshold th4 are set to be ΔV'≧th4, the active head rest device 71 is driven by the head rest drive circuit 61b. Namely, the head rest drive circuit 61b pushes a head rest forward with respect to a seat back by means of a cable which is inserted into a pillar of the head rest (not shown in the figure). Concretely, when an occupant is seated only on the right front seat, the right front seat active head rest device is driven. Furthermore, when occupants are seated on the right front seat and the left front seat, the right front seat active head rest device and the left front seat active head rest device are driven.

Next, an action and an effect of the deformation sensor of this preferred embodiment will be explained. As shown in the above-mentioned FIG. 17, each sensor unit is arranged in an inner surface of an exterior member which constitutes an outer shell of the vehicle 9. On this account, it is possible to detect the collision quickly. Furthermore, each sensor is arranged over an approximately whole periphery of the vehicle 9. Therefore, a collision from the front, the rear and the side can be detected in full. In addition, the exterior member in which the sensor unit is arranged such as the bumper cover 900 or the front door outer panel 910 has low rigidity, as compared with the member which constitutes the shock transmission path at the time of collision (for example, the bumper reinforcement, the crash box, the side impact protection beam and so on). Namely, it is easily deformed. On this account, according to this preferred embodiment, it is possible to detect the deformation, namely, the collision, more quickly. Additionally, in this preferred embodiment, by inputting the potential difference itself into the occupant protection ECU 6, the collision judge is carried out. On this account, as compared with the case in which a potential difference is once converted into an electric resistance, and then, a collision judge is carried out, it can be shorten the time from a collision to the driving of the air bag device 70 and the active head rest device 71.

Moreover, as shown in the above-mentioned FIG. 19, the main body of sensor 201 of the front bumper sensor 23 is divided into the left side section 201L and the right side section 201R by means of the electrodes A, B and M. On this account, the deformation position of the front bumper 90 is specified, and it is possible to judge a collision per each section independently.

Besides, when an ignition switch of the vehicle 9 is turned on to actuate an engine, a current is flowed into each sensor unit to be a current-carrying condition constantly. Due to this, an operation diagnosis can be easily carried out.

Furthermore, as compared with the case in which a collision judge is carried out by using an acceleration sensor, misjudging decreases. Namely, in case of an acceleration, it is considered that a rapid change generates, not by a collision, for example, when a vehicle climbs over a step and so on. On the contrary, the deformation sensor of this preferred embodiment can surely detect a deformation of the vehicle 9 which is generated inevitably as it were, with respect to a phenomenon such as a collision. On this account, as compared with the case in which the collision judge is carried out by using the acceleration sensor, misjudging decreases. In addition, since misjudging decreases, there is little need that a circuit constitution is daringly complicated in order to suppress misjudging.

Additionally, regardless of large or small of an acceleration, it is possible to detect the deformation. So, even when a vehicle is driven at a slow speed and collides with an obstacle and so on, it is possible to detect such collision surely. For example, at the time of back parking, the rear bumper 93 collides with an obstacle slowly, and the rear bumper 93 is gradually deformed, it is possible to detect such collision by the rear bumper sensor unit 5B. Therefore, it is possible to suppress the damage of the rear bumper 93 or the obstacle.

In addition, for example, an optical fiber sensor is used for detecting a collision, it is not like that the whole length of the optical fiber is fixed to an object to be measured. Namely, the optical fiber is fixed to the object to be measured by means of a clamp which is arranged per the predetermined length of the optical fiber. On this account, at the portion between neighboring clamps, there is a fear that the optical fiber is arranged in such a manner that it is loose. In this case, there is a fear that the detection accuracy is degraded by the loose of the optical fiber. Moreover, there is a fear that the detection speed is delayed. In this point, as for each sensor unit of this preferred embodiment, the whole surface thereof is fixed to the object to be measured (for example, the bumper cover 900 in the above-mentioned FIG. 21) by the base material film (for example, the base material film 200a in the above-mentioned FIG. 21). On this account, there is little fear that the loose occurs in the main body of sensor. Therefore, the detection accuracy is high, and the detection speed is rapid.

Furthermore, the active head rest device 71 is driven by the rear bumper sensor unit 5B. Due to this, as compared with the system in which an occupant is compressed to a seat back at the time of rear collision, and then, by this as a trigger, the head rest is automatically pushed out, the active head rest device 71 is surely driven without being affected by a posture of the occupant at the seat.

Fourth Preferred Embodiment

The difference between the third preferred embodiment and this preferred embodiment is that a bridge circuit and an amplifier are shared with respect to all deformation sensors. Therefore, here, only the difference will be explained.

Figure 26:
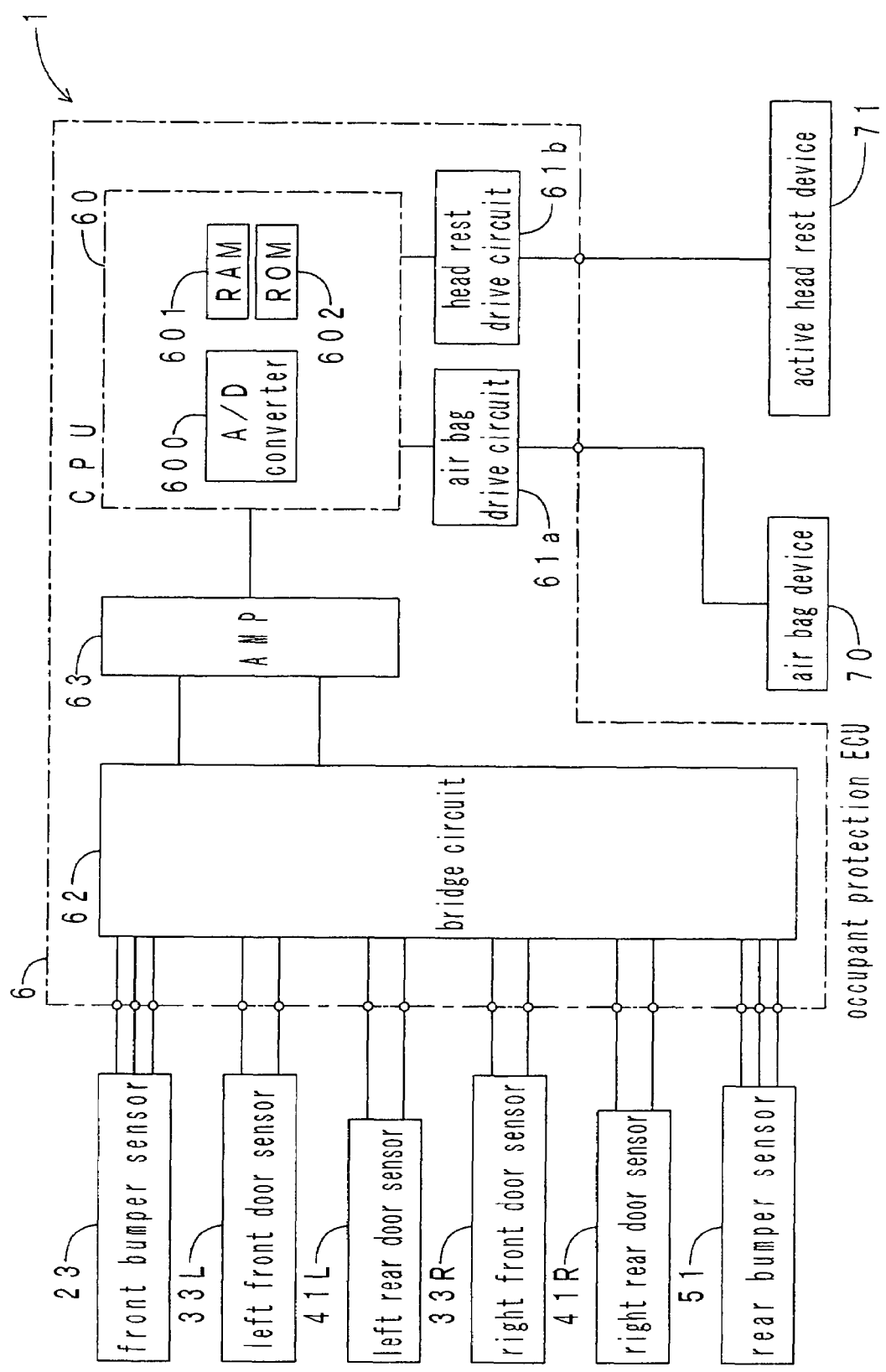
FIG. 26 is a block diagram of an occupant protection system of the fourth preferred embodiment.

FIG. 26 is a block diagram of an occupant protection system of this preferred embodiment. By the way, portions corresponding to FIG. 25 are indicated as the same symbols. As shown in FIG. 26, a bridge circuit 62 and an amplifier 63 are arranged in an occupant protection ECU 6. Here, the bridge circuit 62 has the same circuit diagram as that of the above-mentioned FIG. 16. The bridge circuit 62 is connected with each of a front bumper sensor 23, a left front door sensor 33L, a left rear door sensor 41L, a right front door sensor 33R, a right rear door sensor 41R and a rear bumper sensor 51. These sensors are all included in the second deformation sensor of the present invention. Each sensor constitutes a Wheatstone bridge circuit together with resistances R10 to R30 (see the above-mentioned FIG. 16). Each sensor is repeatedly incorporated into the Wheatstone bridge circuit by turns.

In addition, in the front bumper sensor 23, three electrodes A, B and M are arranged (see the above-mentioned FIG. 19). On this account, when the front bumper sensor 23 is incorporated into the Wheatstone bridge circuit, a left side section 201L between electrodes A and M (resistance R (AM)) is connected first, and then, a right side section 201R between electrodes M and B (resistance R (MB)) is connected by turns. Such connection manner is the same as the case of the rear bumper sensor 51. Returning to FIG. 26, the intermediate potentials V10 and V20 of each sensor are transmitted from the bridge circuit 62 to the amplifier 63. The difference between the intermediate potentials V10 and V20 which is amplified by the amplifier 63 is transmitted to a CPU 60.

The deformation sensor of this preferred embodiment has the same action and effect as those of the deformation sensor of the third preferred embodiment. Furthermore, according to an occupant protection system 1 of this preferred embodiment, the bridge circuit 62 and the amplifier 63 are shared with respect to all deformation sensors. Due to this, the number of components can be decreased. In addition, since a bridge circuit and an amplifier need not to be arranged in a bumper or a door, the space and the weight of the deformation sensor can be reduced.

Other Preferred Embodiments

As above-described, the preferred embodiments of the second deformation sensor of the present invention are explained. However, the preferred embodiments are not specifically limited to the above two preferred embodiments. It is possible to carry out various kinds of modified embodiments and improved embodiments which can be done by one of skilled in the art.

For example, in each of the above two preferred embodiments, the second deformation sensor of the present invention is arranged in the inner surface of the exterior member, but it can be arranged in an outer surface of the exterior member. By doing this, for example, as shown in the above-mentioned FIG. 21, a load can be inputted directly from an object to be measured without the bumper cover 900 and the base material film 200a. On this account, it is possible to drive the occupant protection device more quickly. Furthermore, when the deformation sensor is exposed to the outside, a weather resistance cover can be arranged in such a manner that at least a part of the main body of sensor is covered. By doing this, it is possible to suppress the degradation of the main body of sensor, and to improve the durability.

Furthermore, a constitution of the main body of sensor is not limited to the above preferred embodiments. This will be explained later. Moreover, in the same as that of the above-mentioned first deformation sensor of the present invention, materials of the electrode film portion and the restriction film portion (restriction member) are not especially limited. For example, as the restriction member, a resin film such as polyethylene (PE), polyethylene terephthalate (PET) and so on, and a metal plate such as a damping steel sheet and so on, are used. In addition, an embodiment in which a restriction member is not arranged can be carried out. Additionally, a base material film to which the main body of sensor is fixed can be a single layer as mentioned in the above preferred embodiment, and also, it can be a complex layer in which a number of films are laminated. Besides, the main body of sensor is directly fixed to the exterior member without arranging the fixed member such as a base material film and so on.

Besides, in the above preferred embodiments, a single deformation sensor is arranged in each of a front bumper, a left front door, a left rear door, a right front door, a right rear door and a rear bumper. However, a collision detection in an identical section can be carried out by a number of deformation sensors. Moreover, the number of electrodes which are arranged in the deformation sensor is not limited. According to the deformation sensor of this preferred embodiment, it is possible to detect a deformation per each distance of a pair of neighboring electrodes in a longitudinal direction. So, by increasing the number of electrodes, it is possible to improve an accuracy which specifies a collision position. Additionally, when the electrode is fixed to the main body of sensor, it can be fixed by a vulcanized bonding. By doing this, the electrode can be arranged simultaneously with a vulcanized forming of the main body of sensor.

Moreover, in the above preferred embodiments, the collision judge is carried out only by the deformation sensor, but it can be carried out by the deformation sensor together with an acceleration sensor. Furthermore, the collision judge can be carried out by inputting an engine rotational number, a vehicle speed and so on. Namely, the deformation sensor of this preferred embodiment can be used by adding-on an existing occupant protection system.

Additionally, in the above preferred embodiments, the voltage data is outputted from the deformation sensor, but the electric resistance data can be outputted. In addition, at the time of outputting the data, temperature compensating can be done approximately. Besides, as the occupant protection device, other than the air bag device, the active head rest device and so on, a seat belt tensioner device and so on can be used. Moreover, the second deformation sensor of the present invention can be arranged in a side outer panel, a side mall and so on, other than a bumper, a door and so on.

Furthermore, the second deformation sensor of the present invention can be used for not only the occupant protection system, but also other systems such as a foot passenger protection system and so on. In this case, it is better to arrange the second deformation sensor in an exterior member for absorbing a shock of the collided foot passenger (for example, a bumper, a hood panel and so on) because of the following reason: it is often the case that such exterior member is designed in such a manner that it is more easily deformed, in view of the protection of foot passengers.

(Main Body of Sensor)

The main body of sensor which constitutes the first and second deformation sensors of the present invention has an elastomer and conductive fillers. The elastomer is approximately selected from the group consisting of rubber and a thermoplastic elastomer. It is preferable that the elastomer is insulative. Furthermore, when a mixture with conductive fillers (an elastomer composition) is prepared, it is preferable to use the one in which the saturated volume fraction ($\phi s$) is 35 vol % or more in a percolation curve. When the saturated volume fraction ($\phi s$) is less than 35 vol %, it is difficult that the conductive fillers are blended in an approximately single particle state and with a high filling rate. Moreover, in the field being the saturated volume fraction ($\phi s$) or more, low electric resistance and stable conductivity are shown. Therefore, when the saturated volume fraction ($\phi s$) is 35 vol % or more, a change range of an electric resistance from a conductor to an insulator at the time of deformation is widen. Furthermore, it is more preferable to use an elastomer in which the saturated volume fraction (φs) is 40 vol % or more. By the way, in the present specification, an "elastomer composition" requires an elastomer and spherical conductive fillers as an essential ingredient. Namely, it can include a mixture of an elastomer and spherical conductive fillers, or a mixture of an elastomer, spherical conductive fillers and other additives and so on.

In consideration of an affinity with the conductive fillers, it is preferable to use an elastomer in which a gel fraction shown as the following formula (1) is 15% or less. It is more preferable that the gel fraction is 10% or less.

$$\text{Gel fraction}(\%) = (Wg - Wf)/Wf \times 100 \quad (1)$$

[In the formula (1), Wg is a weight of a solvent insoluble (gel comprising conductive fillers and an elastomer) that is obtained by dissolving an elastomer composition, in which conductive fillers are mixed with an elastomer, into a good solvent of an elastomer. Wf is a weight of conductive fillers. By the way, the good solvent of the elastomer is preferably the one in which a SP (solubility parameter) value between the solvent and the elastomer is close, for example, toluene, tetrahydrofuran, chloroform and so on.]

The value of gel fraction is an index of the critical volume fraction (φc) in a percolation curve. Namely, when the critical volume fraction (φc) is less than 30 vol %, an elastomer which is absorbed to and combined with an agglomerated body of the conductive fillers exist in large amount, so the gel fraction becomes a relatively large value. On the contrary, when the critical volume fraction (φc) is 30 vol % or more, the conductive fillers exist in an approximately single particle state, so an elastomer which is absorbed to and combined with an agglomerated body of the conductive fillers exist in small amount, and the gel fraction becomes a relatively small value, namely, 15% or less.

As a concrete example of the elastomer, for example, as rubber, natural rubber (NR), isoprene rubber (IR), butadiene rubber (BR), acrylonitrile-butadiene copolymer rubber (NBR), styrene-butadiene copolymer rubber (SBR), ethylene-propylene copolymer rubber [ethylene-propylene copolymer (EPM), ethylene-propylene-diene ternary copolymer (EPDM) and so on], butyl rubber (IIR), halogenation butyl rubber (Cl-IIR, Br-IIR and so on), hydrogenation nitrile rubber (H-NBR), chloroprene rubber (CR), acrylic rubber (AR), chlorosulfonated polyethylene rubber (CSM), hydrine rubber, silicon rubber, fluorine rubber, urethan rubber, synthetic latex and so on are used. Furthermore, as a thermoplastic elastomer, various kinds of thermoplastic elastomers such as styrene-based, olefin-based, urethan-based, polyester-based, polyamide-based, fluorine-based and so on, and derivatives thereof are used. Among these, one kind of elastomer can be used independently, or two kinds of elastomers can be used together. Above all, EPDM whose compatibility with conductive fillers is very excellent is preferable. Moreover, NRB or silicon rubber whose compatibility with conductive fillers is excellent is also preferable.

The conductive fillers have a spherical shape. By the way, the spherical shape includes not only a true spherical shape, an approximately true spherical shape, but also a elliptic spherical shape, an oval spherical shape (the shape in which a pair of opposite hemispheres are connected by a column), a partial spherical shape, a spherical shape in which a radius is different with respect to each part, a droplet shape and so on. For example, an aspect ratio of the conductive fillers (ratio of a long side to a short side) is preferably within the range of 1 or more and 2 or less. When the aspect ratio is larger than 2, a one-dimensionally conductive path is easily formed by a contact between the conductive fillers. In this case, there is a fear that the above-mentioned saturated volume fraction (φs) is less than 35 vol %. Furthermore, from the viewpoint that a filling state of the conductive fillers in the elastomer is made to the state which is proximate to a closest packing, particles having a true spherical shape or a shape which is extremely close to a true sphere (an approximately true spherical shape) can be adopted as the conductive fillers.

The conductive fillers are not especially limited only if they are particles having conductivity. For example, fine particles such as a carbon material, a metal and so on are included. Among these, one kind of particles can be used independently, or two kinds of particles can be used together.

It is preferable that the conductive fillers exist in a single primary particle state, while not being agglomerated as far as possible. Therefore, when the conductive fillers are selected, an average particle diameter, the compatibility with an elastomer and so on may be considered. For example, it is preferable that an average particle diameter (primary particle) of the conductive fillers is 0.05 μm or more and 100 μm or less. When the average particle diameter is less than 0.05 μm, the conductive fillers are easily agglomerated to form a secondary particle. Furthermore, there is a fear that the above-mentioned saturated volume fraction (φs) is less than 35 vol %. The average particle diameter is preferably 0.5 μm or more, and more preferably 1 μm or more. On the contrary, when the average particle diameter exceeds 100 μm, a translational movement (a parallel movement) of the conductive fillers due to an elastic deformation becomes relatively small as compared with the particle diameter, and the change of an electric resistance with respect to an elastic deformation of the main body of sensor becomes slow. The average particle diameter is preferably 60 μm or less, and more preferably 30 μm or less. Furthermore, by approximately adjusting a combination of conductive fillers and an elastomer, an average particle diameter of conductive fillers and so on, it is possible to adjust the above-mentioned saturated volume fraction (φs) and the above-mentioned critical volume fraction (φc) to be within the desired range.

The value of D90/D10 in a particle size distribution of the conductive fillers is preferably 1 or more and 30 or less. Here, D90 means a particle diameter in which an accumulated weight is 90%, and D10 means a particle diameter in which an accumulated weight is 10% in a cumulative particle size curve. When the value of D90/D10 exceeds 30, the particle size distribution becomes broad, and an increase behavior of the electric resistance with respect to an elastic deformation of the main body of sensor becomes unstable. Due to this, there is a fear that a detection repeatability decreases. It is more preferable that the value of D90/D10 is 10 or less. By the way, when two kinds of particles are used as conductive fillers, the value of D90/D10 may be 100 or less.

As such conductive fillers, for example, carbon beads are preferable. Concretely, meso carbon micro beads manufactured by Osaka Gas Chemicals Co., Ltd. [MCMB6-28 (an average particle diameter is approximately 6 μm), MCMB10-28 (an average particle diameter is approximately 10 μm), MCMB25-28 (an average particle diameter is approximately 25 μm)], carbon micro beads manufactured by Nippon Carbon Co., Ltd.: NICABEADS (registration of trade mark) ICB, NICABEADS PC, NICABEADS MC, NICABEADS MSB [ICB0320 (an average particle diameter is approximately 3 μm), ICB0520 (an average particle diameter is approximately 5 μm), ICB1020 (an average particle diameter is approximately 10 μm), PC0720 (an average particle diameter is approximately 7 μm), MC0520 (an average particle diameter is approximately 5 μm)], carbon beads (an average particle diameter is approximately 10 μm) manufactured by NISSHINBO INDUSTRIES, INC. and so on are used.

The conductive fillers are blended in the elastomer with a high filling rate. In order to exhibit the desired conductivity, it is preferable that the conductive fillers are blended in a rate being the critical volume fraction (φc) or more in a percolation curve. From the viewpoint that the conductive fillers are blended in the elastomer in an approximately single particle state and with a high filling rate, the critical volume fraction (φc) is preferably 30 vol % or more. It is more preferable that the critical volume fraction (φc) is 35 vol % or more. Therefore, for example, it is preferable that a filling rate of the conductive fillers is 30 vol % or more and 65 vol % or less when a total volume of the main body of sensor is 100 vol %. When the filling rate is less than 30 vol %, the conductive fillers cannot be blended in the state which is proximate to a closest packing, so the desired conductivity cannot be exhibited. Moreover, the change of an electric resistance with respect to an elastic deformation of the main body of sensor becomes slow, and so it is difficult to control an increase behavior of the electric resistance. It is more preferable that the filling rate is 35 vol % or more. On the contrary, when the filling rate exceeds 65 vol %, it is difficult to be mixed with an elastomer, and a forming workability is degraded. In addition, an elastic deformation of the main body of sensor is hardly done. It is more preferable that the filling rate is 55 vol % or less.

In the main body of sensor, in addition to the above-mentioned elastomer and the above-mentioned conductive fillers, a various kinds of additives can be blended. Examples of the additives, include a cross-linking agent, a vulcanization accelerator, a vulcanization co-agent, an antioxidant, an elasticiser, a softener, a coloring agent and so on. Furthermore, together with the above-mentioned spherical conductive fillers, conductive fillers having an irregular shape (for example, needle-shaped and so on) can be blended.

The main body of sensor can be manufactured by, for example, as follows. First, an additive such as a vulcanization co-agent, a softener and so on is added to an elastomer to be kneaded. Next, conductive fillers are added to be kneaded, and then, a cross-linking agent and a vulcanization accelerator are added to be kneaded to form an elastomer composition. Next, the elastomer composition is formed to be sheet-shaped, and it is filled in a metal mold, and is subjected to a press vulcanization under the predetermined condition.

EXAMPLES

An Impact response experiment which uses the first and second deformation sensors of the present invention will be explained as follows.

(1) Impact Response Experiment of First Deformation Sensor
(Experimental Apparatus and Experimental Manner)

In this experiment, a main body of sensor which is manufactured as follows is used. First, 85 parts by weight (hereinafter, referred to as "parts" for short) (85 g) of an oil extension EPDM ("ESPRENE (registration of trade mark) 6101" manufactured by Sumitomo Chemical Co., Ltd.), 34 parts (34 g) of an oil extension EPDM ("ESPRENE 601" manufactured by Sumitomo Chemical Co., Ltd.), 30 parts (30 g) of EPDM ("ESPRENE 505" manufactured by Sumitomo Chemical Co., Ltd.), 5 parts (5 g) of zinc oxide (manufactured by Hakusui Chemical Industry Co., Ltd.), 1 parts (1 g) of stearic acid ("LUNAC (registration of trade mark) S30" manufactured by Kao Corporation) and 20 parts (20 g) of a paraffinic process oil ("SUNPAR (registration of trade mark) 110" manufactured by Japan Sun Oil Company, Ltd.) were kneaded by a roll kneader. Next, 270 parts (270 g) of carbon beads ("NICABEADS ICB0520" manufactured by Nippon Carbon Co., Ltd.; an average particle diameter is approximately 5 μm, D90/D10=3.2 in a particle size distribution) was added, and mixed by the roll kneader to be dispersed. Furthermore, as a vulcanization accelerator, 1.5 parts (1.5 g) of zinc dimethyldithiocarbamate ("NOCCELER (registration of trade mark) PZ-P" manufactured by Ouchi Shinko Chemical Industrial Co., Ltd.), 1.5 parts (1.5 g) of tetramethyl thiram disulfide ("SANCELER (registration of trade mark) TT-G" manufactured by SANSHIN CHEMICAL INDUSTRY CO., LTD.), 0.5 parts (0.5 g) of 2-mercapto benzothiazole ("NOCCELER M-P" manufactured by Ouchi Shinko Chemical Industrial Co., Ltd.) and 0.56 parts (0.56 g) of sulfur ("SULFAX T-10" manufactured by Tsurumi Chemical Industry Co., Ltd.) were added, and mixed in the roll kneader to be dispersed. Then, an elastomer composition was prepared.

The volume fraction of the carbon beads in the prepared elastomer composition is approximately 48 vol % when a total volume of the elastomer composition is 100 vol %. Furthermore, the critical volume fraction (φc) of the elastomer composition in a percolation curve is approximately 43 vol %, and the saturated volume fraction (φs) is approximately 48 vol %. Moreover, when the elastomer composition was dissolved into a solvent (toluene) and the solvent insoluble was measured, the gel fraction is approximately 3%.

Then, the elastomer composition was formed into a band shape of predetermined size so that a compact is formed. A metal mold was filled with the compact, and an electrode was arranged at both ends in a longitudinal direction. Then, a press vulcanization was carried out at 170° C. for 30 minutes to obtain a main body of sensor. The filling rate of the carbon beads in the obtained main body of sensor is approximately 48 vol % when a total volume of the main body of sensor is 100 vol %.

Figure 27:
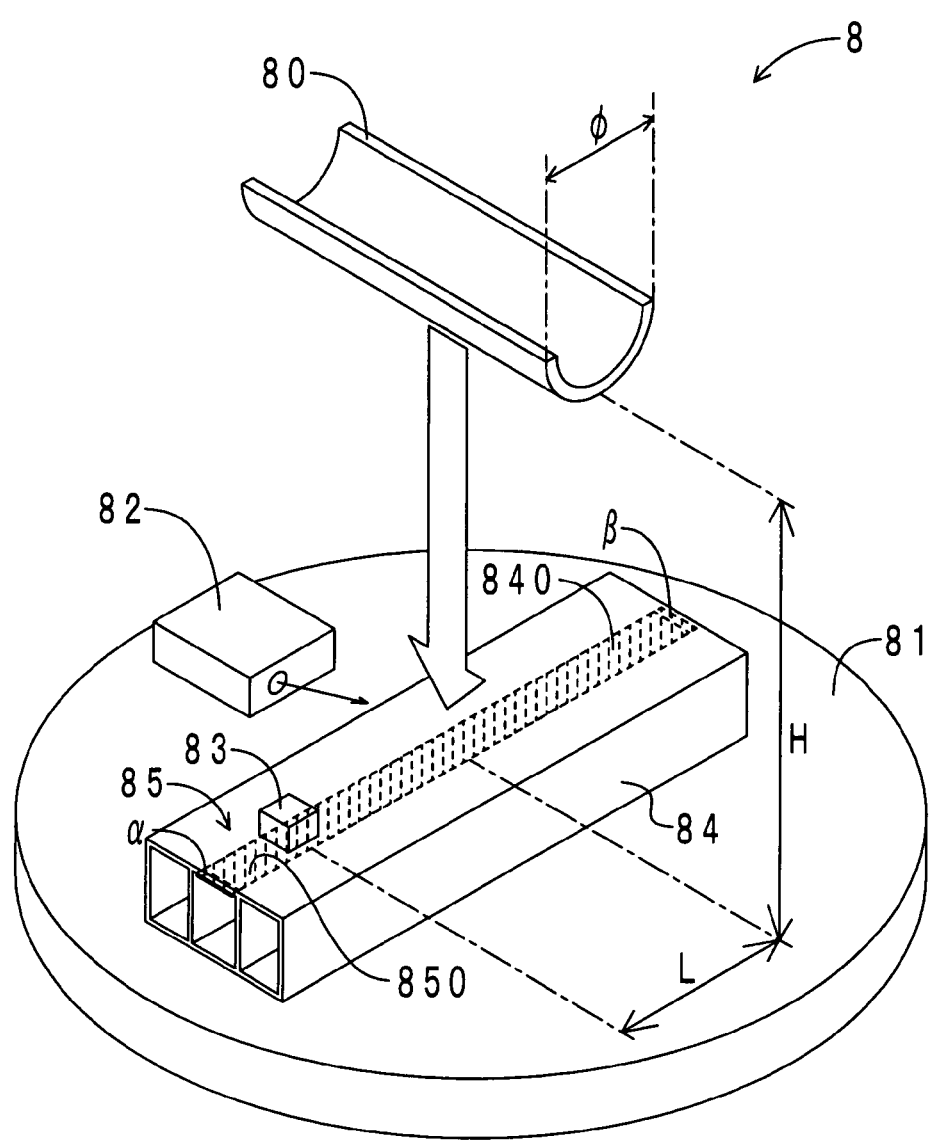
FIG. 27 is a perspective view of an experimental apparatus which is used for a drop weight experiment.
Figure 28:
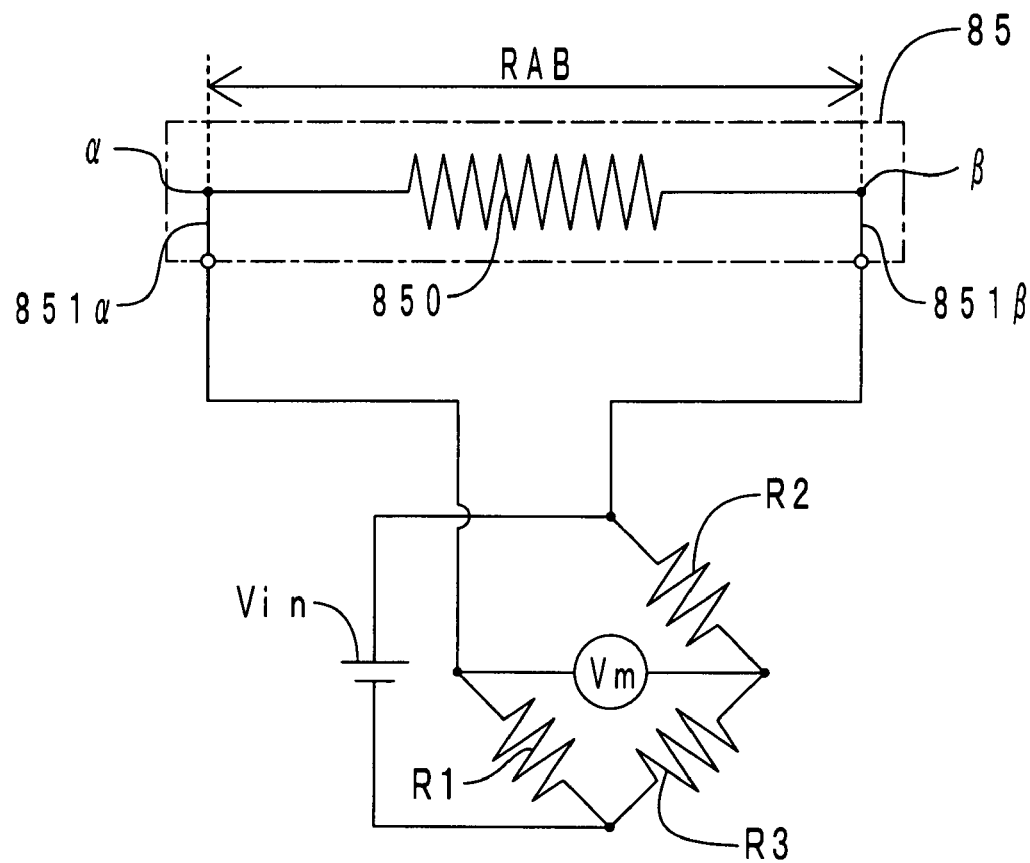
FIG. 28 is a pattern diagram of a circuit in which a deformation sensor that is used for the drop weight experiment is incorporated.

The manufactured main body of sensor was attached to a back side of a bumper reinforcement to constitute a deformation sensor, and the response of the deformation sensor against a impact from the surface of the bumper reinforcement was evaluated. First, a constitution of an experimental apparatus will be explained. FIG. 27 is a perspective view of the experimental apparatus. FIG. 28 is a pattern diagram of a circuit in which the deformation sensor is incorporated.

As shown in FIG. 27, an experimental apparatus 8 has a striker 80, a stage 81, a laser displacement sensor 82 and an acceleration sensor 83.

The striker 80 is made of steel, and is formed of semicylinder. The weight of the striker 80 is 26.6 kg. Furthermore, an outer diameter φ of the striker 80 is 70 mm. The stage 81 is made of steel, and is formed of a circular plate. At the downward of the stage 81, a load sensor (not shown in the figure) is arranged. The laser displacement sensor 82 is arranged on the stage 81.

The bumper reinforcement 84 is made of aluminum alloy, and is formed of a square tube. The bumper reinforcement 84 is mounted at approximately center of an upper surface of the stage 81 in a state that the surface to which a impact is inputted is upward. The center of the bumper reinforcement 84 in a longitudinal direction and the center of the striker 80 in a longitudinal direction are arranged in such a manner that they intersect with each other in the shape of a cross when it is seen from upward.

At a lower surface (back side) of an upper wall 840 of the bumper reinforcement 84, the manufactured deformation sensor 85 (as a matter of convenience for explanation, it is shown as dotted hatching) is fixed. The deformation sensor 85 has a main body of sensor 850 and electrodes α and β which are arranged at both ends in a longitudinal direction of the main body of sensor 850. The main body of sensor 850 is connected with the Wheatstone bridge circuit as shown in FIG. 28 by way of the electrode α and a conducting wire 851α and the electrode β and a conducting wire 851β. Here, a voltage of a power supply Vin and an electric resistance value of resistances R1, R2 and R3 are already known respectively. The change of a voltage (namely, the change of an electric resistance) of the main body of sensor 850 is measured by a voltage meter Vm.

At an upper surface of the upper wall 840 of the bumper reinforcement 84, the acceleration sensor 83 is fixed. The acceleration sensor 83 is arranged in such a manner that it is apart from the center of the bumper reinforcement 84 in a longitudinal direction by a distance L (=8 cm).

An experimental manner will be explained as follows. A drop weight experiment is carried out by dropping and bringing the striker 80 into collision with the bumper reinforcement 84. When the striker 80 falls, the center of the striker 80 in a longitudinal direction collides with the center of the bumper reinforcement 84 in a longitudinal direction. The drop weight experiment is carried out twice by changing the drop distance H (50 cm, 20 cm) (see the above-mentioned FIG. 27) of the striker 80.

The change of a load due to a impact is detected by a load sensor at the downward of the stage 81. A deformation of the upper wall 840 of the bumper reinforcement 84 due to a impact (namely, a deformation of the deformation sensor 85) is detected by the laser displacement sensor 82. The change of an acceleration due to a impact is detected by the acceleration sensor 83. The change of a voltage of the deformation sensor 85 due to a collision (namely, the change of an electric resistance) is detected by the voltage meter Vm.

(Experimental Result)

Figure 29:
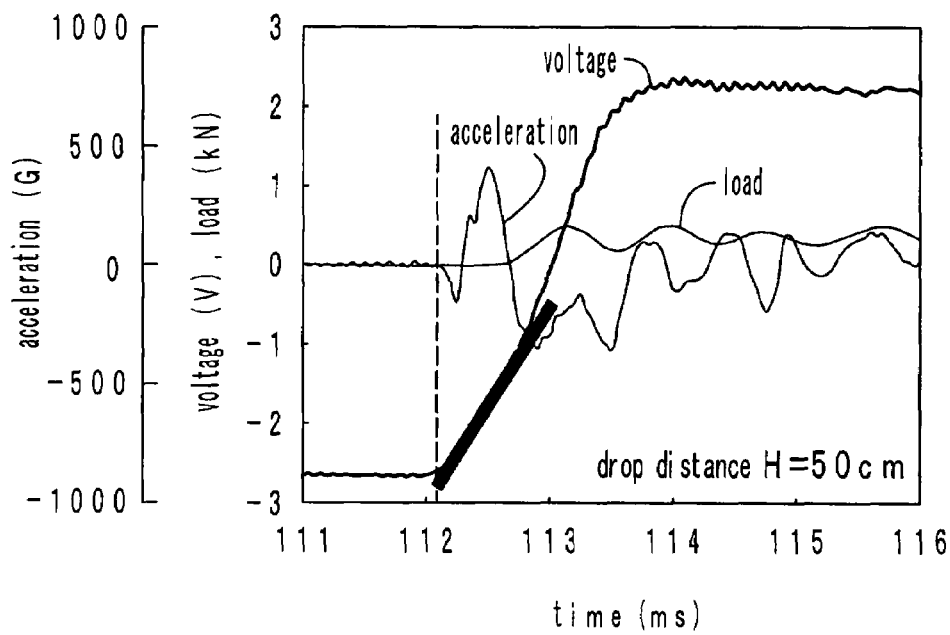
FIG. 29 is a graph for showing the change over time of an acceleration of an impact, a load and a detected voltage (drop distance H=50 cm).
Figure 30:
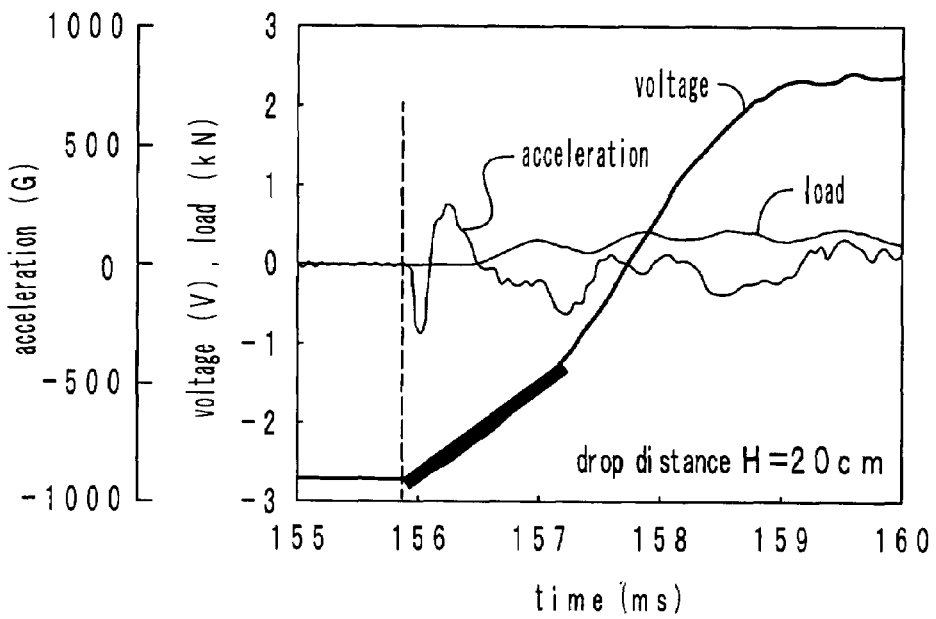
FIG. 30 is a graph for showing the change over time of an acceleration of an impact, a load and a detected voltage (drop distance H=20 cm).
Figure 31:
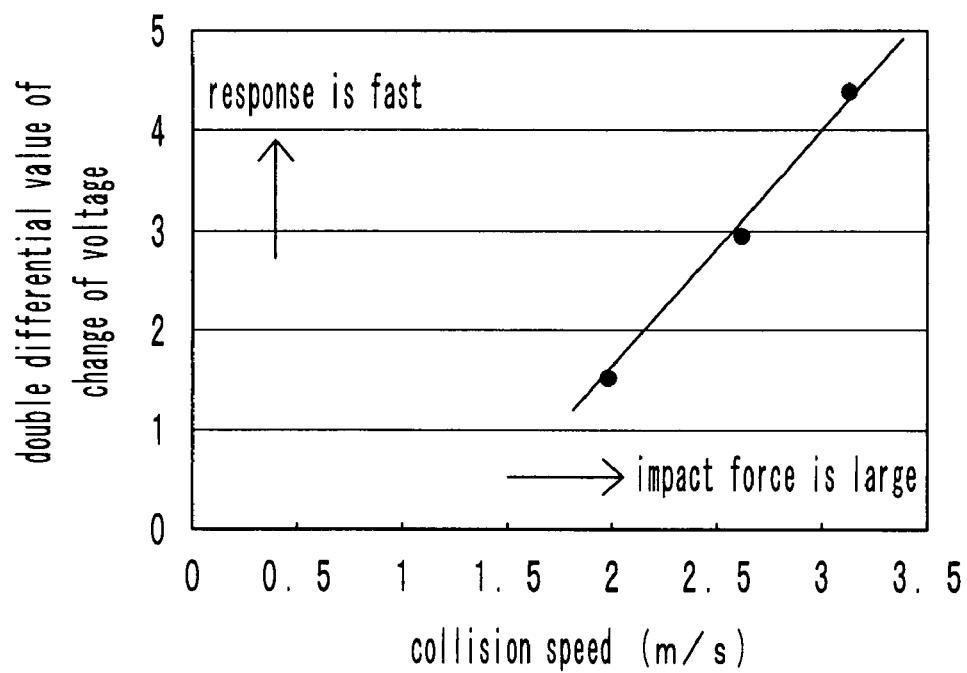
FIG. 31 is a graph for showing the response of the deformation sensor with respect to a collision speed of a striker.

An experimental result is shown in FIGS. 29 to 31. FIG. 29 is a graph for showing the change over time of an acceleration of an impact, a load and the detected voltage when the drop distance H is 50 cm. FIG. 30 is a graph for showing the change over time of an acceleration of an impact, a load and the detected voltage when the drop distance H is 20 cm. As shown in FIGS. 29 and 30, when an impact is applied, the detected voltage immediately increases. This shows that an electric resistance of the deformation sensor increases by a deformation due to the impact, and a voltage dropping amount due to the deformation sensor becomes large. Thus, the response of the first deformation sensor of the present invention is high, and a delay of the response against the impact is so small that it can be ignored. As shown in FIGS. 29 and 30 in which an inclination is indicated as a heavy line respectively, the larger the drop distance H is, namely, the larger an impact force is, the larger a differential value is.

FIG. 31 is a graph for showing the response of the deformation sensor with respect to a collision speed of the striker. In FIG. 31, a longitudinal axis shows a double differential value of the change of the detected voltage. As shown in FIG. 31, the larger the collision speed of the striker is, namely, the larger the impact force is, the faster the response is. Thus, according to the first deformation sensor of the present invention, a collision condition can be specified, so it is possible to drive the occupant protection system and so on depending on the large or small of the impact.

A movement of the occupant protection system at the time of collision has little grace of time such as several ms. So, in order to detect the collision condition, a high speed response is necessary. The speed of the first deformation sensor of the present invention is remarkably useful for detecting a collision of a vehicle.

(2) Impact Response Experiment of Second Deformation Sensor (Experimental Apparatus and Experimental Manner)

Figure 32:
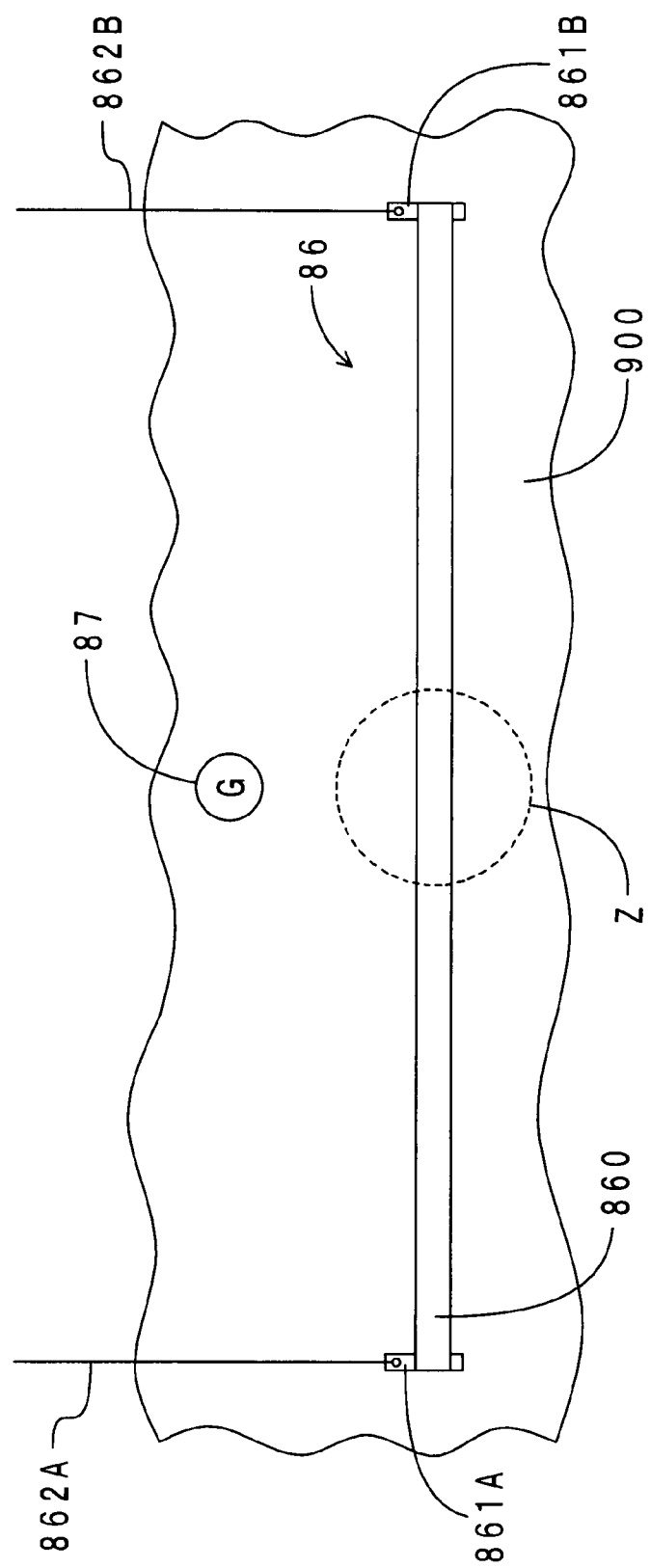
FIG. 32 is an arrangement diagram of the deformation sensor in an impact response experiment of the second deformation sensor.
Figure 33:
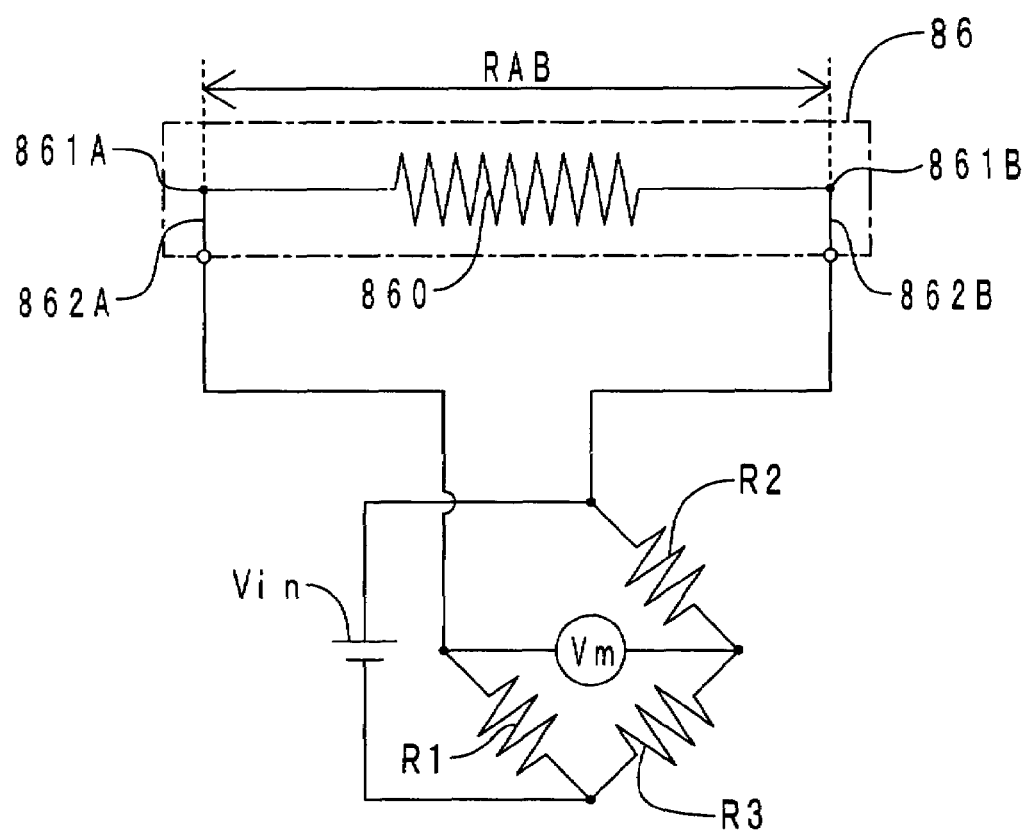
FIG. 33 is a pattern diagram of a circuit in which the deformation sensor is incorporated.

In this experiment, the main body of sensor which is manufactured in the above (1) is used. The manufactured main body of sensor was attached to a back side of a bumper cover to constitute a deformation sensor, and the response of the deformation sensor against an impact from the surface of the bumper cover was evaluated. FIG. 32 is an arrangement diagram of the deformation sensor in an impact response experiment of the second deformation sensor. FIG. 33 is a pattern diagram of a circuit in which the deformation sensor is incorporated.

As shown in FIG. 32, a deformation sensor 86 has a main body of sensor 860, an electrode 861A and an electrode 861B, and it was fixed to a back side of a bumper cover 900. The electrode 861A was attached to a left end of the main body of sensor 860, and the electrode 861B was attached to a right end of the electrode 860, respectively. An acceleration sensor 87 was fixed to a back side of a bumper cover 900. The acceleration sensor 87 was arranged near the center of the deformation sensor 86 in a longitudinal direction in such a manner that it was apart from the deformation sensor 86.

The deformation sensor 860 was connected with the Wheatstone bridge circuit as shown in FIG. 33 by way of the electrode 861A and a conducting wire 862A and the electrode 861B and a conducting wire 862B. Here, a voltage of a power supply Vin and an electric resistance value of resistances R1, R2 and R3 were already known respectively. By measuring a voltage value of a voltage meter Vm, an electric resistance value of the main body of sensor 860 was measured.

When an impact was applied to the bumper cover 900 from the back side direction of a paper surface, the bumper cover 900 was deformed, and in accordance with this, the deformation sensor 86 was deformed. The deformation of the deformation sensor 86 was measured by a laser deformation meter (not shown in the figure). An electric resistance value of the deformation sensor 86 was outputted from the electrodes 861A, 861B and so on to an external circuit. Furthermore, an acceleration of the impact was measured by the acceleration sensor 87.

Two kinds of experiments were carried out as follows. In the first experiment, the surface (surface in the back side direction of the paper surface) of the bumper cover 900 was hit by a fist of a hand, and an impact (high-speed impact) was applied. In FIG. 32, a collision input position was shown as a dotted circle Z. At that time, an acceleration of the impact, a displacement of the deformation sensor 86 with respect to the impact and an electric resistance value were measured. In the second experiment, the surface (surface in the back side direction of the paper surface) of the bumper cover 900 was pushed by a flat of a hand, and an impact (low-speed impact) is applied. An impact input position was the same as that of the above. At that time, an acceleration of the impact, a displacement of the deformation sensor 86 with respect to the impact and an electric resistance value were measured.

(Experimental Result)

Figure 34:
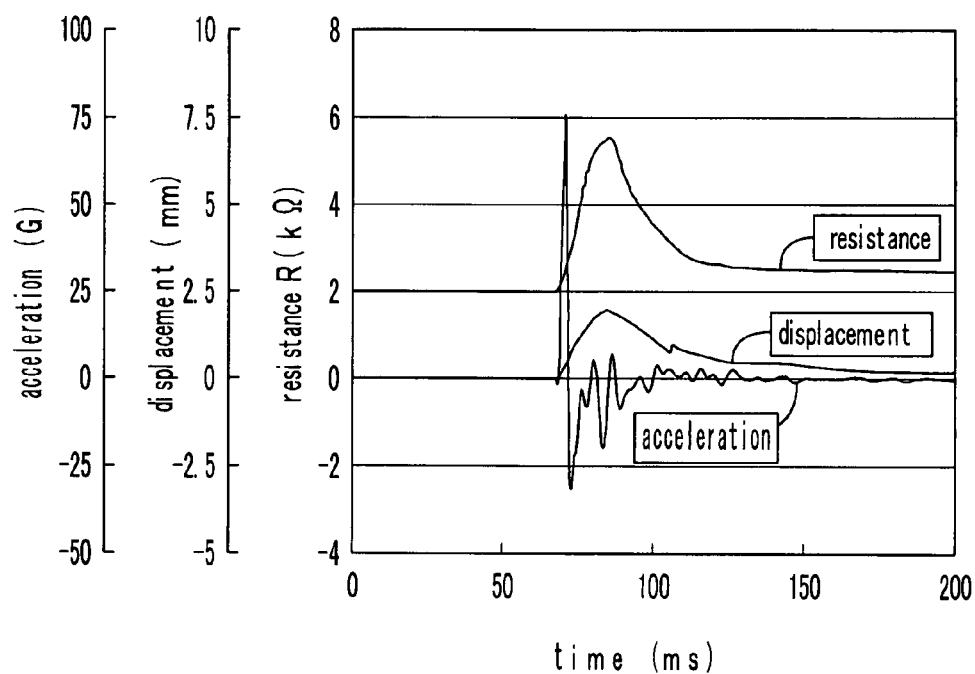
FIG. 34 is a graph for showing the change over time of an acceleration of a high-speed impact, a displacement of the deformation sensor and an electric resistance value.
Figure 35:
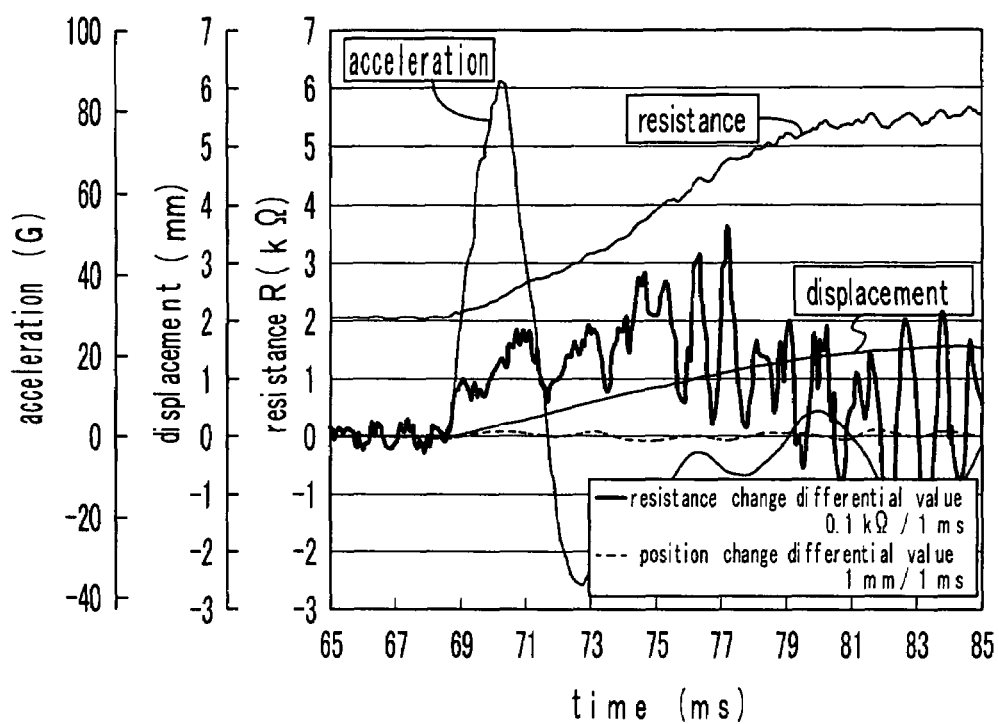
FIG. 35 is a graph for showing an enlargement of a horizontal axis (time: 65-85 ms) of FIG. 34.
Figure 36:
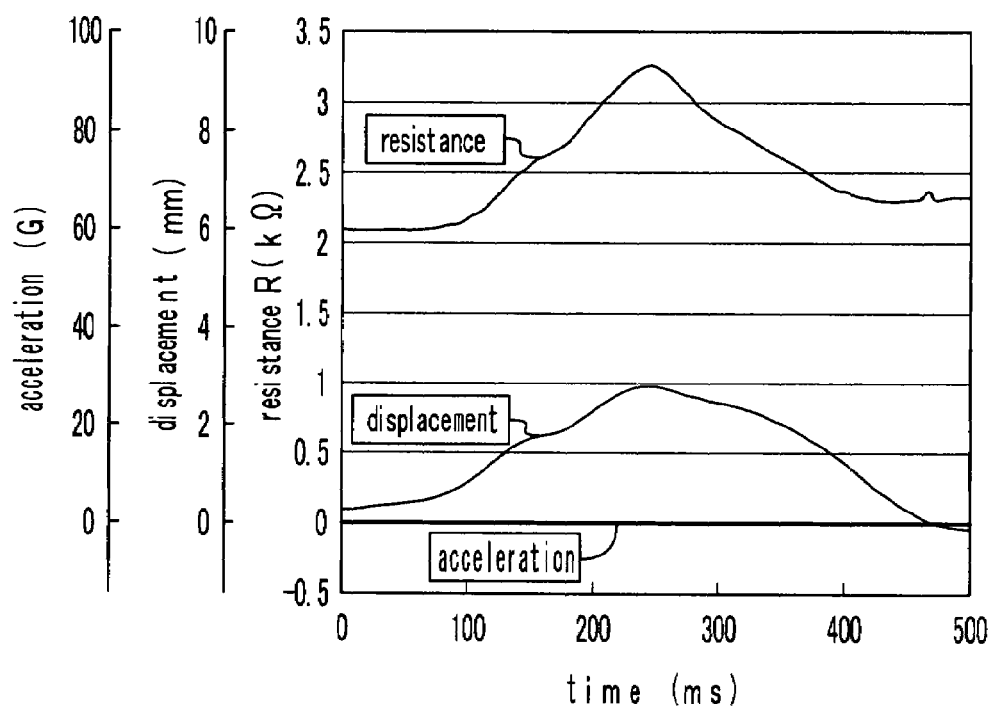
FIG. 36 is a graph for showing the change over time of an acceleration of a low-speed impact, a displacement of the deformation sensor and an electric resistance value.

An experimental result is shown in FIGS. 34 to 36. FIG. 34 is a graph for showing the change over time of an acceleration of a high-speed impact, a displacement of the deformation sensor and an electric resistance value in the first experiment. FIG. 35 is a graph for showing an enlargement of a horizontal axis (time: 65-85 ms) of FIG. 34. As shown in FIGS. 34 and 35, the electric resistance value rapidly increases with respect to high-speed impact. Thus, the response of the second deformation sensor of the present invention is high, and a delay of the response against the impact is so small that it can be ignored. For example, a movement of the occupant protection system at the time of collision has little grace of time such as several ms. So, in order to detect the collision condition, a high speed response is necessary. The speed of the second deformation sensor of the present invention is remarkably useful for detecting a collision of a vehicle. Moreover, as shown in FIG. 34, the electric resistance value changes in proportion to a deformation amount of the deformation sensor. Namely, the second deformation sensor of the present invention can detect a bending deformation directly.

FIG. 36 is a graph for showing the change over time of an acceleration of a low-speed impact, a displacement of the deformation sensor and an electric resistance value in the second experiment. As shown in FIG. 36, in case of a low-speed impact such as a push by a flat of a hand, no acceleration occurs. However, the electric resistance changes in proportion to a deformation amount of the deformation sensor. Thus, the second deformation sensor of the present invention can detect a bending deformation even if an impact is a low-speed impact.

What is claimed is:

1. A deformation sensor comprising:
an elastically deformable main body of sensor that includes an elastomer; and
an electrode which is connected with the main body of sensor, the electrode being able to output an electric resistance,
wherein spherical conductive fillers are blended in said elastomer in an approximately single particle state and with a high filling rate, and in which an electric resistance always increases regardless of the type of deformation applied, and
wherein the deformation sensor is arranged in a shock transmission member which is built in a vehicle and which constitutes a transmission path of a shock applied from the outside.

2. A deformation sensor according to claim 1, wherein said shock transmission member is one member selected from the group consisting of a bumper reinforcement, a crash box, a side member and a side impact protection beam.

3. A deformation sensor according to claim 1, wherein said main body of sensor is elastically bending deformable.

4. A deformation sensor according to claim 3, wherein said main body of sensor comprises a fixed surface which is fixed to said shock transmission member and a back surface which is in back of said fixed surface, and a restriction member which restricts elastic deformation of said back surface is arranged in said back surface.

5. A deformation sensor according to claim 3, wherein said main body of sensor comprises a fixed surface which is fixed to said shock transmission member and a back surface which is in back of said fixed surface, and said back surface is exposed.

6. A deformation sensor according to claim 1, wherein said main body of sensor is formed of a long sheet, and a number of said electrodes are arranged along with a longitudinal direction of said main body of sensor.

7. A deformation sensor according to claim 1, wherein said main body of sensor is composed of an elastomer composition in which said elastomer and said conductive fillers are essential components, and a blended amount of said conductive fillers at a second polarity change point at which an electric resistance change is saturated (saturated volume fraction:$\phi s$) is 35 vol % or more in a percolation curve which shows a relationship between the blended amount of said conductive fillers and the electric resistance of said elastomer composition.

8. A deformation sensor according to claim 1, wherein a filling rate of said conductive fillers is 30 vol % or more and 65 vol % or less when a total volume of said main body of sensor is 100 vol %.

9. A deformation sensor according to claim 1, wherein said conductive fillers are carbon beads.

10. A deformation sensor according to claim 1, wherein an average particle diameter of said conductive fillers is 0.05 μm or more and 100 μm or less.

11. A deformation sensor according to claim 1, wherein said elastomer includes one rubber selected from the group consisting of silicone rubber, ethylene-propylene copolymer rubber, natural rubber, styrene-butadiene copolymer rubber, acrylonitrile-butadiene copolymer rubber and acrylic rubber.

12. A deformation sensor comprising:
an elastically deformable main body of sensor having an elastomer; and
an electrode which is connected with said main body of sensor, the electrode being able to output an electric resistance,
wherein spherical conductive fillers are blended in said elastomer in an approximately single particle state and with a high filling rate, and in which an electric resistance always increases regardless of the type of deformation applied, and
wherein the deformation sensor being arranged in an exterior member which is exposed to the outside of a vehicle and which can detect a deformation of said exterior member.

13. A deformation sensor according to claim 12, wherein said exterior member is at least one of a bumper cover and a door panel.

14. A deformation sensor according to claim 12, wherein said main body of sensor is elastically bending deformable.

15. A deformation sensor according to claim 14, wherein said main body of sensor comprises a fixed surface which is fixed to said exterior member and a back surface which is in back of said fixed surface, and a restriction member which restricts elastic deformation of said back surface is arranged in said back surface.

16. A deformation sensor according to claim 14, wherein said main body of sensor comprises a fixed surface which is fixed to said exterior member and a back surface which is in back of said fixed surface, and said back surface is exposed.

17. A deformation sensor according to claim 12, wherein said main body of sensor is formed of a long sheet, and a number of said electrodes are arranged along with a longitudinal direction of said main body of sensor.

18. A deformation sensor according to claim 12, wherein said main body of sensor is composed of an elastomer composition in which said elastomer and said conductive fillers are essential components, and a blended amount of said conductive fillers at a second polarity change point at which an electric resistance change is saturated (saturated volume fraction:$\phi s$) is 35 vol % or more in a percolation curve which shows a relationship between the blended amount of said conductive fillers and the electric resistance of said elastomer composition.

19. A deformation sensor according to claim 12, wherein a filling rate of said conductive fillers is 30 vol % or more and 65 vol % or less when a total volume of said main body of sensor is 100 vol %.

20. A deformation sensor according to claim 12, wherein said conductive fillers are carbon beads.

21. A deformation sensor according to claim 12, wherein an average particle diameter of said conductive fillers is 0.05 µm or more and 100 µm or less.

22. A deformation sensor according to claim 12, wherein said elastomer includes one rubber selected from the group consisting of silicone rubber, ethylene-propylene copolymer rubber, natural rubber, styrene-butadiene copolymer rubber, acrylonitrile-butadiene copolymer rubber and acrylic rubber.

* * * * *